US011660925B2

(12) United States Patent
Doerksen et al.

(10) Patent No.: US 11,660,925 B2
(45) Date of Patent: May 30, 2023

(54) AUTONOMOUS TILTING DELIVERY VEHICLE

(71) Applicant: Sway Motorsports LLC, Soquel, CA (US)

(72) Inventors: Kyle Jonathan Doerksen, Santa Cruz, CA (US); Joseph Wilcox, Palo Alto, CA (US)

(73) Assignee: Sway Motorsports LLC, Soquel, CA (US)

( * ) Notice: Subject to any disclaimer, the term of this patent is extended or adjusted under 35 U.S.C. 154(b) by 0 days.

(21) Appl. No.: 17/745,645

(22) Filed: May 16, 2022

(65) Prior Publication Data

US 2023/0001759 A1 Jan. 5, 2023

Related U.S. Application Data

(63) Continuation of application No. 16/795,519, filed on Feb. 19, 2020, now abandoned.
(Continued)

(51) Int. Cl.
*B60P 1/36* (2006.01)
*B60P 1/04* (2006.01)
(Continued)

(52) U.S. Cl.
CPC .......... *B60G 17/0162* (2013.01); *B60G 3/20* (2013.01); *B60K 7/0007* (2013.01); *B60P 3/007* (2013.01); *B62D 61/065* (2013.01); *G05D 1/0231* (2013.01); *G05D 1/0257* (2013.01); *B60G 2400/0511* (2013.01); *B60G 2400/204* (2013.01); *B60G 2800/012* (2013.01); *B60G 2800/203* (2013.01); *B60J 5/0473* (2013.01); *B60R 11/04* (2013.01); *B62D 7/18* (2013.01); *B62D 7/228* (2013.01)

(58) Field of Classification Search
None
See application file for complete search history.

(56) References Cited

U.S. PATENT DOCUMENTS 7,438,346 B1 * 10/2008 Breed .................... E05C 17/203
296/146.12
9,555,849 B1 * 1/2017 Abbott ..................... B62K 5/10
(Continued)

FOREIGN PATENT DOCUMENTS

JP 2008207905 A * 9/2008

*Primary Examiner* — Adam D Tissot
*Assistant Examiner* — Laura E Linhardt
(74) *Attorney, Agent, or Firm* — Kolitch Romano Dascenzo Gates LLC

(57) ABSTRACT

An autonomous tilting three-wheeled vehicle comprises a pair of front wheels coupled to a tiltable chassis by a mechanical linkage, such that the pair of wheels and the chassis are configured to tilt in unison with respect to a roll axis of the chassis. An electronic controller of the autonomous vehicle controls a tilt actuator to selectively tilt the chassis. Optionally, a steering actuator is coupled to the front wheels and controlled by the electronic controller to selectively steer the wheels. A sensor configured to measure orientation-dependent information may be coupled to the chassis by a gimbal configured to compensate for vehicle tilt. In some examples, the autonomous vehicle comprises an autonomous delivery robot.

20 Claims, 29 Drawing Sheets

Related U.S. Application Data

(60) Provisional application No. 62/807,622, filed on Feb. 19, 2019.

(51) Int. Cl.
| | |
|---|---|
| *B60P 1/16* | (2006.01) |
| *B60P 1/38* | (2006.01) |
| *G06F 17/10* | (2006.01) |
| *G06G 7/48* | (2006.01) |
| *B62K 5/10* | (2013.01) |
| *G05D 1/08* | (2006.01) |
| *B60G 17/016* | (2006.01) |
| *B62D 61/06* | (2006.01) |
| *G05D 1/02* | (2020.01) |
| *B60G 3/20* | (2006.01) |
| *B60P 3/00* | (2006.01) |
| *B60K 7/00* | (2006.01) |
| *B60R 11/04* | (2006.01) |
| *B60J 5/04* | (2006.01) |
| *B62D 7/22* | (2006.01) |
| *B62D 7/18* | (2006.01) |

(56) References Cited

U.S. PATENT DOCUMENTS

| | | | |
|---|---|---|---|
| 2018/0158018 A1* | 6/2018 | Luckay | G01C 21/343 |
| 2019/0003862 A1* | 1/2019 | Reed | G01S 7/4026 |
| 2019/0291623 A1* | 9/2019 | Marble | B60P 1/365 |

* cited by examiner

AUTONOMOUS TILTING DELIVERY VEHICLE

CROSS-REFERENCES

The following references are hereby incorporated by reference for all purposes: U.S. Provisional Patent Application Ser. No. 62/807,622, filed Feb. 19, 2019.

FIELD

This disclosure relates to systems and methods for autonomous vehicles. More specifically, the disclosed embodiments relate to autonomous vehicles having a tilting suspension system.

INTRODUCTION

Using autonomous and robotic vehicles to deliver goods, food, and other commodities provides a number of business, customer and social advantages including decreased delivery costs for both buyer and seller, decreased order fulfillment times, decreased congestion, increased asset utilization and decreased labor for delivery. One category of high value delivery robots can operate at relatively high speed (e.g., exceeding sidewalk speeds) and is capable of operating in bike-lanes or roads. With a small footprint, these robots can fit several in the same form factor as a car or truck, thus improving congestion, and potentially reducing cost per vehicle compared with using a car or truck for the same job. Additionally, the lighter weight of such a purpose-built delivery robot can save energy per delivery, increase safety for pedestrians and other drivers, and decrease embodied energy per vehicle.

However, when combining relatively high speed with a relatively small footprint, the narrowness of trackwidth (wheel to wheel lateral spacing) directly competes against vehicle roll-over stability. A vehicle must have a certain trackwidth to be able to corner without rolling over. To counteract this rollover tendency, autonomous vehicle designers tend to increase track width, leading to an overall vehicle envelope which can match or exceed the width of a small car. Accordingly, there is a need for autonomous vehicles that can travel at relatively high speeds while remaining laterally stable, i.e., while avoiding roll-over.

SUMMARY

The present disclosure provides systems, apparatuses, and methods relating to autonomous vehicles having tilting suspension systems and associated steering systems.

In some embodiments, an autonomous vehicle comprises a pair of front wheels coupled to a tiltable chassis by a mechanical linkage, wherein the pair of wheels and the chassis are configured to tilt in unison with respect to a roll axis of the chassis; a single rear wheel coupled to the chassis; a motor coupled to the rear wheel and configured to drive the rear wheel to propel the vehicle; a first sensor configured to detect directional information regarding a net force vector applied to the chassis, wherein the net force vector is determined by gravity in combination with any applicable centrifugal force applied to the chassis; a tilt actuator operatively coupled to the chassis and configured to selectively tilt the chassis; a second sensor configured to measure orientation-dependent information corresponding to a surrounding environment, wherein the second sensor is coupled to the chassis by a gimbal configured to compensate for the tilting of the chassis with respect to the roll axis; and a controller including processing logic configured to selectively control the tilt actuator based on the directional information from the first sensor to automatically maintain the net force vector in alignment with a median plane of the chassis; wherein the processing logic of the controller is further configured to control the motor based on a desired speed of the vehicle.

In some embodiments, an autonomous vehicle comprises a pair of front wheels coupled to a tiltable chassis by a mechanical linkage, such that the pair of wheels and the chassis are configured to tilt in unison with respect to a roll axis of the chassis; a single rear wheel coupled to the chassis, the rear wheel comprising a hub motor configured to drive the rear wheel to propel the vehicle; an orientation sensor configured to detect directional information regarding a net force vector applied to the chassis; a tilt actuator operatively coupled to the chassis and configured to selectively tilt the chassis; an environmental sensor configured to measure orientation-dependent information corresponding to a surrounding environment, wherein the environmental sensor is coupled to the vehicle by a gimbal configured to compensate for the tilting of the chassis with respect to the roll axis; and a controller including processing logic configured to selectively control the tilt actuator based on the directional information from the sensor to automatically maintain the net force vector in alignment with a median plane of the chassis.

Features, functions, and advantages may be achieved independently in various embodiments of the present disclosure, or may be combined in yet other embodiments, further details of which can be seen with reference to the following description and drawings.

DETAILED DESCRIPTION

Figure 1:
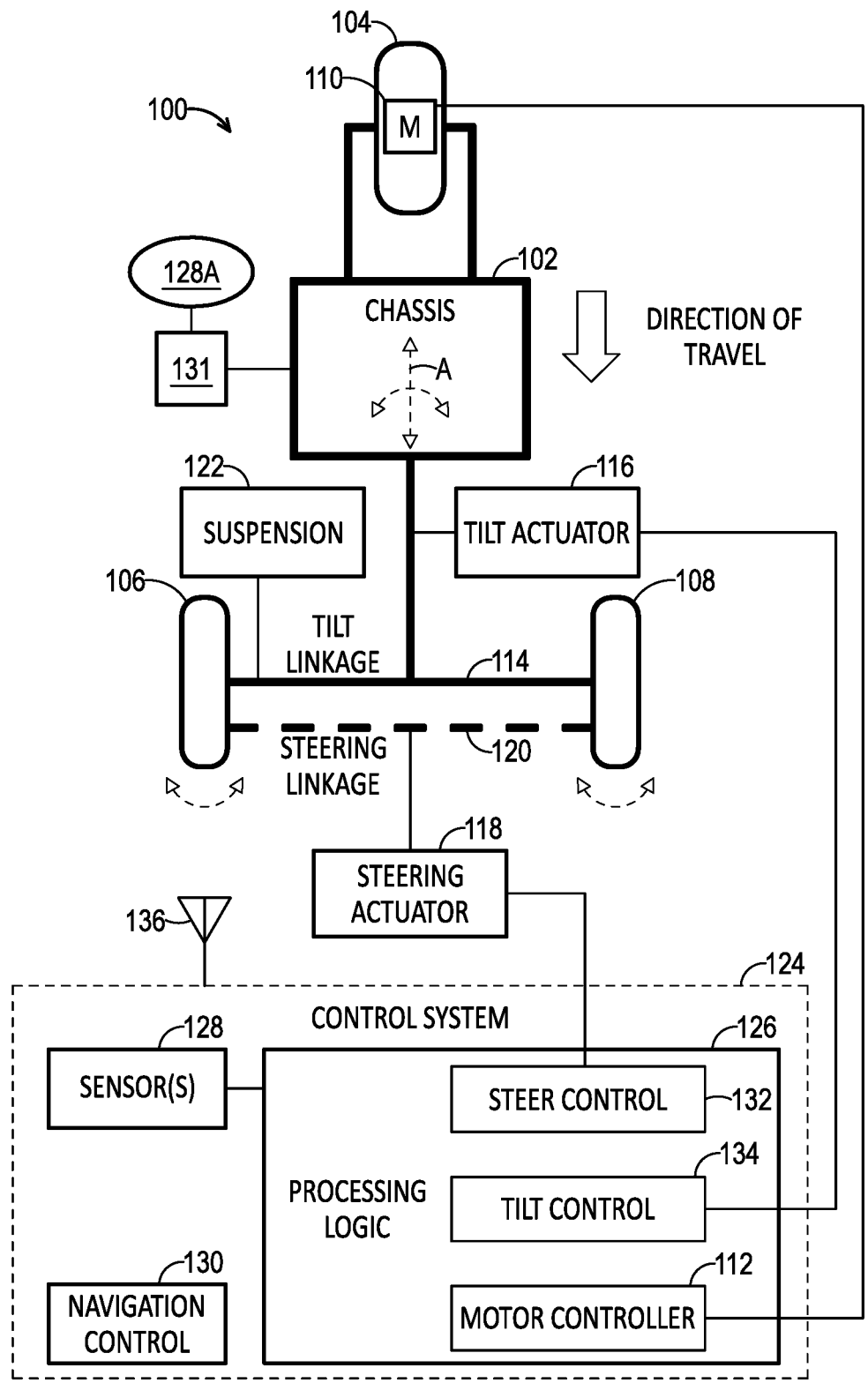
FIG. 1 is a schematic diagram of an illustrative autonomous tilting vehicle in accordance with aspects of the present teachings.

Various aspects and examples of a tiltable autonomous vehicle, e.g., a three-wheeled autonomous vehicle, which may or may not include a suspension system and/or active steering, as well as related methods, are described below and illustrated in the associated drawings. Unless otherwise specified, an autonomous vehicle in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through J, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, an autonomous vehicle (AKA a robotic vehicle or a robot) in accordance with aspects of the present teachings includes a tilting front wheel linkage and a control system configured to tilt the vehicle in a manner that stabilizes the vehicle and/or at least partially determines a direction of travel of the vehicle. In some examples, the vehicle additionally includes a steering system configured to at least partially determine the direction of travel by directly steering at least one wheel of the vehicle.

In illustrative examples described below, the autonomous vehicle includes three wheels, with a pair of linked wheels at a first end of the vehicle and a third wheel at an opposing end of the vehicle. However, any suitable number and arrangement of wheels may be used. A propulsion system of the vehicle may be coupled to any suitable wheel(s) to drive the vehicle forward and/or backward. For example, in some cases, the vehicle has a pair of linked wheels at a front end, a single wheel at a rear end, and a motor configured to drive the rear wheel.

A control system of the autonomous vehicle may include processing logic configured to automatically tilt the chassis of the vehicle and in some cases actively steer the wheels of the vehicle to guide the vehicle down a selected path while maintaining a median plane of the vehicle chassis in alignment with a net force vector resulting from gravity and centrifugal force (if any). The vehicle may be of any suitable design configured to result in a coordinated and similar or substantially identical tilting of the chassis and the wheels. For example, the vehicle may comprise a four-bar parallelogram linkage, coupling the left and right wheels to the central chassis. Examples of this type of linkage are described below.

Methods and systems of the present disclosure may, for example, provide for the delivery of articles, objects, products, or goods from one location to another location using the wheeled vehicle. Control methods may be computer implemented, either partially or totally. As described above, the wheeled vehicle may optionally be autonomous, remotely controlled, semiautonomous, or mixed autonomous. The vehicle may optionally be one or a plurality of wheeled vehicles, for example one of a plurality of identical wheeled vehicles. The system of the present disclosure may be referred to as a wheeled vehicle or robotic delivery system, a driverless vehicle or robotic delivery system, an autonomous vehicle or robotic delivery system, a driverless or autonomous delivery system or any combination of the foregoing. The method and system of the present disclosure may optionally be used on an indoor or an outdoor land transportation network, which may include roads, bike paths, sidewalks, alleys, paths, crosswalks, any route on which a wheeled vehicle may travel or any combination of the foregoing. The transportation network of the present disclosure may be referred to as an outdoor network, an outdoor transportation network, a land transportation network, or the like.

Electromechanically controllable variables of the vehicle may include chassis tilt with respect to the wheel linkage, steering of the wheels, throttle or vehicle speed, and braking. In general, the control system is configured to keep centrifugal and gravitational forces in equilibrium when turning, so that the combined centrifugal and gravitational vectors create a net force vector parallel to the chassis and wheel median planes. By directing the combined forces parallel to the chassis, stress on the vehicle suspension components (as well as any cargo, where applicable) is reduced, rollover risk is decreased, and traction in a turn is improved or maximized.

An ideal leaning position of the chassis may be achieved through a combination of actuators and control software to create the desired performance. In some examples, tilt and steering angles are discretely controlled for a given turn. In general, the tilt to steer ratio is controlled, depending on speed and terrain, and higher speed leads to more vehicle chassis lean, less wheel steering. The tilt experienced at the chassis is a sum of the angle of the road surface plus the angle of the wheel linkage articulation. Detecting the level of the surface (or the chassis tilt displacement to correct) could in some cases be done using a suitable sensor near the road surface. However, it may be more effective to determine and maintain the absolute tilt angle of the chassis by measuring its relationship to the net force vector caused by gravity and any centrifugal forces.

In some cases, the interaction of crowned tires with the terrain must be accounted for, as the crowned shape of some wheels may produce scrub when tracking along the side of the wheel in a given turn vector over uneven or slanted terrain. For tilting three-wheeled vehicles, understeering or oversteering may be needed, depending on terrain, to counter the natural effect of the crowned wheel to oversteer or understeer into the turn. Generally speaking, this tire scrub is preferable to loss of the desired path of the vehicle.

Control system(s) of the vehicle may include any suitable processing logic for controlling the propulsion system, tilt system, and/or steering system to cause the vehicle to automatically travel along a desired path in a stable manner. Any suitable control methods may be used, including, e.g., any suitable relationship(s) between vehicle lean and vehicle steering. The control system may be further configured to enable additional vehicle functions, such as automatic unloading of vehicle contents.

In some examples, the autonomous vehicle is a delivery vehicle configured to carry cargo. Accordingly, a body of the vehicle may comprise any suitable component(s) for containing any suitable object(s) or material(s). For example, the vehicle body may include one or more platforms, bins, tanks, closeable compartments, and/or the like.

In some examples, the autonomous vehicle is equipped with fleet-management features, such a communications system configured to transmit sensed vehicle information (e.g., vehicle location, tire pressure, battery charge, and/or any other suitable information) to another device, such as a remote computer system (e.g., a computer not located onboard the vehicle). This can allow for convenient monitoring and maintenance of the vehicle. In some examples, the vehicle is one of a fleet of autonomous vehicles each configured to transmit vehicle information to a central fleet management computer.

Aspects of the autonomous vehicles described herein may be embodied as a computer method, computer system, or computer program product. Accordingly, aspects of the autonomous vehicle may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the autonomous vehicle may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of autonomous tilting vehicles may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the autonomous vehicle may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the autonomous vehicle. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative tilting autonomous vehicles, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Autonomous Vehicle

With reference to FIG. 1, this section describes an illustrative three-wheeled autonomous vehicle 100 configured to tilt or lean from side to side, e.g., while cornering. Vehicle 100 is an example of a tilting delivery vehicle or delivery robot, generally described above.

FIG. 1 is a schematic diagram of vehicle 100. As depicted, vehicle 100 has three wheels coupled to a body or chassis 102, with a single drive wheel 104 in the rear and two wheels 106, 108 in front. Rear wheel 104 is driven by a motor 110, e.g., a hub motor, which is controlled by a motor controller 112 to propel the vehicle in forward and reverse directions. Front wheels 106 and 108 are coupled to a front end of chassis 102 by a tilt linkage 114 configured to tilt the chassis of the vehicle as well as the front wheels, in a controlled manner. Tilt linkage 114 may include any suitable mechanical linkage, such as a four-bar linkage, configured to ensure a tilt of the front wheels corresponds to the tilt of the chassis. A tilt actuator 116 (also referred to as a lean actuator or roll actuator) is operatively connected to tilt linkage 114, and may include any suitable electric motor (e.g., servo motor, step motor), rotary actuator, or other device configured to provide a rotational force for tilting the chassis and wheels.

Steering of the vehicle may be accomplished by tilting and/or by controlled steering of the front wheels, e.g., using a steering actuator 118 operationally connected to a steering linkage 120. Various illustrative steering schemes are described further below. In this context, tilt or lean is defined as a lateral roll from side to side about a roll axis (e.g., axis A), while steering is performed by rotating the wheel or wheels about a yaw axis, such that the wheels point in a direction more to the left or right relative to their present orientation. At some vehicle speeds, steering may be performed entirely by way of tilting, while the front wheels are free to caster. At some vehicle speeds, steering may be performed entirely by actively steering the front wheels. At some vehicle speeds, a combination of methods may be utilized.

Steering actuator 118 may include any suitable electric motor (e.g., servo motor, step motor), rotary actuator, or other device configured to provide a rotational force for steering vehicle 100. This force from the steering actuator is converted by the steering linkage into a linear force for turning the wheels. The steering linkage may, for example, include one or more tie rods configured to mechanically couple actuator 118 to wheels 106 and 108. In some examples, steering linkage 120 is an Ackermann steering linkage, such that control of the front wheels automatically compensates for the inside and outside wheel needing to trace circles of different radii during a given turn.

In some examples, vehicle 100 utilizes servo motors with planetary gearboxes for both the lean and the steer actuators. Other suitable actuators include worm gear boxes, linear actuators connecting linkage elements, hydraulic actuators, harmonic drive units, stepper motors, direct torque actuators, and/or the like. Generally, the tilt actuator has a higher load requirement, and must generate more force than the steering actuator, such that different types of actuators may be used for each.

A suspension system 122 may be integrated into tilt linkage 114, steering linkage 120, and/or coupled to wheels 106 and 108. A separate suspension system may be provided for rear wheel 104. Suspension system 122 may include any suitable biasing and/or damping device(s) configured to facilitate travel over a rough or bumpy terrain. For example, suspension system 122 may include one or more shock absorbers and/or springs. Suspension system 122 is configured to reduce shock and vibration loads to cargo as well as to the sensing and control systems and vehicle chassis. There are several possible approaches to suspending the vehicle in a shock absorbing manner, including but not limited to: four-bar linkages, leading links, A-arms, linear/telescoping direct suspension, and/or the like.

A control system 124 (e.g., an onboard control system) of vehicle 100 may include any suitable processing logic 126 configured to control the various actuators in view of information from one or more vehicle sensors 128 and/or in response to commands received from a navigation control system 130. Navigation control system 130 may include any suitable navigation system configured to direct vehicle 100 along a path toward a destination, and disposed either onboard vehicle 100, remotely (e.g., a remote-control unit), or a combination thereof.

Sensors 128 may include any suitable devices configured to determine information regarding vehicle 100 and/or its physical operating environment. For example, sensors 128 may include sensing units typically found on autonomous vehicles. Example sensors may include temperature sensors, tire pressure sensors, tilt or other orientation sensors (e.g., accelerometers), speed sensors, and/or the like.

Additionally, or alternatively, sensors 128 may include at least one orientation-dependent sensor 128A configured to sense information (e.g., regarding a surrounding environment) in an orientation-dependent manner. In other words, information sensed by sensor 128A tends to be affected, in at least some circumstances, by the orientation and/or position of the sensor with respect to at least one axis. Example orientation-dependent sensors may include, e.g., LIDAR, radar, laser range-finders, optical imaging sensors, thermal imaging sensors, a computer vision system, proximity sensors, etc. The information sensed by these types of sensors generally depends on sensor orientation. For instance, the orientation of an image acquired by an imaging sensor is determined by the orientation of the imaging sensor, and the information obtained by a LIDAR sensor depends on the position and direction of the light source. Accordingly, if the orientation-dependent sensor is tilted (e.g., as the vehicle chassis and/or linkage is tilted), the data acquired by the sensor is generally altered relative to data that would be acquired by an untilted sensor. This can adversely impact the use of the data by control systems of the vehicle (e.g., navigation control system 130, a collision-avoidance system, etc.). Accordingly, orientation-dependent sensor 128A may be coupled to chassis 102 (and/or another suitable part of the vehicle) by a tilt-compensating mount system 131 configured to compensate for vehicle tilt (at least on the roll axis), such that sensor 128A remains partially or completely untilted as the vehicle tilts. For example, tilt-compensating mount system 131 may comprise a gimbal mount.

Tilt-compensating mount system 131 may comprise an active tilt-compensation system and/or a passive tilt-compensation system. An active tilt-compensation system includes at least one motor or other actuator configured to adjust an orientation of sensor 128A based on a detected tilt of the sensor (e.g., as detected by a tilt sensor coupled to the sensor or to the gimbal mount), and/or based on an anticipated tilt of the vehicle (e.g., based on a control signal to the tilt actuator and/or steering actuator, which apprises system 131 that sensor 128A will imminently tilt without intervention). A passive tilt-compensation system may include a gyroscope or other suitable device configured to attach sensor 128A to the chassis such that the sensor does not tend to tilt as the vehicle tilts. In some examples, the tilt-compensation system may include a mechanical linkage slaved to the tilt linkage 114, such that a corresponding counter-lean is automatically produced in the tilt-compensation system.

Tilt-compensating mount system 131 may be configured to compensate for tilt about any suitable axis or combination of axes. In some examples, system 131 is configured to compensate for tilt about the vehicle roll axis only. Accordingly, in these examples, sensor 128A is effectively stabilized about the roll axis, such that it does not tilt with respect to horizontal when the vehicle is caused to tilt, but is not prevented from tilting with the vehicle about a pitch axis or a yaw axis.

Processing logic 126 may include any suitable modules or hardware configured to carry out control algorithms with respect to the operation of vehicle 100. For example, processing logic 126 may include motor controller 112, a steering controller 132 configured to control steering actuator 118, and/or a tilt controller 134 configured to control tilt actuator 116, as well as processing logic configured to coordinate the activities of any or all of these controllers.

Control system 124 may be in wireless communication with a remote system, e.g., a remote portion of navigation control 130, and therefore may include a wireless radio system configured to transmit and receive information, e.g., as represented by a transceiver 136.

Turning now to a discussion of illustrative steering schemes that may be implemented by the control system and vehicle 100, there are several possible relationships of lean (i.e., tilt) to steering in a tilting robot, such as autonomous vehicle 100. Selected relationships and related control system configurations are discussed below:

a. Mechanically Linked Lean to Steer

In this case, the mechanical linkages result in a fixed ratio to cause the wheels of the vehicle to be turned when they lean. In embodiments of this type, it may be desirable to dynamically change the lean-to-steer ratio with respect to speed, to provide both low speed maneuverability and high speed stability.

b. Electrically Linked Lean to Steer

In this case, lean angle is the primary control vector utilized to determine how much to actively steer the vehicle. Steering is controlled by the steering controller and actuator, based on the lean angle, vehicle speed, and other factors.

c. Free to Caster (FTC)

In this case, lean angle is the primary control vector for the vehicle, and the steering system is left free to assume any position. In other words, active steering is discontinued, and the wheels are freed to swivel or caster based entirely on ground forces and lean angle. Based on a trail/caster angle, the vehicle will mechanically select an optimum steering angle for the lean angle. This technique works well at higher speeds.

In FTC operation, the vehicle geometry is designed so that when tilt is initiated, the front wheels will caster or swivel to the proper steering angle for any given combination of lean and speed. This relationship can be roughly expressed as S=T/V, where S is steer angle, T is tilt angle, and V is velocity. In a given turn, if the maximum lean has already been achieved, but the vehicle needs to turn more tightly, reducing speed will cause the turn radius to decrease in accordance with the FTC dynamics.

With FTC, a vehicle will also counter-steer when entering a drift from loss of rear wheel traction, and will also counter-steer in the case of one front wheel coming off the ground during the initiation of tilt with a high center of gravity (CG) or a very narrow wheelbase. A tilting three-wheeled vehicle utilizing an FTC control scheme is resistant to flipping over for this reason.

d. Free Leaning

In this case, the steering angle is the primary control vector and the vehicle is free to lean. Embodiments of this type may use a tilt-locking mechanism to prevent undesirable instabilities, maintaining the vehicle at a set angle (e.g., vertical) or range of angles. Furthermore, the steering angle may operate under closed-loop control to balance the vehicle, similar to the way a bicyclist or motorcyclist balances their vehicle using a combination of body lean, counter-steering, and other inputs.

e. IMU-Based Lean Follows Steer

In this case, steering angle is the primary control vector for the vehicle. Accelerometer and/or gyro sensors sense the lateral forces on the vehicle, and the tilt actuator runs a control loop to minimize the component of lateral acceleration showing a tendency to slide the vehicle out of the turn.

f. Combination Methods

In some cases, the above techniques can be used in combination with clutches/brakes on either the steer or lean actuators or both, or the actuators can be programmed into a "simulated low-inertia control mode" where they act as followers. This can be turned on and off (gradually) at certain vehicle speed breakpoints to provide optimal handling in both the low and high-speed domains. Additionally, control rules may need to be modified when the vehicle is operating in reverse.

For any of the above control schemes, a desired tilt angle for the vehicle in question is in general derived by determining what side-to-side lean or tilt angle results in a net force vector aligned with the central vertical plane of the chassis, also referred to as the median plane, i.e., a plane through the vertical centerline of the vehicle dividing or bisecting the chassis into left and right portions. The net force vector is defined as the combined force vector resulting from downward gravity and lateral centrifugal force. A sensor (e.g., an accelerometer) on the vehicle detects lateral deflection of the force vector on the chassis (e.g., due to centrifugal forces from initiating a steered turn, or lateral forces from uneven terrain during a turn or during normal operation). In response, a tilting actuator and in some cases a steering actuator are adjusted to return the net force vector to substantial alignment with the median plane of the chassis. Lean angle changes with speed and tightness of turn radius. Given the desired or optimum tilt angle for a given turn radius and/or speed, (i.e., the angle that keeps the net force vector in alignment with the chassis) the tilt linkage may be altered to maintain that tilt angle, and also to keep the tilt angle regardless of uneven/changing ground surface.

Lean (AKA tilt) to steer ratios are calculated to maintain the summary force vector (with respect to centrifugal force and the force due to gravity) in alignment with the median plane of the tilting vehicle. Generally speaking, the faster the vehicle goes for any given turn radius, the more the vehicle chassis needs to lean in order to keep this summary force vector in alignment with the median plane of the tiltable chassis. Higher speed or decreased turning radius results in an increase to the desired lean angle.

Control system 124 may include any suitable processing logic configured to carry out algorithms such as those described herein. For example, a PID (proportional integral derivative) controller may be utilized, having a control loop feedback mechanism to control tilt/steer variables based on force vector measurement.

For example, during the turning of vehicle 100, while lateral accelerations and/or centrifugal forces are exerted on chassis 102, vehicle control system 124 may direct the one or more tilt actuators 116 to pivot and/or tilt chassis 102 so as to compensate in whole or in part for such lateral accelerations and/or centrifugal forces. Processing logic 126 may receive input from one or more of sensors 128, to measure such accelerations, centrifugal forces and/or other characteristics of chassis 102 so as to determine the degree, amount, and/or angle to which the chassis should be pivoted and/or tilted by the one or more tilt actuators 116. For example, an IMU sensor, which may be included in the one or more sensors 128, and may optionally include a solid-state accelerometer, may be utilized for measuring any suitable acceleration and/or force in this regard. The degree, amount, and/or angle of such tilt may be sensed and/or measured by any suitable sensor, and directed back to processing logic 126 and/or other aspects of the control system as feedback. Any suitable algorithm may be programmed into the control system, either as firmware, software or both, for analyzing the input signals provided by one or more sensors and for instructing and/or controlling the one or more tilt actuators.

One or more braking mechanisms of vehicle 100 may be controllable by control system 124 to cause slowing of the vehicle along its direction or path of travel.

In some examples, vehicle 100 is directed by control system 124 to travel over a transportation network from a first location to a second location. Instructions regarding the second location and/or path(s) between the first and second locations may be stored in a memory of the vehicle control system, received by the vehicle control system from another source (e.g., a remote control), determined by the vehicle control system, and/or derived in any other suitable way. In some examples, such instructions are relayed to the vehicle from another location during the course of travel from the first location to the second location. In some examples, vehicle controller receives GPS information (e.g., from an onboard GPS receiver, or indirectly from another source) for use in charting the course of travel from the first location to the second location. In some examples, the vehicle control system determines and/or adapts the course of travel based on readings from an onboard camera, LIDAR system, computer-vision system, proximity sensor, and/or the like.

In some examples, a course of travel between the first and second location is determined in advance (i.e., before the vehicle begins to travel), and may optionally be updated during travel (e.g., for collision avoidance). In some examples, the course of travel is determined as the vehicle travels, such that at any given time, the vehicle control system only knows a small portion of the travel path it will imminently take.

Based on the instructions, control system 124 sends appropriate commands to the motor, tilt actuator, and/or steer actuator to control the speed and direction of travel of the vehicle. Depending on the mode in which the vehicle is operating, the tilt actuator and steer actuator do not necessarily each receive instructions. For example, in a free-to-caster mode, the steering actuator is not used. In a free-leaning mode, the tilt actuator is not used.

Processing logic 126 receives input signals from one or more of sensors 128 that indicating lateral accelerations and/or centrifugal forces exerted on the vehicle (e.g., during turns). In response, the processing logic sends appropriate commands to the one or more tilt actuators 116 to pivot and/or tilt chassis 102 of the vehicle relative to the travel surface and/or appropriate reference line or plane into a turn so as to compensate for such lateral accelerations and/or centrifugal forces.

In some examples, a PID loop of the control system is configured to automatically modulate a speed of the vehicle to attain desired turn radii. For example, if a tighter turn is needed, the vehicle may slow automatically, rather than steering or tilting, thereby reducing the turn radius.

B. Illustrative Tilt Linkages and Suspensions

As shown in FIGS. 2-20, this section describes illustrative tilt linkages and suspension systems suitable for use with autonomous vehicle 100, each of which is an example of tilt linkage 114 and/or suspension system 122, described above.

Figure 2:
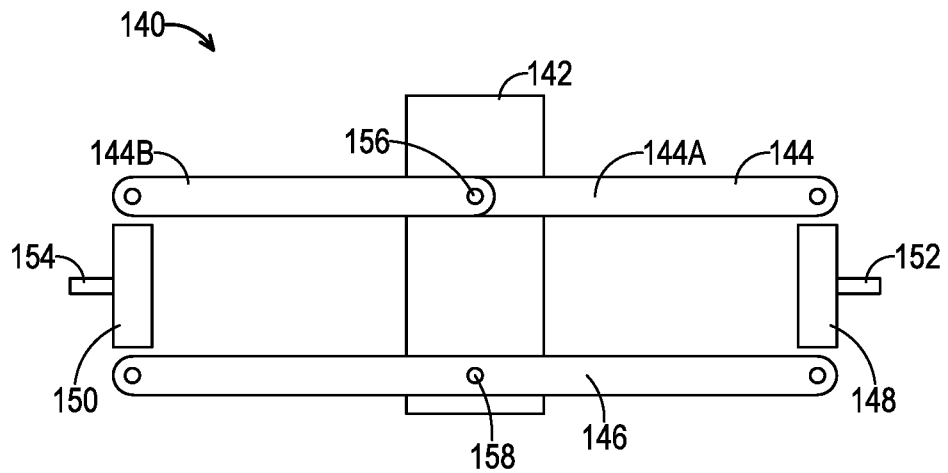
FIG. 2 is a front view of an illustrative tilting linkage in accordance with aspects of the present teachings, the linkage including a pair of upper bars with a common pivot joint.

FIGS. 2-5 depict selected versions of suitable mechanical linkages. In some examples, the tilt linkage may include a simple four-bar parallelogram linkage. Other suitable mechanical linkages are described below. FIG. 2 depicts an illustrative four-bar mechanical tilt linkage 140 coupled to a chassis 142 of a three-wheeled vehicle substantially similar to vehicle 100. Linkage 140 includes an upper bar 144 and a lower bar 146, each coupled at outboard ends to a left kingpin 148 and a right kingpin 150. As used herein, the term kingpin refers generally to the component(s) comprising the main pivot for steering each wheel. As depicted in FIG. 2, each of kingpins 148 and 150 includes an axle 152, 154 for rotational attachment of the respective wheels. The upper bar, lower bar, and kingpins may each be referred to as a "link" in the four bar linkage.

In this example, upper bar 144 is divided into two portions, 144A and 144B, which pivot at a common pivot joint 156. Lower bar 146 is a single piece, and is coupled to the tilt actuator at a central pivot joint 158. Rotary pivot 156 in the middle of the upper link facilitates the use of a rotary bearing at the attachment location between the top of the linkage and tilting chassis 142. In the case of a single rigid link, a linear bearing or some amount of free-play may be used, to compensate for the condition wherein the kingpins are not perfectly parallel, but may have some "tilt Ackermann" (i.e., Ackermann steering geometry) to allow unequal tilting angles for the front wheels.

Figure 3:
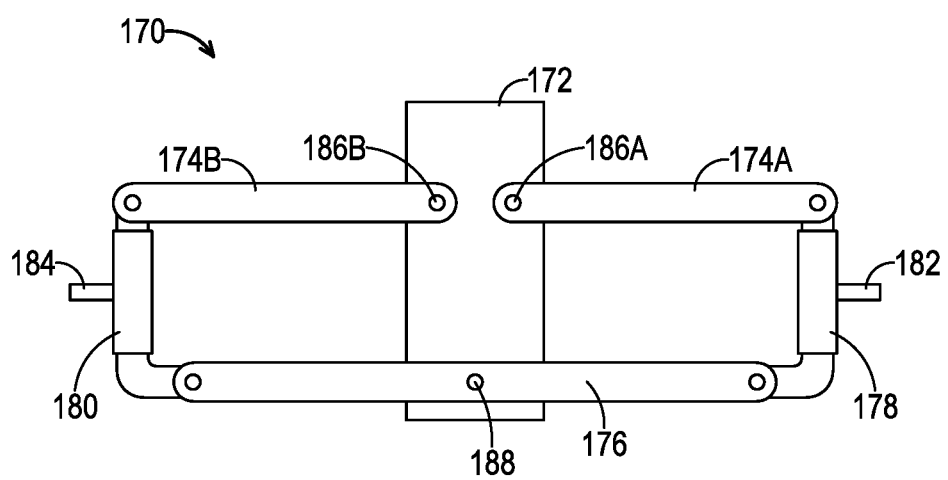
FIG. 3 is a front view of another illustrative tilting linkage in accordance with aspects of the present teachings, the linkage including a pair of upper bars with unique respective pivot joints.

FIG. 3 depicts another illustrative four-bar mechanical tilt linkage 170, coupled to a chassis 172 of a three-wheeled vehicle substantially similar to vehicle 100. Linkage 170 includes a pair of upper bars 174A and 174B, and a lower bar 176, each coupled at outboard ends to a left kingpin 178 and a right kingpin 180. As depicted in FIG. 3, each of kingpins 178 and 180 includes an axle 182, 184 for rotational attachment of the respective wheels. The upper bars, lower bar, and kingpins may each be referred to as a "link" in the mechanical linkage.

In this example, upper bars 174A and 174B are separated or spaced from each other, such that each upper bar has a unique pivot joint 186A, 186B. Lower bar 176 is a single piece, and is coupled to the tilt actuator at a central pivot joint 188. Rotary pivots 186A and 186B at the middle ends of the upper links again facilitates tilted or differently-tilting kingpins. The kingpins may be referred to in some examples as "steering knuckles," as they include connection points for various components of the steering system.

Figure 4:
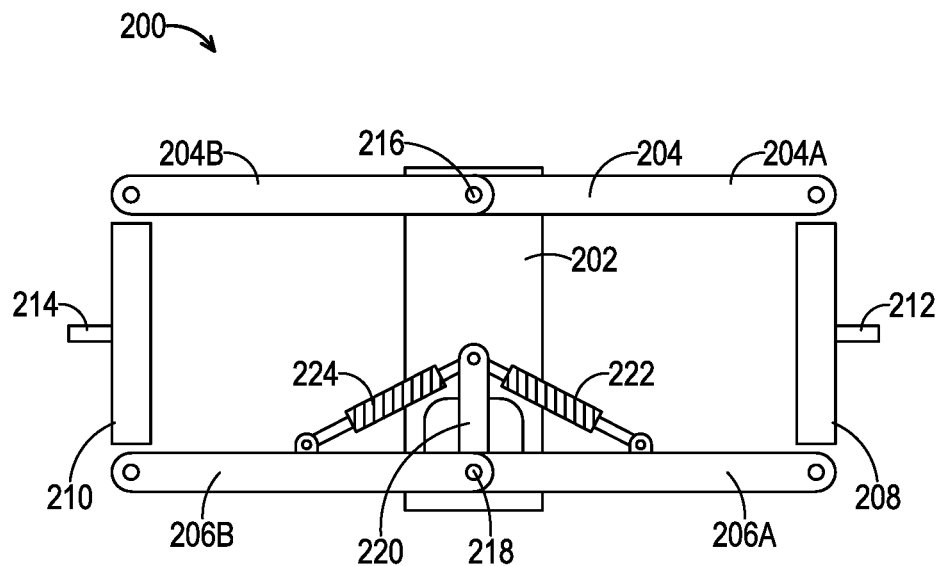
FIG. 4 is a front view of yet another illustrative tilting linkage in accordance with aspects of the present teachings, the linkage including an actuator arm and a pair of shock absorbers.

FIG. 4 depicts an illustrative A-arm mechanical tilt linkage 200 coupled to a chassis 202 of a three-wheeled vehicle substantially similar to vehicle 100. Linkage 200 includes an upper bar 204 divided into two portions 204A and 204B, and a pair of lower bars 206A and 206B, each coupled at an outboard end to a left kingpin 208 and a right kingpin 210. As depicted in FIG. 4, each of kingpins 208 and 210 includes an axle 212, 214 for rotational attachment of the respective wheels.

In this example, upper bar 204 is divided into portions 204A and 204B, which pivot at a common pivot joint 216. Lower bars 206A and 206B are coupled at inboard ends to a central pivot joint 218. An actuator arm 220 extends upward from the pivot joint, and is rotated by the tilt actuator. The actuator arm may be referred to as a rocker. Each of the lower bars is coupled to a distal end of the actuator arm by a respective shock absorber or gas spring 222, 224. Upper portions 204A and 204B, and/or lower portions 206A and 206B may each comprise an A-arm or wishbone-shaped arm, with the apex of the arm on the outboard end. See FIGS. 13-14.

Figure 5:
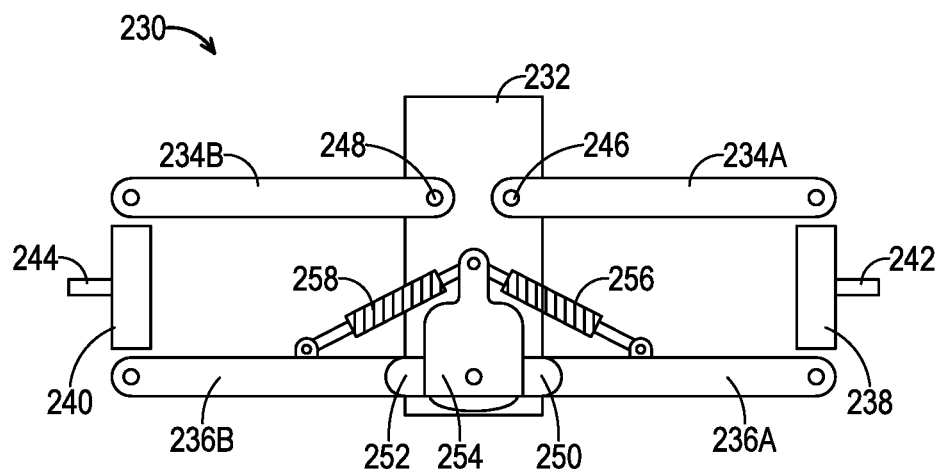
FIG. 5 is a front view of yet another illustrative tilting linkage in accordance with aspects of the present teachings, the linkage including an actuator plate and a pair of shock absorbers.

FIG. 5 depicts another illustrative A-arm mechanical tilt linkage 230 coupled to a chassis 232 of a three-wheeled vehicle substantially similar to vehicle 100. Linkage 230 includes a pair of upper bars 234A and 234B, and a pair of lower bars 236A and 236B, each coupled at an outboard end to a left kingpin 238 and a right kingpin 240. As depicted in FIG. 5, each of kingpins 238 and 240 includes an axle 242, 244 for rotational attachment of the respective wheels.

In this example, inboard ends of upper bars 234A and 234B pivot at unique pivot joints 246 and 248. Lower bars 236A and 236B are coupled at inboard ends to unique pivot joints 250 and 252 on an actuator plate 254. Plate 254 extends upward from the pivot joints and is rotated by the tilt actuator. The actuator plate may be referred to as a rocker. Each of the lower bars is coupled to a distal end of the actuator plate by a respective shock absorber or gas spring 256, 258. Upper portions 234A and 234B, and/or lower portions 236A and 236B may each comprise an A-arm or wishbone-shaped arm, with the apex of the arm on the outboard end. See FIGS. 15-16.

In some examples, the suspension system for the tilt linkage may include a leading link swingarm configuration, situated between the steering kingpin and the wheel. This results in an acceptable suspension solution. However, the trail dimension and scrub radius change slightly when the suspension is compressed between the kingpin and the wheel.

This can be addressed by using an A-arm suspension system. However, in this example, the direction of suspension travel is (in hard leans) tangential to the plane of the wheel, and causes "mushiness" and alignment issues.

The situation may also be remedied by mounting the kingpin directly to the front suspension swingarm. However, the rotary motion of the swingarm (either leading link or trailing link) during suspension travel changes the caster angle (i.e., rake) of the kingpins and can dramatically change the FTC handling characteristics of the steering suspension.

Figure 6:
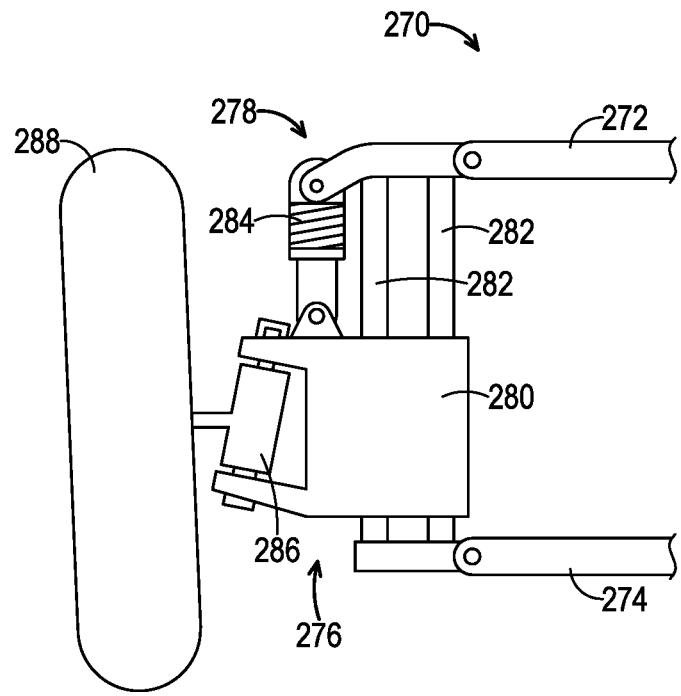
FIG. 6 is a partial front view of an illustrative linear rail suspension system, in accordance with aspects of the present teachings.
Figure 7:
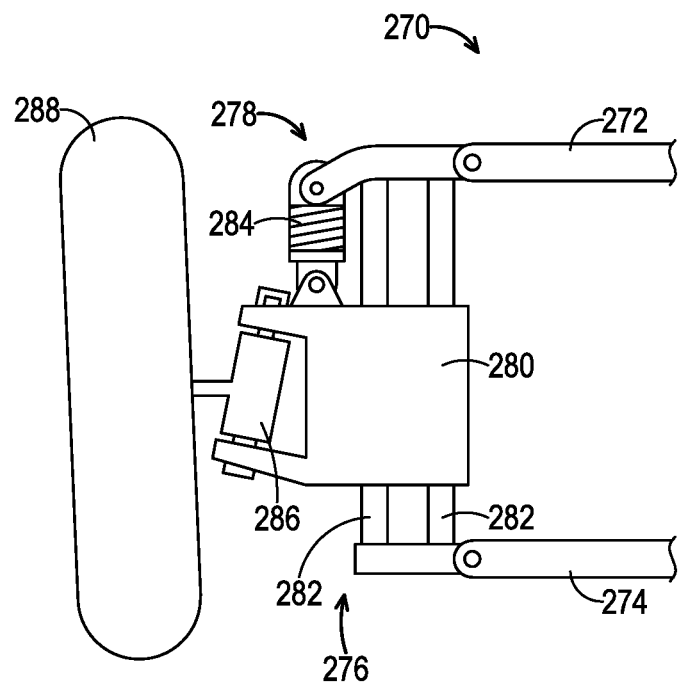
FIG. 7 depicts the suspension system of FIG. 6 in a compressed state.

To eliminate the change in trail and scrub radius during suspension compression, a linear rail suspension system is depicted in FIGS. 6 and 7, where there is no suspension movement between the kingpin and the wheel. This system creates suspension travel between the tilting pivots and the steering kingpins, while keeping suspension travel direction within the plane of the wheel and the kingpin and wheel relationship fixed. To prevent twisting, the linear rail solution may include two non-splined shafts fixed in parallel with each other, or one (or more) splined shaft.

With continuing reference to FIGS. 6 and 7, a four-bar linkage 270 is partially depicted, with an upper bar 272 and a lower bar 274. In this example, an outboard link 276 of the linkage comprises a suspension system 278. Suspension system 278 includes a sliding block 280 movable along linear rails 282 and damped by a shock absorber 284 coupled to upper bar 272. A kingpin 286 is rotatably coupled to an outboard end of sliding block 280, and to a front wheel 288. FIG. 6 depicts linkage 270 with shock 284 in an uncompressed state, and FIG. 7 depicts linkage 270 with shock 284 in a compressed state. Although two rails 282 are depicted in FIGS. 6 and 7, more or fewer such rails may be utilized. In some examples, rails 282 have a rectilinear cross section. In some examples, rails 282 have a round or elliptical cross section. In some examples, block 280 may include one or more ball splines for coupling to one or more rails 282. For example, rails 282 may comprise a spline shaft and block 280 may comprise a ball spline configured to ride on the spline shaft.

Figure 8:
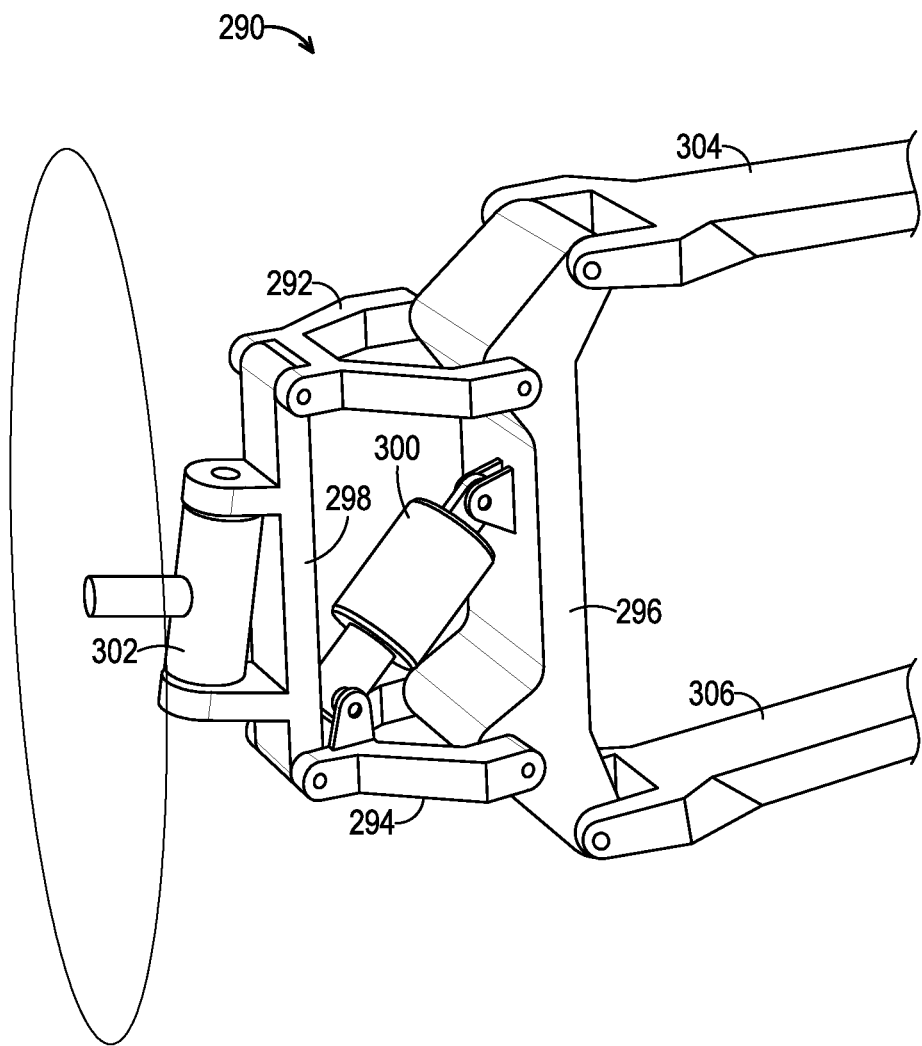
FIG. 8 is a partial isometric view of an illustrative wheel mounting assembly and suspension system in accordance with aspects of the present teachings.

In another illustrative solution, FIG. 8 depicts another four bar linkage 290 in which smaller A-arms 292 and 294 are pivotably coupled to an inner outboard link 296. An outer outboard link 298 is pivotably coupled at top and bottom to A-arms 292 and 294, and movement of the outer outboard link is damped by a shock or gas spring 300. A kingpin 302 is rotatably mounted to an outboard side of the outer outboard link, and configured to receive a wheel thereon. This assembly (inner and outer outboard links with kingpin and shock) is coupled at upper and lower ends of the inner outboard link to an upper bar 304 and a lower bar 306 of the tilt linkage.

FIGS. 9-16 depict various examples of A-arm tilt linkages and suspension systems. When used for tilting vehicles, A-arm pivots can be used as the tilting pivots and for suspension travel. Accordingly, to actuate the tilt directly in this configuration, the tilt actuator acts through the springs of the suspension rather than directly on the A-arm pivot. On four-bar designs, the tilt actuator (e.g., motor) can actuate the four bar pivot directly, because the four bar is only controlling tilt. Suspension travel does not affect the four bar articulation, because the springs are disposed between the four-bar linkage and the wheels. With respect to tilting A-Arm suspensions, the tilt actuator motor connects either directly to the shock, or connects to a rocker which connects the shocks.

Figure 9:
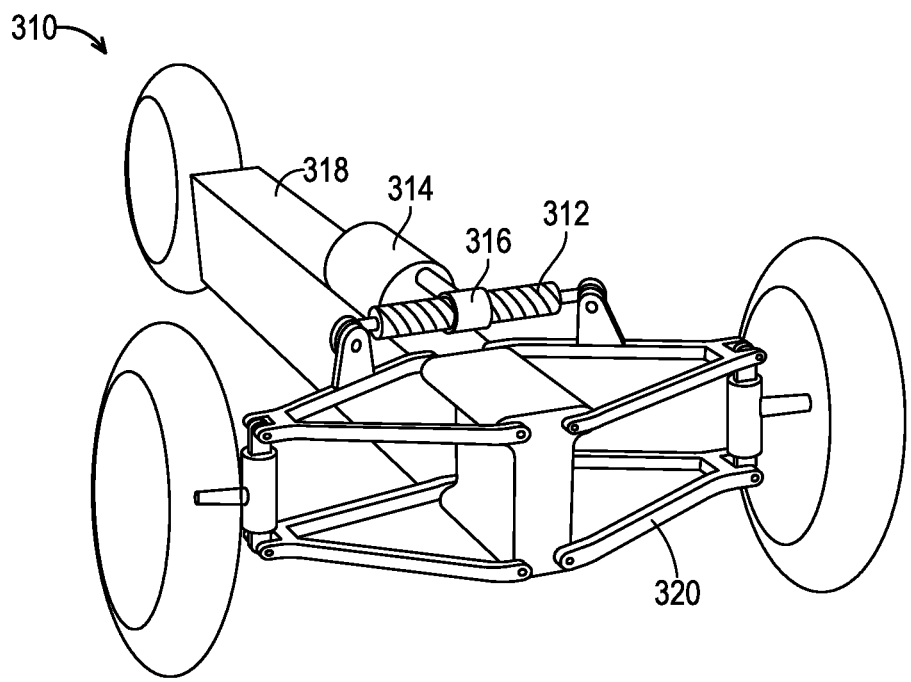
FIG. 9 is an isometric view of an illustrative vehicle including a single-shock A-frame linkage, in accordance with aspects of the present teachings.
Figure 10:
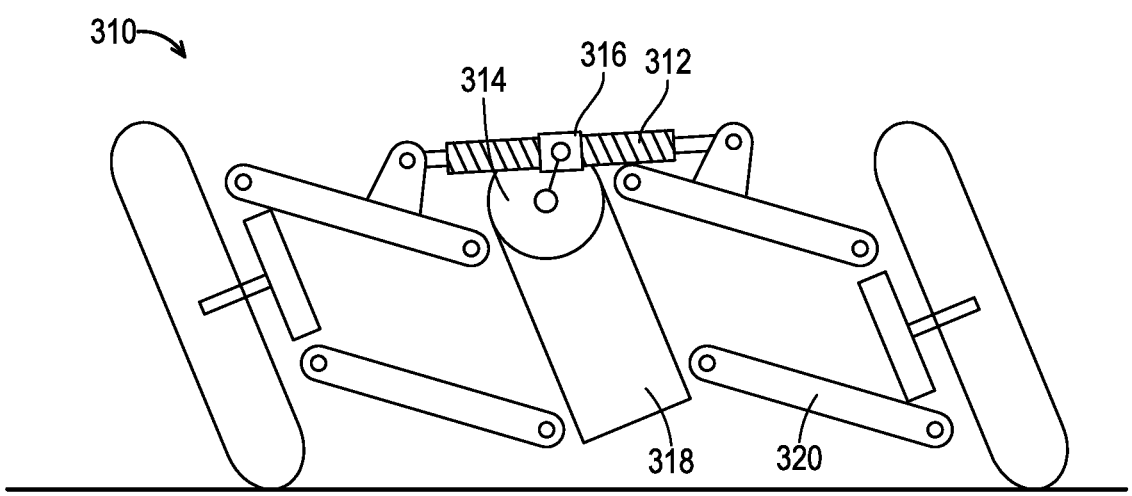
FIG. 10 is a front view of the vehicle of FIG. 9, depicting the vehicle in a tilted state.

As depicted in FIGS. 9 and 10, an illustrative vehicle 310, which is an example of vehicle 100, includes a single shock 312 having a collar 314 coupled to a tilt actuator 316. FIG. 9 shows vehicle 310 in an untilted state, and FIG. 10 shows vehicle 310 in a tilted state. Vehicle 310 includes a chassis 318 and tilt linkage 320. Shock 312 is coupled at each end to an upper bar (or bars) of linkage 320, such that applying a sideways actuating force to collar 314 causes the chassis and wheels to lean.

Figure 11:
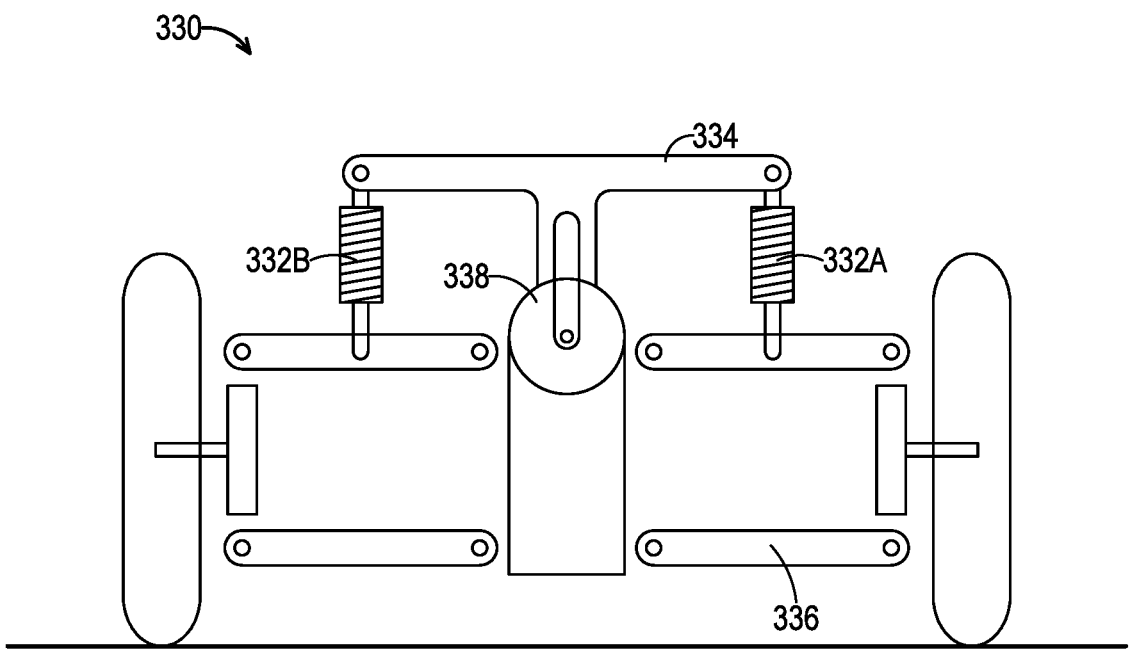
FIG. 11 is a front view of an illustrative vehicle having a double-shock A-frame linkage, in accordance with aspects of the present teachings.
Figure 12:
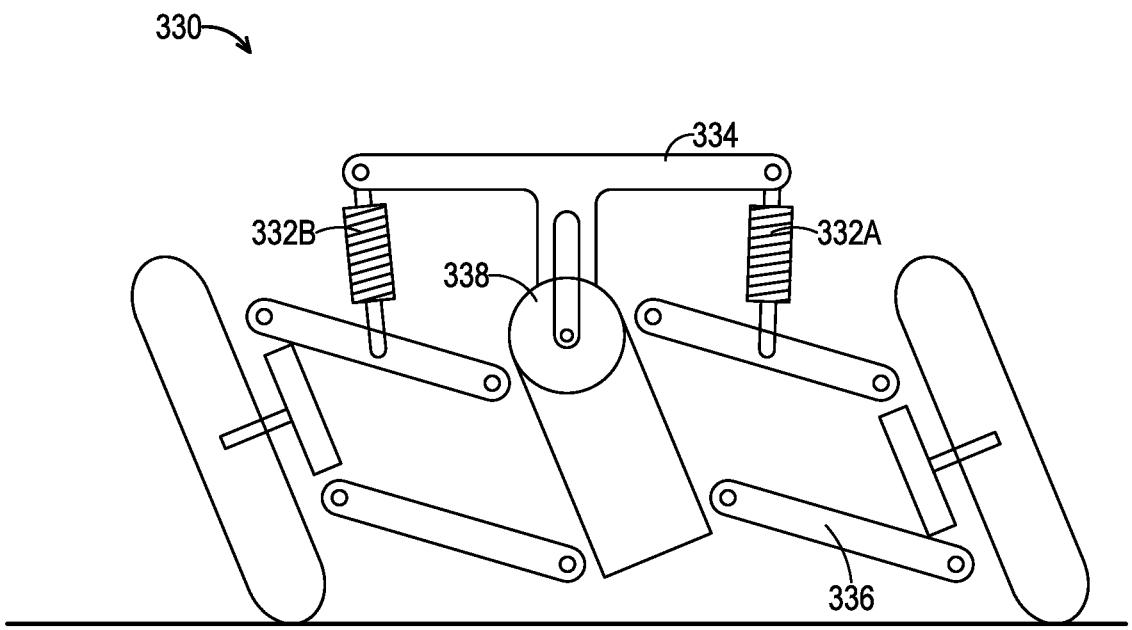
FIG. 12 is another front view of the vehicle of FIG. 11, depicting the vehicle in a tilted state.

As depicted in FIGS. 11 and 12, an illustrative vehicle 330, which is an example of 100, includes a pair of shocks 332A and 332B coupling distal ends of a T-shaped rocker 334 to a front tilt linkage 336. Upper and lower bars of linkage 336 comprise pairs of horizontal A-arms (similar to FIGS. 13-14). A base of rocker 334 is pivotably coupled to the chassis, such that applying a tilting force to the rocker using a tilt actuator 338 causes the front wheels and chassis to tilt (but not the rocker). A body of tilt actuator 338 is fixed to the chassis. In this example, the rocker may have any suitable shape, provided the pivot of the rocker is centered along the A-arm plane to which the shocks are fixed.

Figure 13:
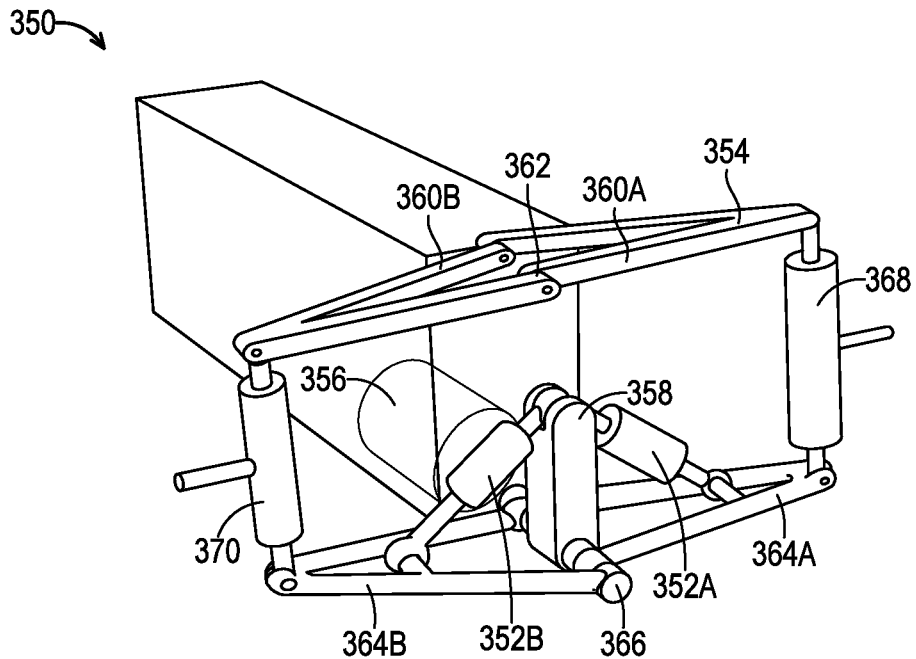
FIG. 13 is a partial isometric view of an illustrative vehicle including an A-arm linkage, in accordance with aspects of the present teachings.
Figure 14:
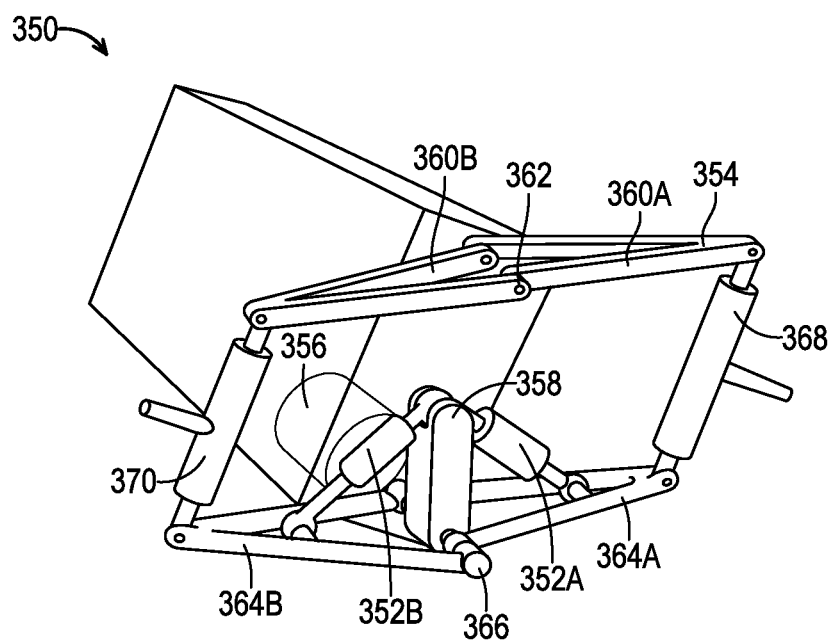
FIG. 14 is another partial isometric view of the vehicle of FIG. 13, depicting the vehicle in a titled state.

FIGS. 13 and 14 depict an illustrative vehicle 350, which is an example of vehicle 100, which includes a pair of shocks 352A and 352B coupling a tilt linkage 354 to a tilt actuator 356 and tilt rocker 358. Tilt linkage 354 of vehicle 350 is an example of the tilt linkage of FIG. 4. Accordingly, tilt linkage 354 includes a pair of upper A-arms 360A and 360B coupled at a common upper pivot joint 362, and a pair of lower A-arms 364A and 364B coupled at a common lower pivot joint 366. Kingpins 368 and 370 are coupled to outboard ends of each of the A-arms. FIG. 13 depicts vehicle 350 in an untilted state, and FIG. 14 depicts vehicle 350 in a tilted state.

Figure 15:
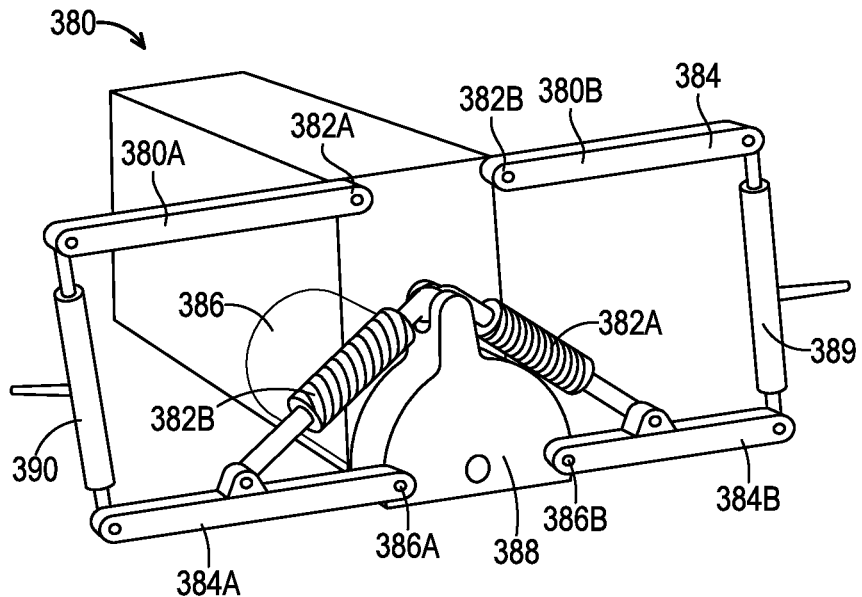
FIG. 15 is a partial isometric view of an illustrative vehicle including an A-arm linkage and spaced apart pivot joints, in accordance with aspects of the present teachings.
Figure 16:
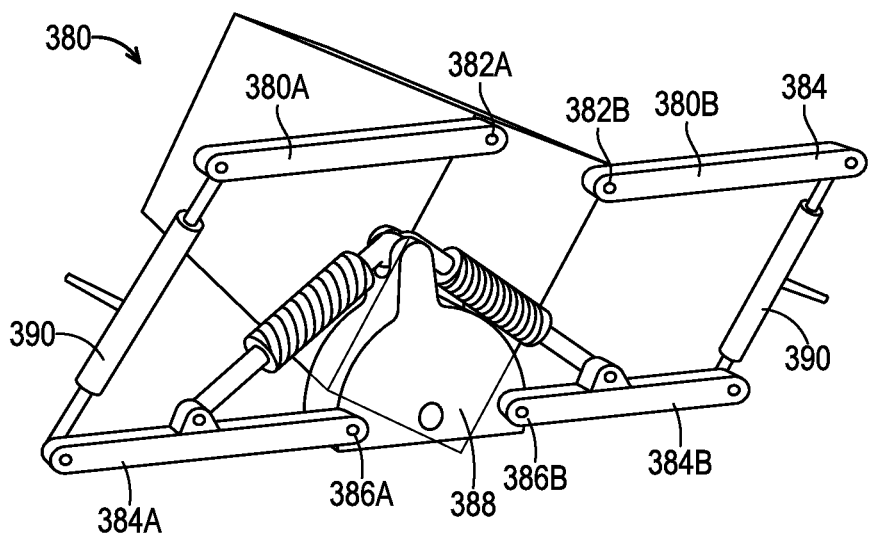
FIG. 16 is another partial isometric view of the vehicle of FIG. 15, depicting the vehicle in a tilted state.

FIGS. 15 and 16 depict an illustrative vehicle 380, which is an example of vehicle 100, which includes a pair of shocks 382A and 382B coupling a tilt linkage 384 to a tilt actuator 386 and tilt rocker 388. Tilt linkage 384 of vehicle 380 is an example of the tilt linkage of FIG. 5. Accordingly, tilt linkage 384 includes a pair of upper links 380A and 380B coupled to the chassis at respective upper pivot joints 382A and 382B, and a pair of lower links 384A and 384B coupled to the chassis at respective lower pivot joints 386A and 386B. Kingpins 389 and 390 are coupled to outboard ends of each of the upper and lower links. FIG. 15 depicts vehicle 380 in an untilted state, and FIG. 16 depicts vehicle 380 in a tilted state.

Figure 17:
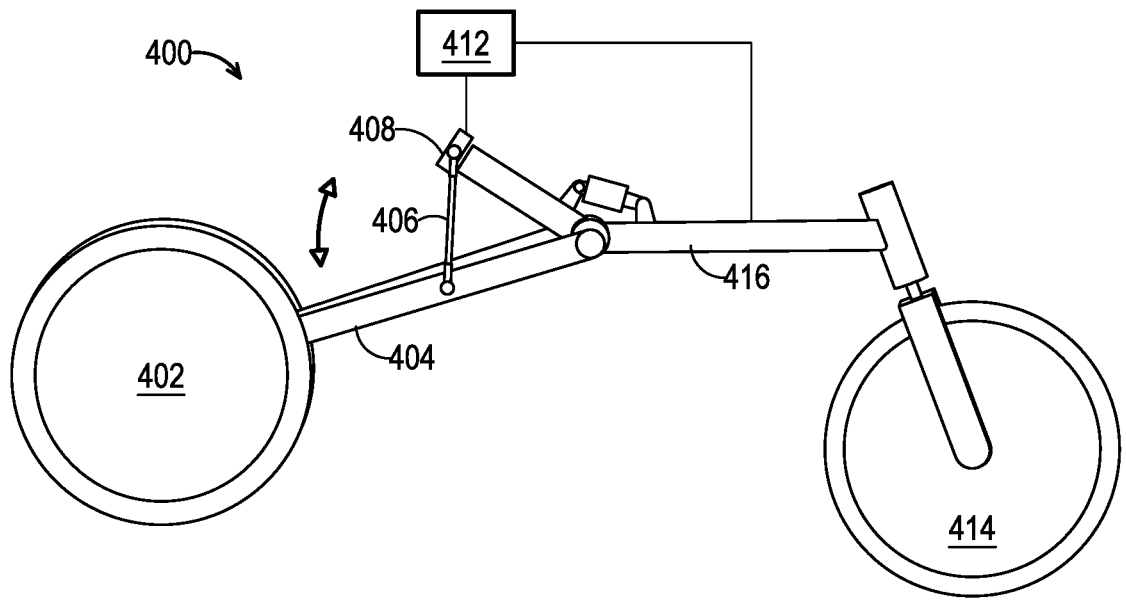
FIG. 17 is an isometric view of an illustrative vehicle having a balancer and swinging fork tilt linkage, in accordance with aspects of the present teachings.
Figure 18:
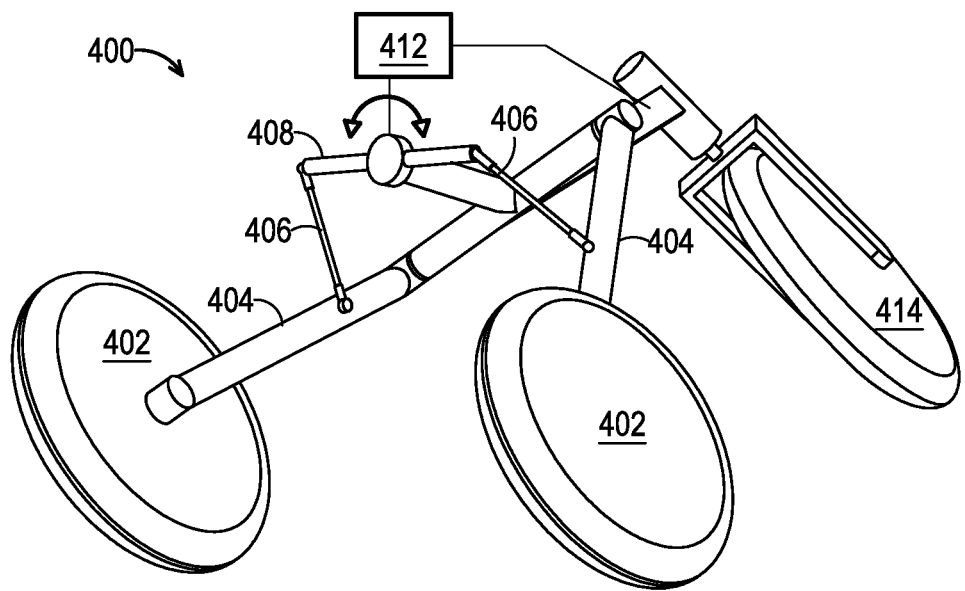
FIG. 18 is another isometric view of the vehicle of FIG. 17.

FIGS. 17 and 18 depict an illustrative vehicle 400, which is another example of vehicle 100, having a pair of articulated front wheels 402 attached to swinging forks 404. In this example, front wheels 402 are non-steering, meaning they do not have a dedicated active steering mechanism or linkage. Each of the swinging forks is coupled (e.g., by a ball jointed connecting rod 406) to an outboard end of a tilt balancer 408 configured to rotate on a pivot 410. A tilt actuator 412 is configured to rotate balancer 408 about the pivot. A gimbaling single rear wheel 414 is disposed at a rear of a chassis 416. In some examples, the single wheel may be at the front, which would operate in FTC mode when the swinging forks are actuated (i.e., tilted). Tilt actuator 412 may be disposed at any suitable location configured to rotate the balancer and/or tilt the forks.

Figure 19:
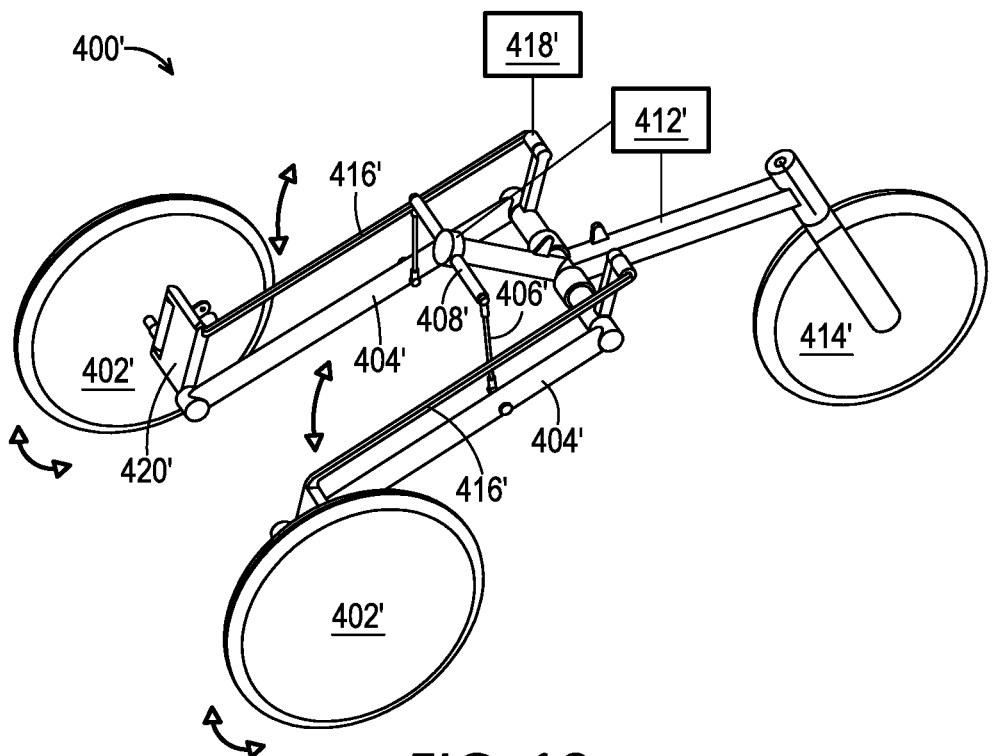
FIG. 19 is an isometric view of another illustrative vehicle having a balancer and swinging fork tilt linkage, as well as a steering linkage, in accordance with aspects of the present teachings.
Figure 20:
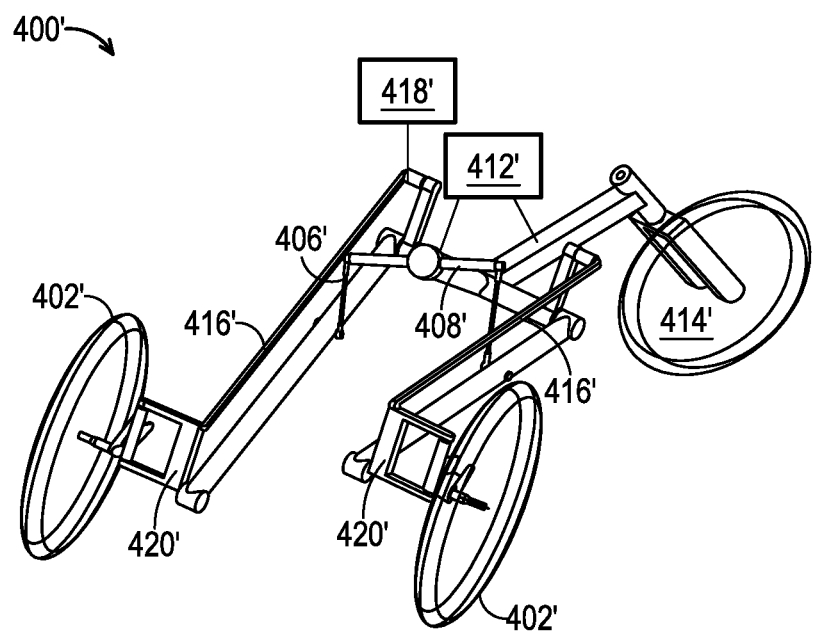
FIG. 20 is another isometric view of the vehicle of FIG. 19.

FIGS. 19 and 20 depict an illustrative vehicle 400', which is substantially similar to vehicle 400, with the addition of a steering system. Here, vehicle 400' includes a pair of articulated front wheels 402' attached to swinging forks 404'. In this example, front wheels 402' are actively steered, and have steering kingpins or knuckles 420' coupled to a steering linkage 416' and steering actuator 418'. Each of the swinging forks is coupled (e.g., by a ball jointed connecting rod 406') to an outboard end of a tilt balancer 408' configured to rotate on a pivot 410'. A tilt actuator 412' is configured to rotate balancer 408' about the pivot. A single rear wheel 414' is disposed at a rear of a chassis 416'. In some examples, the single wheel may be at the front, which would operate in FTC mode when the swinging forks are actuated (i.e., tilted). Tilt actuator 412' may be disposed at any suitable location configured to rotate the balancer and/or tilt the forks.

With kingpins on the front wheels (at the ends of the swinging forks), the rear wheel does not need to gimbal or steer, and the wheel motion in turns looks more like the four-bar linkage and/or A-arm linkages described above. Suspension systems may also be added to vehicle 400', using the methods described above with respect to four bar linkages (i.e., swingarms, mini A-Arms, linear ball splines, etc.). To keep the kingpin angles from changing when the swinging forks move, a stabilizer bar is added at the top of the kingpin assembly, effectively creating four bar linkages on both fork arms.

C. Illustrative Steering Linkages

With respect to the steering linkage (e.g., linkage 120) of three-wheeled tilting vehicles (e.g., vehicle 100, or any other described herein), the steering actuator may be mounted vertically or horizontally, and the tie rods may include a single member connecting both kingpins/knuckles to the steering crank (or to each other), and/or may be two separate members that connect respective steering pivots to the steering crank.

Figure 21:
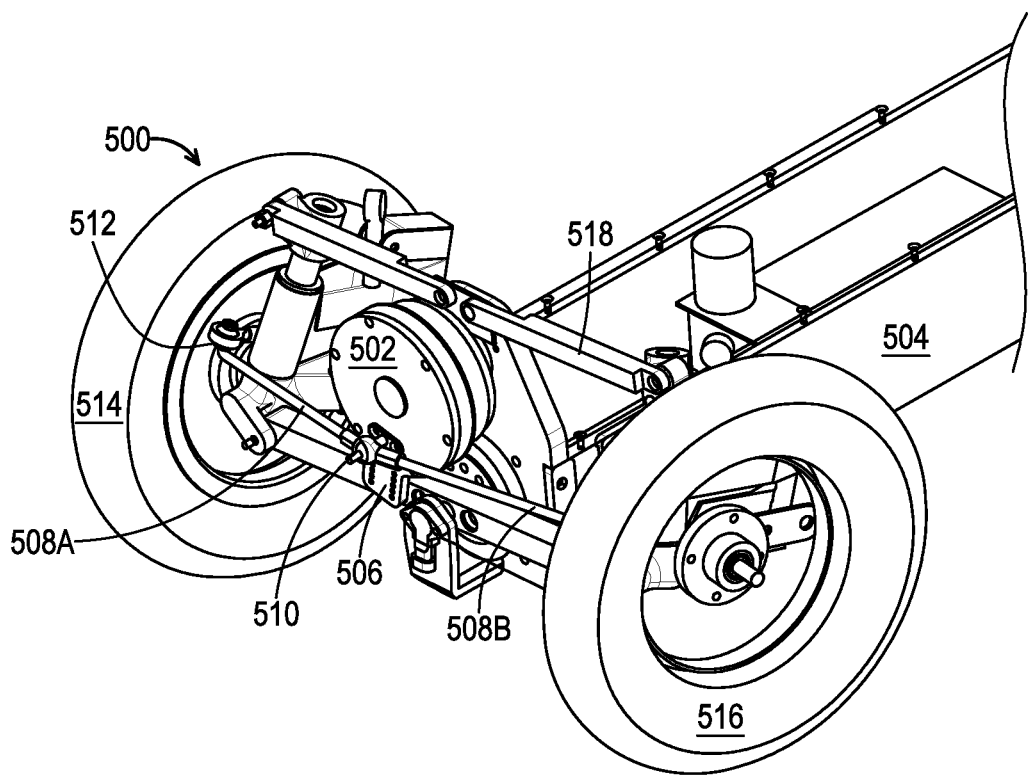
FIG. 21 is a partial isometric view of an illustrative vehicle having a pair of tie rods coupled to a common central pivot point, in accordance with aspects of the present teachings.
Figure 22:
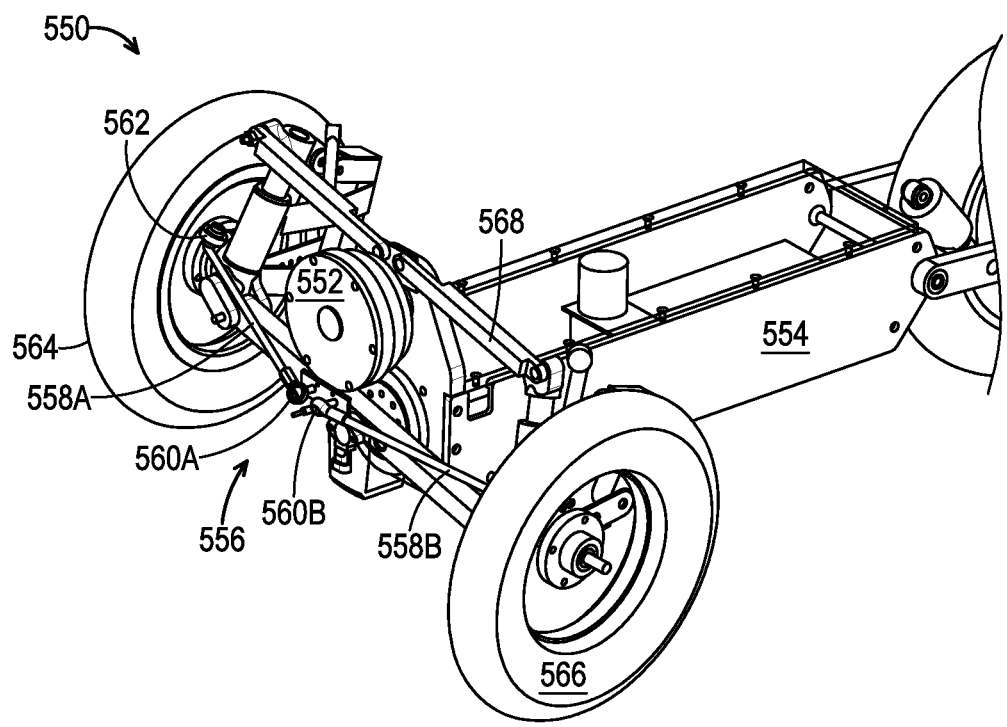
FIG. 22 is a partial isometric view of an illustrative vehicle having a pair of tie rods having unique central pivot points, in accordance with aspects of the present teachings.
Figure 23:
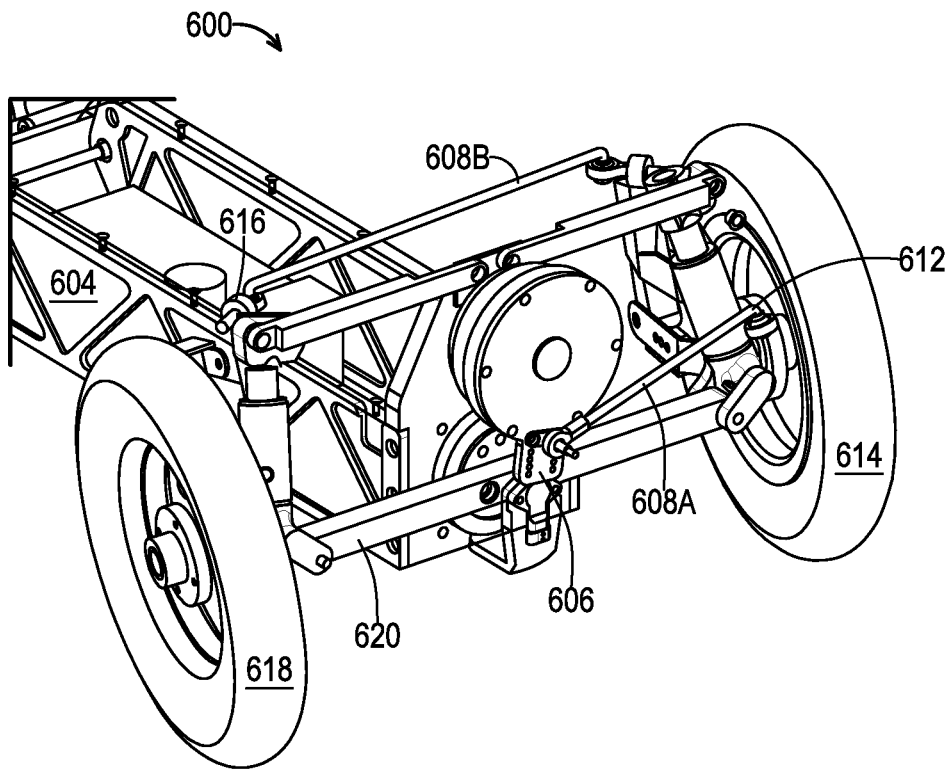
FIG. 23 is a partial isometric view of an illustrative vehicle having an asymmetric tie rod configuration, in accordance with aspects of the present teachings.

FIGS. 21-23 depict illustrative steering linkages suitable for use in tilting vehicles of the present disclosure, wherein the steering actuator is mounted in a horizontal orientation. In other words, the axis of rotation of the actuator is substantially horizontal and/or parallel to a centerline of the chassis. Illustrative vehicles are depicted in FIGS. 21-23, for context.

FIG. 21 depicts an illustrative steering linkage 500 suitable for use with vehicles of the present disclosure. Steering linkage 500 is an example of steering linkage 120. In this example, a steering actuator 502 is mounted horizontally on a front end of a chassis 504. A steering crank 506 is rotated by the actuator, and a pair of tie rods 508A and 508B are coupled to the steering crank at a single pivot joint 510. Outboard ends of tie rod 508A and tie rod 508B are coupled to respective steering knuckles 512 of front wheels 514 and 516. A tilt linkage 518 is coupled to the front wheels, and is depicted as a four bar linkage, but may include any suitable tilt linkage described herein.

FIG. 22 depicts another illustrative steering linkage 550 suitable for use with vehicles of the present disclosure. Steering linkage 550 is an example of steering linkage 120. In this example, a steering actuator 552 is mounted horizontally on a front end of a chassis 554. A steering crank 556 is rotated by the actuator, and a pair of tie rods 558A and 558B are coupled to the steering crank at a spaced-apart pivot joints 560A and 560B. Outboard ends of tie rod 558A and tie rod 558B are coupled to respective steering knuckles 562 of front wheels 564 and 566. A tilt linkage 568 is coupled to the front wheels, and depicted as a four bar linkage, but may include any suitable tilt linkage described herein.

FIG. 23 depicts another illustrative steering linkage 600 suitable for use with vehicles of the present disclosure. Steering linkage 600 is an example of steering linkage 120. In this example, a steering actuator 602 is mounted horizontally on a front end of a chassis 604. A steering crank 606 is rotated by the actuator, and a single tie rod 608A is coupled to the steering crank at a single pivot joint 610. An outboard end of tie rod 608A is coupled to a steering knuckle 612 of one front wheel 614. A second tie rod 608B is coupled to an opposite side of the same kingpin, and coupled at another end to a second steering knuckle 616 of another front wheel 618. Accordingly, rotation of the steering actuator rotates the steering crank, which transmits motion to one front wheel via a first tie rod and a first steering knuckle. The opposite front wheel is rotated in unison by way of a second tie rod connecting the first steering knuckle to the second steering knuckle of the second wheel. In this example, the two tie rods are on opposite sides of the kingpins. In other words, one of the tie rods is disposed in front of the kingpins and the other is disposed behind the kingpins. A tilt linkage 620 is coupled to the front wheels, and depicted as a four bar linkage, but may include any suitable tilt linkage described herein.

FIGS. 24-27 depict illustrative steering linkages suitable for use in tilting vehicles of the present disclosure, wherein the steering actuator is mounted in a vertical orientation. In other words, the axis of rotation of the actuator is substantially vertical or upright, and/or orthogonal to a centerline of the chassis. Illustrative vehicles are depicted in FIGS. 24-27, for context.

Figure 24:
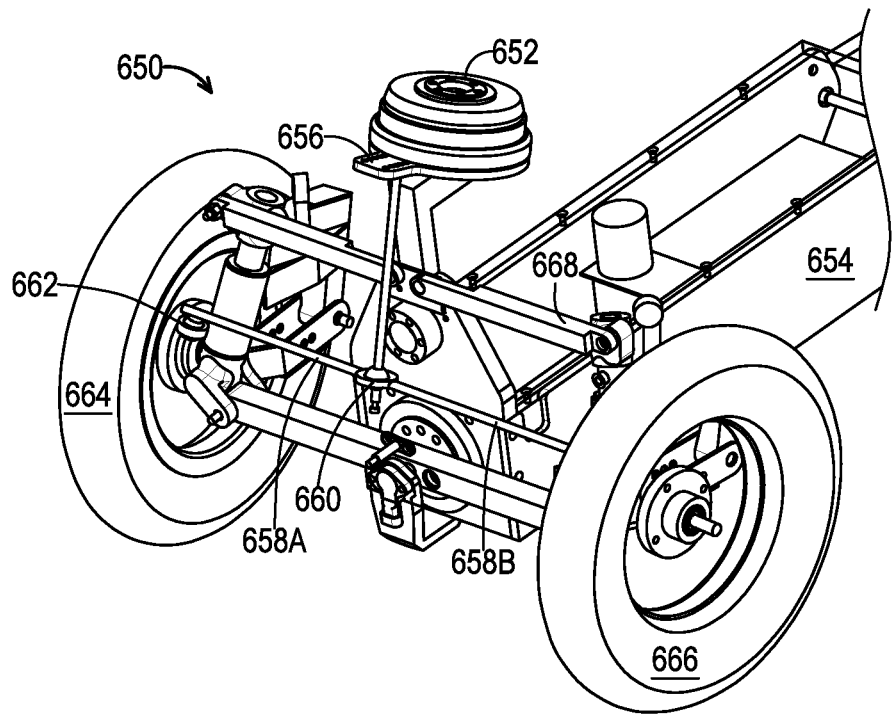
FIG. 24 is a partial isometric view of an illustrative vehicle having a single (or effectively single) tie rod, in accordance with aspects of the present teachings.

FIG. 24 depicts an illustrative steering linkage 650 suitable for use with vehicles of the present disclosure. Steering linkage 650 is an example of steering linkage 120. In this example, a steering actuator 652 is mounted vertically on a front end of a chassis 654. A steering crank 656 is rotated by the actuator, and a tie rod having two halves 658A and 658B is coupled to a connecting rod of the steering crank at a single pivot joint 660. Outboard ends of tie rod half 658A and tie rod half 658B are coupled to respective steering knuckles 662 of front wheels 664 and 666. A tilt linkage 668 is coupled to the front wheels, and is depicted as a four bar linkage, but may include any suitable tilt linkage described herein. In this example, the steering tie rods are in front of the kingpin axes. Following examples (FIGS. 25-27) have the tie rods located behind the kingpin axes. Overall span or width of the tie rods is wider in the example of FIG. 24 than in the following examples of FIGS. 25-27, to facilitate proper Ackermann geometry.

Figure 25:
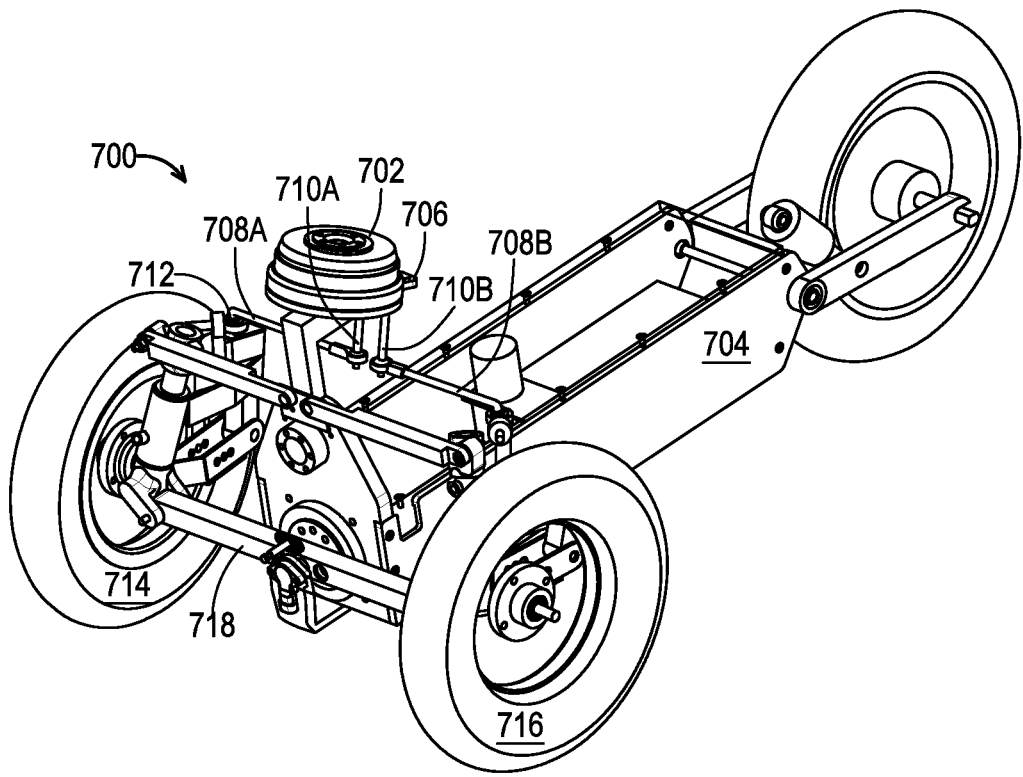
FIG. 25 is a partial isometric view of another illustrative vehicle including a pair of tie rods having unique central pivot points, in accordance with aspects of the present teachings.

FIG. 25 depicts an illustrative steering linkage 700 suitable for use with vehicles of the present disclosure. Steering linkage 700 is an example of steering linkage 120. In this example, a steering actuator 702 is mounted vertically on a front end of a chassis 704. A steering crank 706 is rotated by the actuator, and a pair of tie rods 708A and 708B are coupled to the respective connecting rods of the steering crank at a respective pivot joints 710A and 710B. Outboard ends of tie rod 708A and tie rod 708B are coupled to respective steering knuckles 712 of front wheels 714 and 716. A tilt linkage 718 is coupled to the front wheels, and is depicted as a four bar linkage, but may include any suitable tilt linkage described herein.

Figure 26:
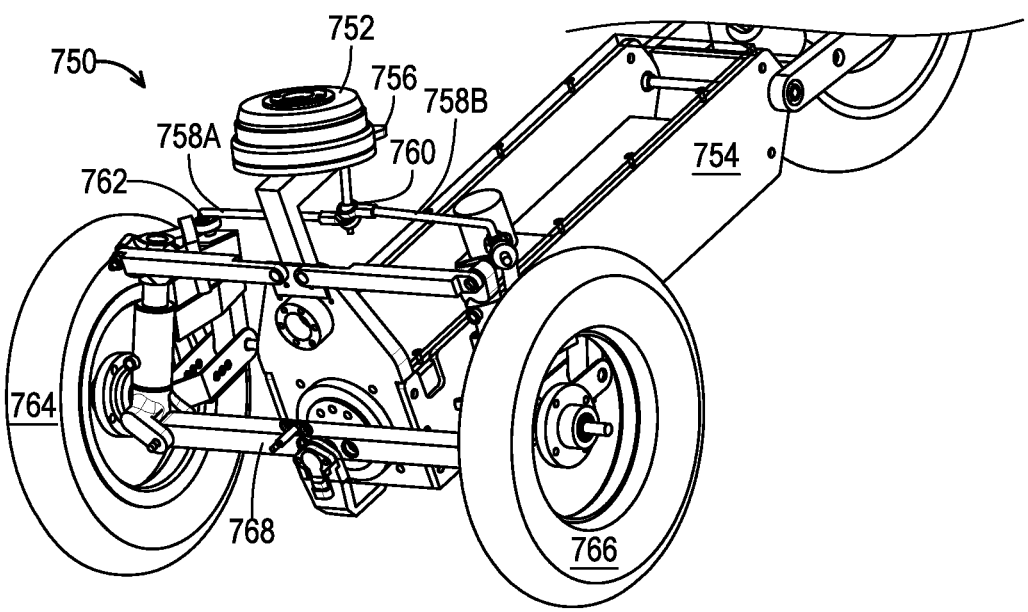
FIG. 26 is a partial isometric view of another illustrative vehicle including a pair of tie rods having a common central pivot point, in accordance with aspects of the present teachings.

FIG. 26 depicts an illustrative steering linkage 750 suitable for use with vehicles of the present disclosure. Steering linkage 750 is an example of steering linkage 120. In this example, a steering actuator 752 is mounted vertically on a front end of a chassis 754. A steering crank 756 is rotated by the actuator, and a pair of tie rods 758A and 758B are coupled to a connecting rod of the steering crank at a single pivot joint 760 (by respective ball joints). Outboard ends of tie rod 758A and tie rod 758B are coupled to respective steering knuckles 762 of front wheels 764 and 766. A tilt linkage 768 is coupled to the front wheels, and is depicted as a four bar linkage, but may include any suitable tilt linkage described herein.

Figure 27:
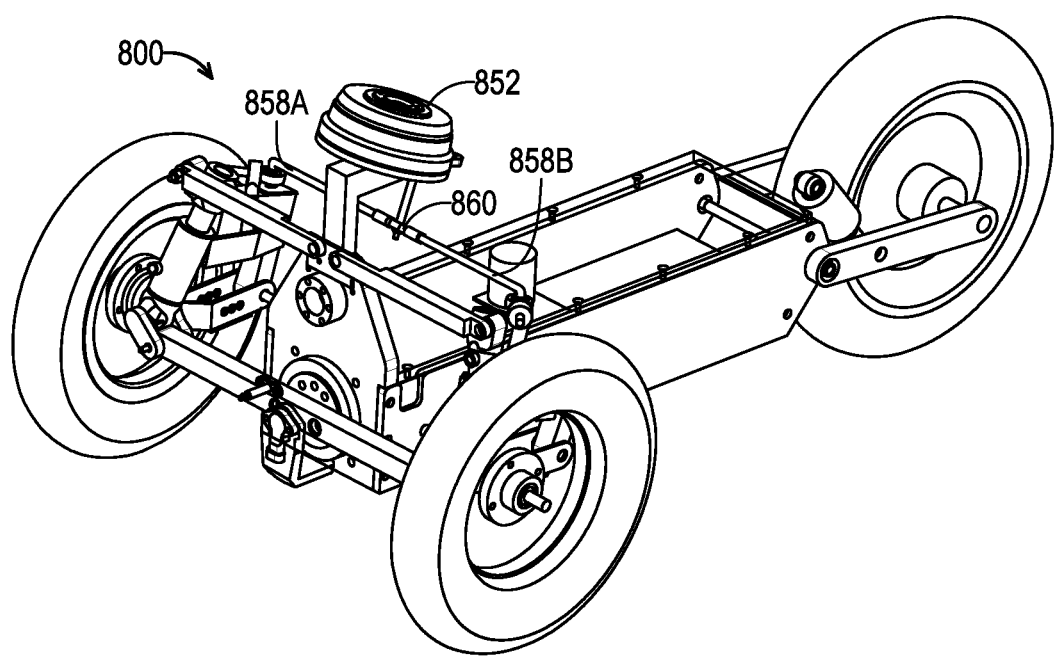
FIG. 27 is a partial isometric view of an illustrative vehicle having a single or effectively single tie rod, in accordance with aspects of the present teachings.

FIG. 27 depicts an illustrative steering linkage 800 suitable for use with vehicles of the present disclosure. Steering linkage 800 is substantially identical to linkage 750, but with a single connector 860 utilized to connect inboard ends of a pair of tie rods 858A and 858B to a single connecting rod of the actuator crank of a steering actuator 852. In other words, tie rods 858A and 858B are effectively a single tie rod with a joint connector in the middle, as opposed to two tie rods with respective connectors on inboard ends.

D. Illustrative Tilt-Lock Systems

As shown in FIGS. 28-37, this section describes illustrative tilt-lock systems, i.e., systems configured to selectively prevent an autonomous tilting vehicle from tilting, and/or to selectively limit the range of angles over which the vehicle is able to tilt. A tilt-lock system may be convenient for temporarily locking the vehicle in an upright position for storage, transport, loading of cargo, low-speed steering, and/or any other suitable purpose. In some cases, a tilt-lock device is configured to be activated autonomously by the vehicle. Alternatively, or additionally, a tilt-lock device may be configured to be actuated manually or semi-automatically by a user. An advantage of a manually actuatable tilt-lock device is that the vehicle can be tilt-locked even when the vehicle power supply is shut off, removed, or depleted.

Figure 28:
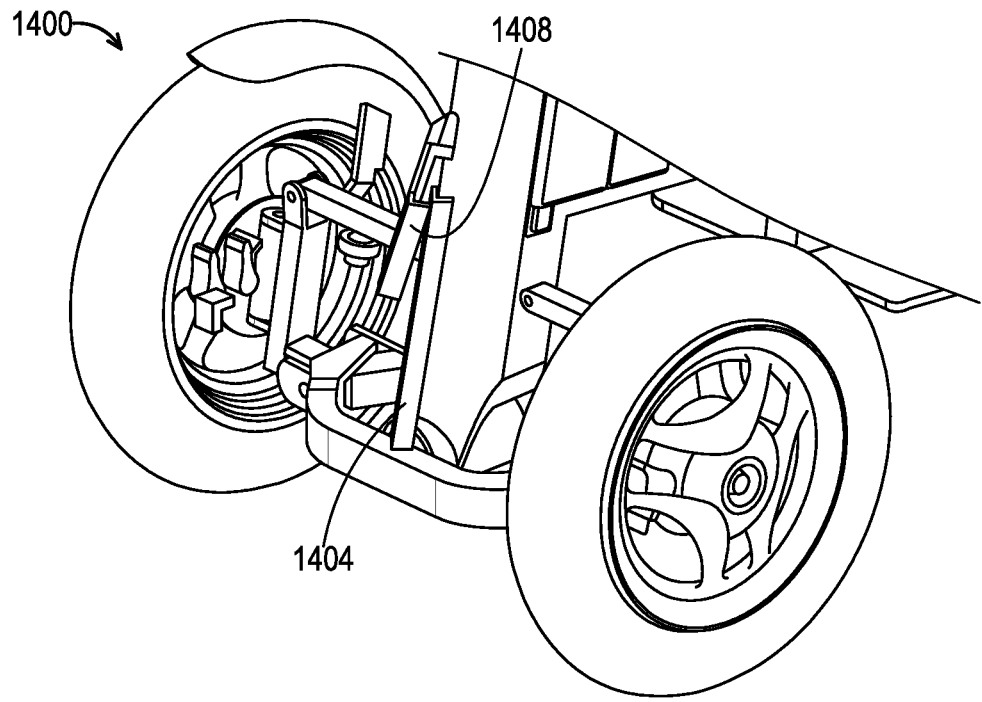
FIG. 28 is a partial isometric view of an illustrative vehicle having a tilt-lock device comprising a pair of nesting plates, in accordance with aspects of the present teachings, depicting the mechanism unlocked.
Figure 29:
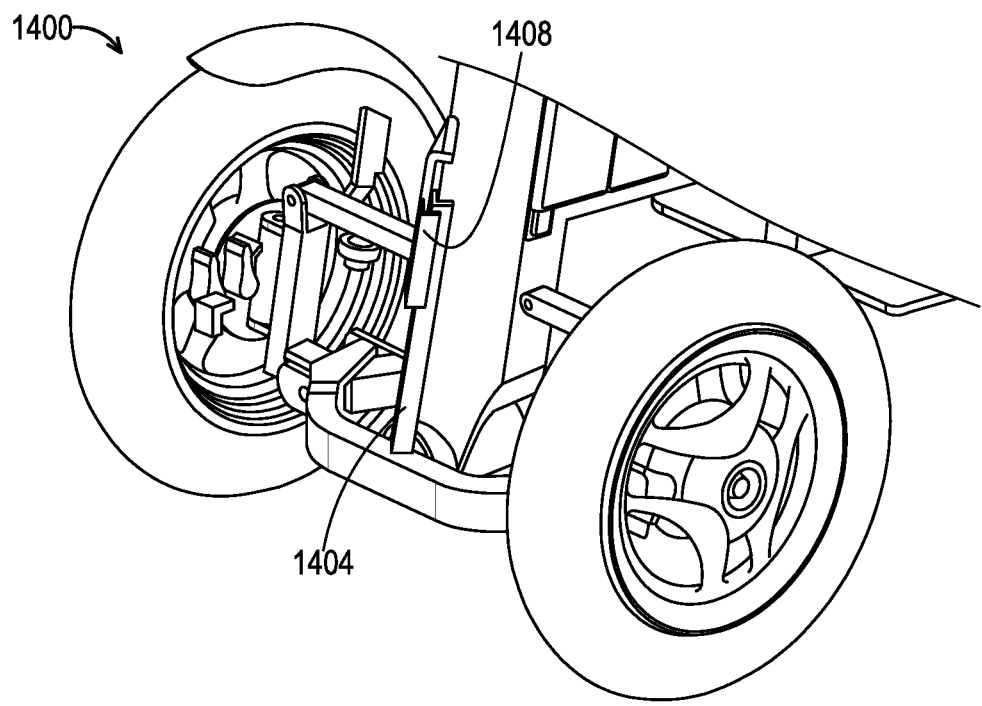
FIG. 29 is another partial isometric view of the vehicle of FIG. 28, depicting the tilt-lock device locked.

FIGS. 28-29 depict an illustrative tilt-lock device 1400 comprising two V-shaped plates (e.g., lengths of angle iron). An inner plate 1404 is rigidly coupled to a lower bar of the vehicle's tilting linkage. Inner plate 1404 is elongate with a V-shaped cross-section and extends upward from a central portion of the linkage bar.

An outer plate 1408, which is also V-shaped, is pivotably coupled to the vehicle chassis. Outer plate 1408 is configured to pivot between a first position wherein inner plate 1404 nests within the outer plate (see FIG. 28), and a second position wherein the outer plate is spaced from the inner plate (see FIG. 29). In the first position, outer plate 1408 retains inner plate 1404, such that the inner plate is prevented from moving laterally relative to the outer plate. In this manner, when outer plate 1408 is in the first position, the outer plate prevents the vehicle chassis from tilting relative to the lower linkage bar. Accordingly, the vehicle is tilt-locked when outer plate 1408 is in the first position. When outer plate 1404 is in the second position, inner plate 1404 is free to move laterally relative to the outer plate, allowing the vehicle chassis to tilt.

Depending on the size and shape of the inner and outer plates, and the size of any gap between the plates in the locked position, tilt-lock device 1400 may completely prevent the vehicle from tilting, or may limit the range of tilt to a small angular span. In some examples, the position of the outer plate may be selected (e.g., by a user or by a controller of the vehicle) to allow a desired range of tilt, including no tilt.

Figure 30:
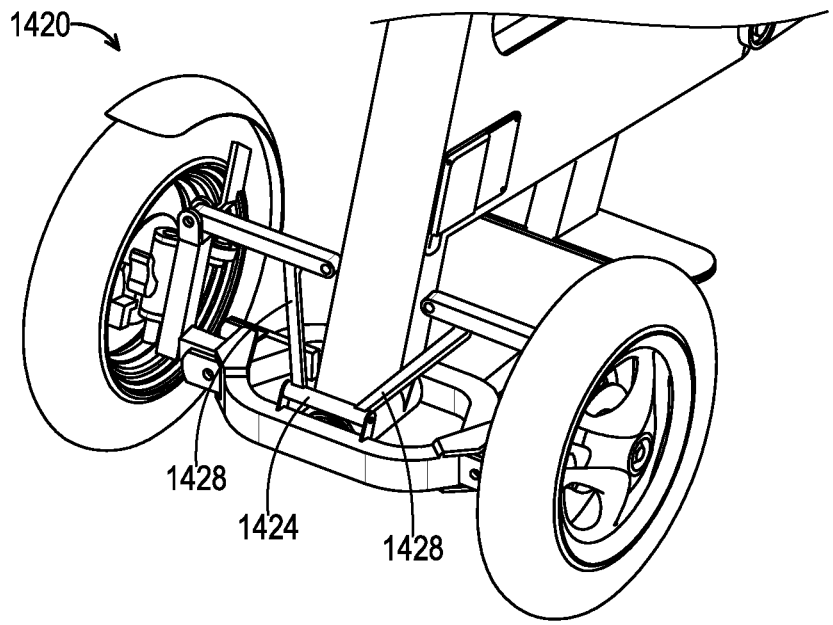
FIG. 30 is a partial isometric view of an illustrative vehicle having a tilt-lock device comprising a pivotable inverted bracket, in accordance with aspects of the present teachings, depicting the mechanism locked.
Figure 31:
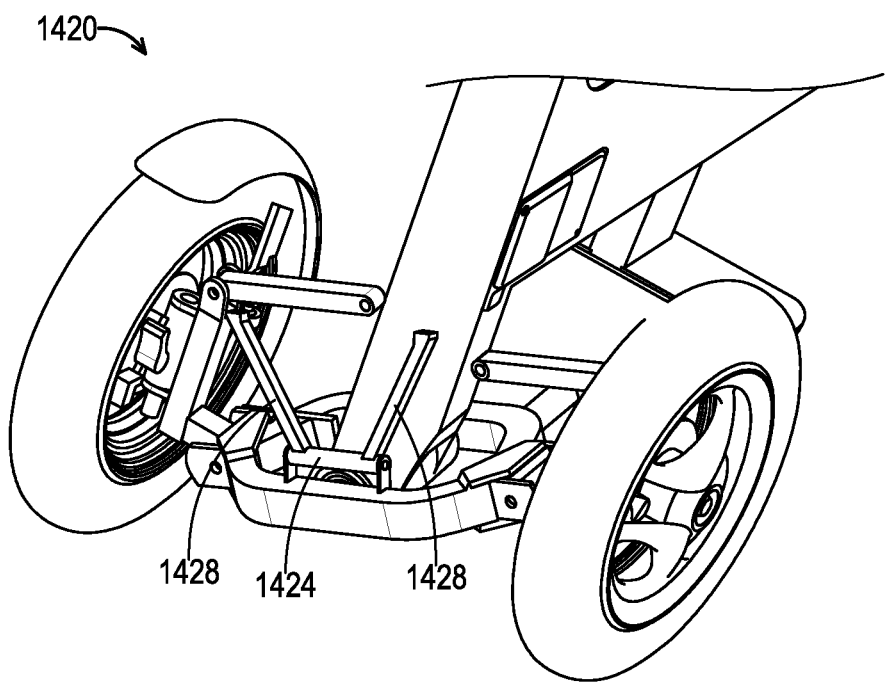
FIG. 31 is another partial isometric view of the vehicle of FIG. 30, depicting the tilt-lock device unlocked.

FIGS. 30-31 depict another illustrative tilt-lock device 1420 comprising a U-shaped bracket 1424 pivotably mounted to a lower bar of the vehicle's tilt linkage. Bracket 1424 has two arms 1428 dimensioned such that, when clamp 1424 is in a locked position, ends of the arms engage a top portion of the tilt linkage in a manner that prevents the chassis from tilting. In the example depicted in FIG. 30, when bracket 1424 is in the tilt-locked position, ends of arms 1428 are jammed underneath respective bars of a split top-bar of a four-bar tilt linkage. This prevents the chassis from tilting by preventing either portion of the split top bar from moving downward. However, in general bracket 1424 may be used in conjunction with any suitable tilt linkage.

FIG. 31 depicts bracket 1424 pivoted away from the top portion of the tilt linkage (e.g., away from the vehicle chassis, in a forward direction). In this position, bracket 1424 is spaced from the top portion of the linkage, such that arms 1428 do not prevent the top portion of the linkage from moving. Accordingly, the vehicle is unlocked (i.e., free to tilt).

In the depicted example, arms 1428 are rigidly coupled together and therefore pivot together when bracket 1424 is pivoted. In other examples, the arms of the bracket may be configured to pivot independently.

Figure 32:
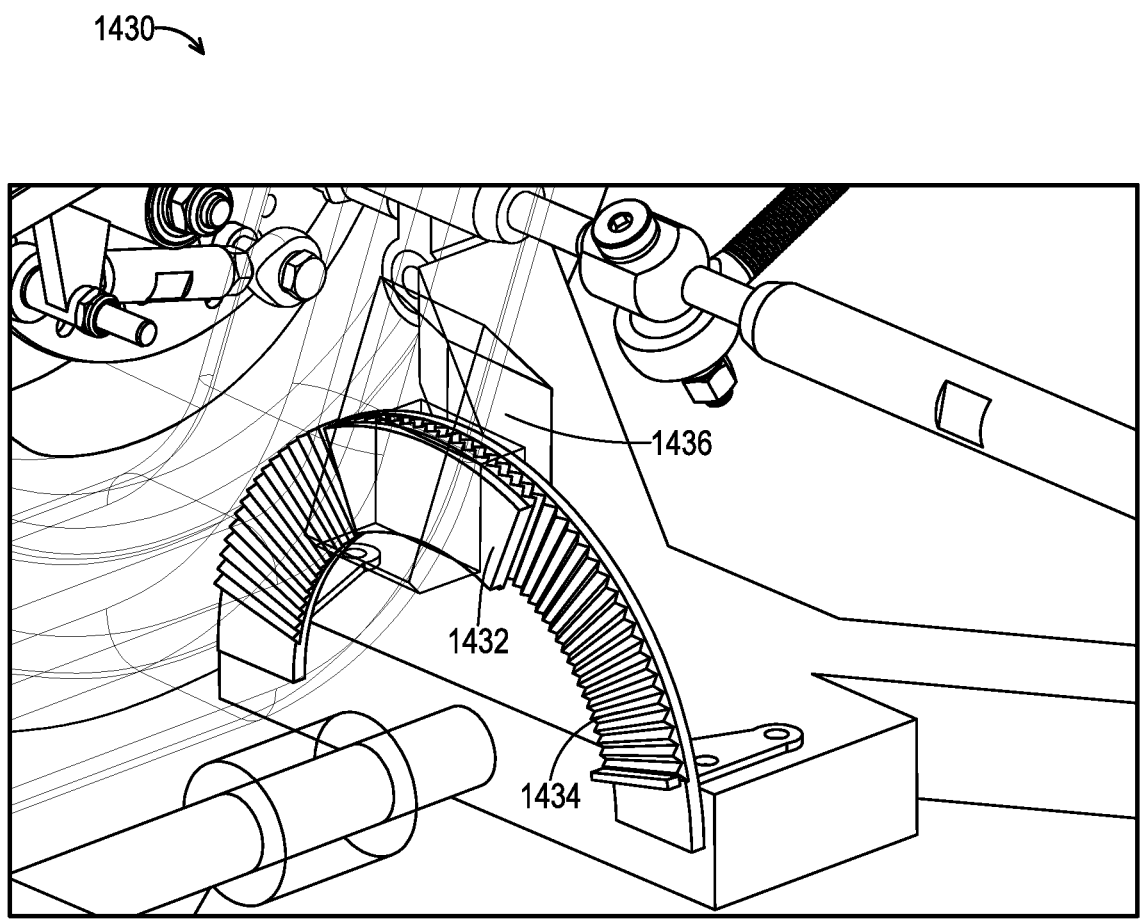
FIG. 32 is a partial isometric view of an illustrative tilt-lock device comprising a knurled caliper and a knurled disc, in accordance with aspects of the present teachings.

FIG. 32 depicts yet another illustrative tilt-lock device 1430. Tilt-lock device 1430 comprises a knurled caliper 1432 configured to mate with a knurled disc 1434. Disc 1434 comprises a partial circle concentrically disposed around the pivoting axis of the chassis. Caliper 1432 is fixed to the tilting chassis (depicted in FIG. 32 as partially transparent), and is positioned such that when the chassis tilts, the caliper is moved along disc 1434. A locking actuator 1436 is configured to selectively clamp caliper 1432 against disc 1434, thereby preventing the caliper from moving relative to the disc and thus tilt-locking the vehicle. When locking actuator 1436 unlocks caliper 1432 from disc 1434 (e.g., by moving the caliper away from the disc such that the complementary knurled surfaces of the caliper and disc are disengaged), it becomes possible for the chassis to tilt.

Tilt-lock device 1430 may be configured to tilt-lock the vehicle at any orientation along disc 1434, or at a subset of angles along the disc. That is, the vehicle chassis may be lockable in an upright position or in a tilted position at a selected tilt angle. This may, e.g., allow the vehicle to be stored or a transported in a locked tilted position.

Figure 33:
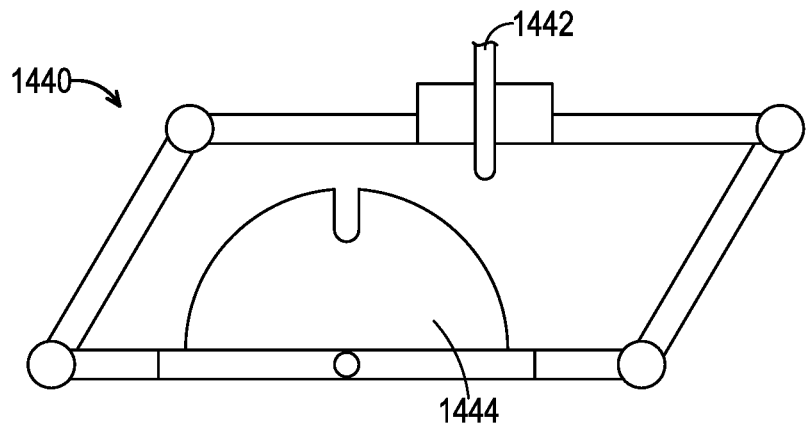
FIG. 33 is a front view of an illustrative tilt-lock device comprising a pin and a slotted disc, in accordance with aspects of the present teachings, depicting the device unlocked and a tilting linkage tilted.
Figure 34:
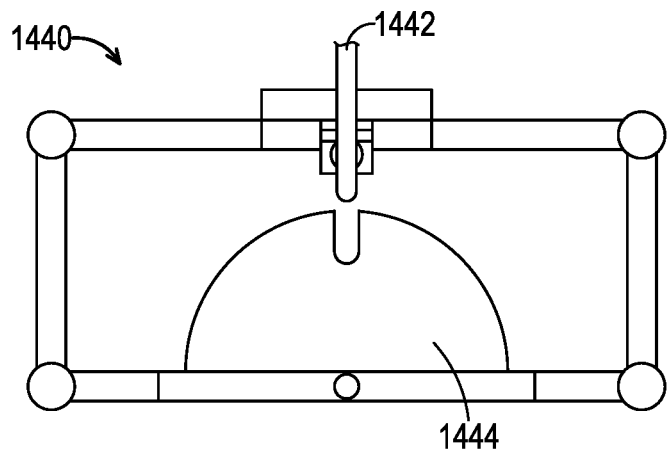
FIG. 34 is another front view of the device of FIG. 33, depicting the linkage upright and the device still unlocked.
Figure 35:
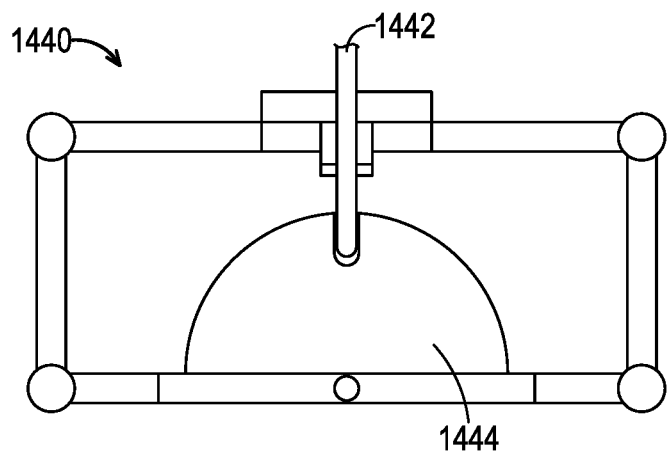
FIG. 35 is yet another front view of the device of FIG. 33, depicting the device locked.

FIGS. 33-35 depict yet another illustrative tilt-lock device 1440 comprising a pin 1442 attached to a top bar of the tilt linkage and a slotted disc 1444 attached to a bottom bar of the tilt linkage. Pin 1442 is selectively transitionable between a locked position wherein the pin is received in the slot of disc 1444, and an unlocked position wherein the pin is spaced from the slot. When the pin is disposed within the slot of the disc, the vehicle chassis is prevented from tilting.

In the depicted example, pin 1442 in the locked position extends downward from the top linkage bar far enough to be received in the slot, and in the unlocked position is retracted away from the bottom bar far enough to avoid the slot. Pin 1442 may be moved between the locked and unlocked positions by a linear actuator and/or any other suitable mechanism.

In the depicted example, the disc includes only a single slot disposed over a central portion of the bottom linkage bar. Accordingly, the vehicle is lockable when the pin is disposed over the central portion of the bottom bar, which in this case corresponds to the chassis being in an upright, untilted position. However, in other examples, the disc may additionally or alternatively include slots positioned laterally outboard of center, and/or one or more locking pins may be positioned outboard of center, enabling the vehicle to be locked in a tilted position. In some examples, the pin is fixed to the tilting vehicle chassis rather than to the tilt linkage.

Figure 36:
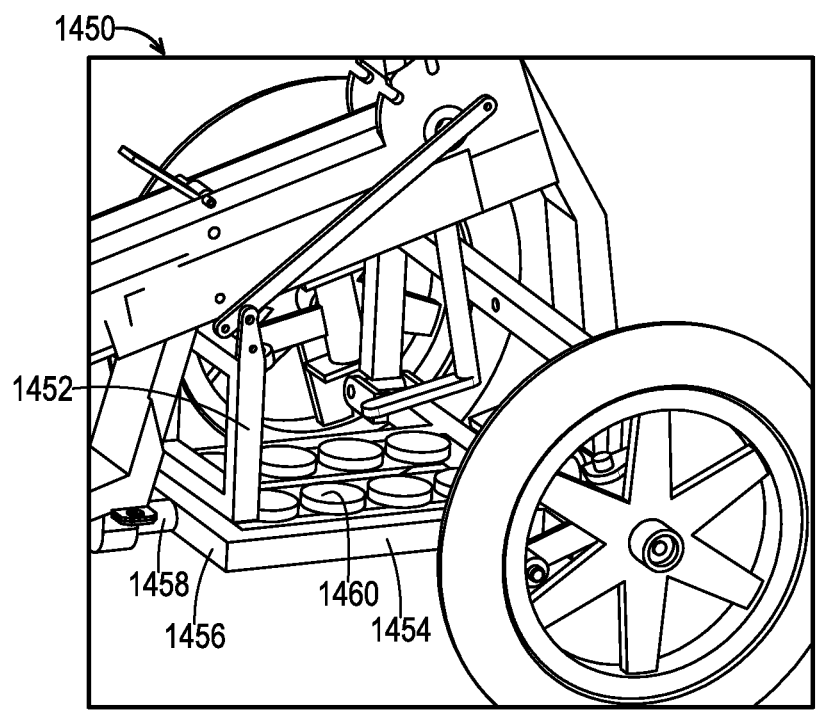
FIG. 36 is a partial isometric view of an illustrative vehicle including a tilt-lock device comprising a pivotable bracket, which is depicted in a locked state, and further including a plurality of wireless charging coils, in accordance with aspects of the present teachings.
Figure 37:
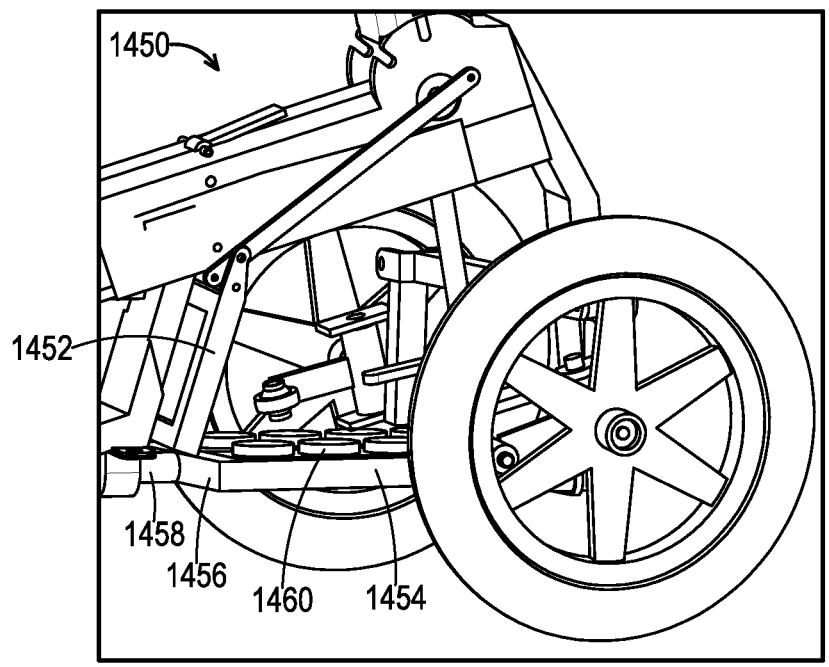
FIG. 37 is another partial isometric view of the vehicle of FIG. 36, depicting the tilt-lock device unlocked.

FIGS. 36-37 depict yet another illustrative tilt-lock device 1450 comprising a bracket 1452 disposed underneath the vehicle chassis and pivotably coupled to the chassis. A frame 1454 projects rearward from a portion of the tilt linkage (here, from the bottom bar of a four-bar tilt linkage). Frame 1454 has a first portion 1456 and a second portion 1458. Bracket 1452 is transitionable between a first position, in which the bracket is positioned adjacent first portion 1456, and a second position, in which the bracket is positioned adjacent second portion 1458. First portion 1456 comprises a bar extending in a lateral direction. When bracket 1452 is in the first position, a bottom bar of the bracket is aligned with first portion 1456 and is prevented by the first portion from tilting. Accordingly, the first position is a locked position. Second portion 1458 has a much smaller lateral extent than bracket 1452, such that when the bracket is in the second position, the bracket is not inhibited from tilting. Accordingly, the second position is an unlocked position.

In the example depicted in FIGS. 36-37, frame 1454 supports a plurality of wireless charging coils 1460, which are described further below in Section G.

In some examples, an autonomous tilting vehicle can be tilt-locked simply by locking the tilt motor (that is, the motor configured to tilt the vehicle) in a selected position. For example, the tilt motor can be configured to be locked in a position that keeps the vehicle chassis upright when the tilt motor is powered down. Tilt-locking the motor in this manner can allow the vehicle to be restrained against unwanted tilt without the inclusion of dedicated tilt-lock mechanisms, such as those described above. In examples of vehicles that do include dedicated tilt-lock mechanisms, the motor can also be tilt-lockable (e.g., for redundancy). In some examples, the tilt actuator may comprise a motor configured to have maximum torque when the motor is off. In other words, a motor with low or no back-drive capability may function as a primary or supplementary tilt locking device.

E. Illustrative Autonomous Delivery Vehicle

As shown in FIGS. 38-45, this section describes an illustrative autonomous delivery vehicle 1800. Vehicle 1800 is another example of an autonomous tilting vehicle, described above.

Figure 38:
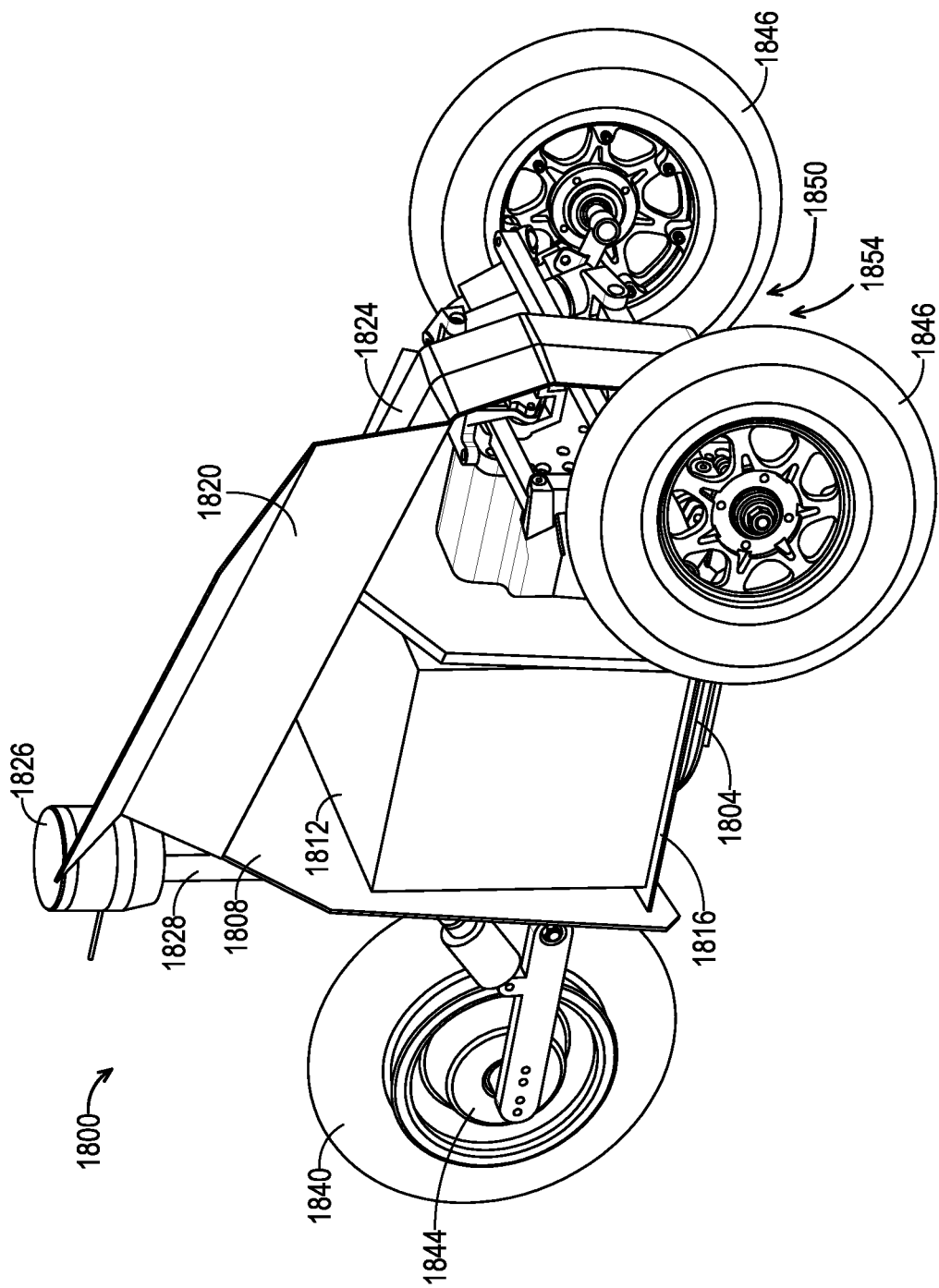
FIG. 38 is an isometric view of an illustrative autonomous tilting delivery vehicle, in accordance with aspects of the present teachings.

FIG. 38 is an isometric view of vehicle 1800. As depicted in FIG. 38, vehicle 1800 has a vehicle chassis 1804 comprising a cargo compartment 1808 configured to contain cargo, such as an illustrative package 1812. Compartment 1808 has a floor 1816 and at least one gullwing door 1820 pivotably coupled to an upper frame portion 1824 of the chassis, such that the door opens upward. Upper frame portion 1824 extends along a centerline of the vehicle and is coupled at a front end of the vehicle to a bottom portion of the chassis. This allows upper frame portion 1824 to protect portions of the front wheel linkage from damage and debris.

A sensor module 1826 is disposed on chassis 1804, supported by a platform 1828 such that the sensor module is positioned relatively high on the chassis (e.g., higher than all other vehicle components, except for door 1820 when the door is open). The height may be advantageous in cases wherein the sensor module includes LIDAR equipment and/or other sensors that could be hindered by encroaching vehicle components. In this example, sensor module 1826 is disposed near a rear end of the vehicle, but in general the sensor module may be disposed at any suitable location.

Vehicle 1800 further includes a rear wheel 1840 driven by a hub motor 1844 configured to propel the vehicle in forward and reverse directions. Two front wheels 1846 are disposed at a front end of the vehicle and linked together by a tilting linkage and a steering linkage, as shown in FIG. 39.

Figure 39:
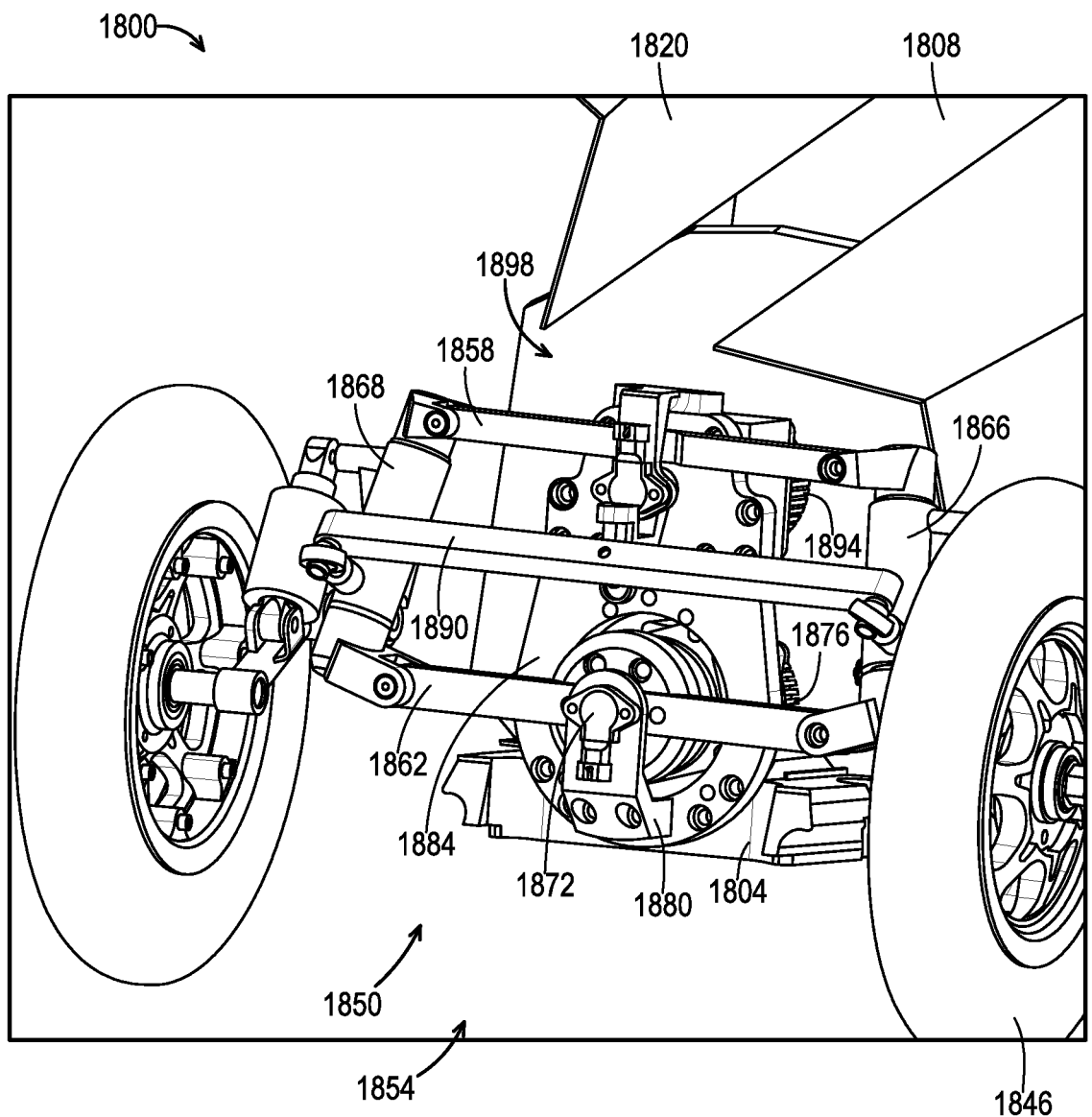
FIG. 39 is a partial front view of the vehicle of FIG. 38, depicting steering and tilting linkages of the vehicle.

FIG. 39, depicts a tilt linkage 1850 and a steering linkage 1854 of vehicle 1800. In FIG. 39, upper frame portion 1824 is omitted to better show the front-end linkages. Tilt linkage 1850 comprises a parallelogram four-bar linkage including an upper bar 1858 and a lower bar 1862. Bars 1858 and 1862 are each pivotably coupled at outboard ends to a left kingpin 1866 and a right kingpin 1868. Kingpins 1866, 1868 and bars 1858, 1862 comprise the four links of the four-bar linkage. Although a parallelogram linkage is depicted and described, any one of the front end tilt linkages described above with respect to FIGS. 2-20 may be utilized.

Lower bar 1862 is coupled at a pivot joint 1872 (e.g., a keyed connection) to a tilt actuator 1876 (here, a step motor), supported by a mounting bracket 1880 of a front plate 1884. Front plate 1884 is rigidly coupled to vehicle chassis 1804, and bracket 1880 is rigidly coupled to the front plate. Accordingly, actuation of tilt motor 1876 tends to cause vehicle chassis 1804 to tilt. A gearbox may be disposed between the tilt motor and the tilt linkage, e.g., to enhance or tune the torque provided by the motor. This may be true for any or all tilt linkages and actuators described herein.

Steering linkage 1854 comprises a tie rod 1890 coupled at outboard ends to kingpins 1866, 1868, and coupled at a central portion to a steering actuator 1894. However, any of the steering linkages and actuators described herein may be utilized.

Figure 40:
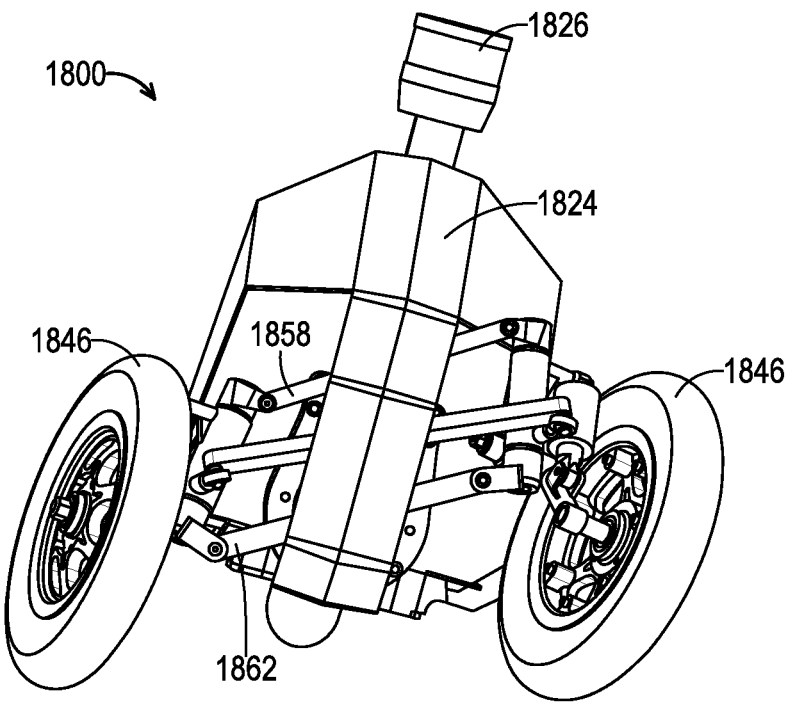
FIG. 40 is a front view of the vehicle of FIG. 38.
Figure 41:
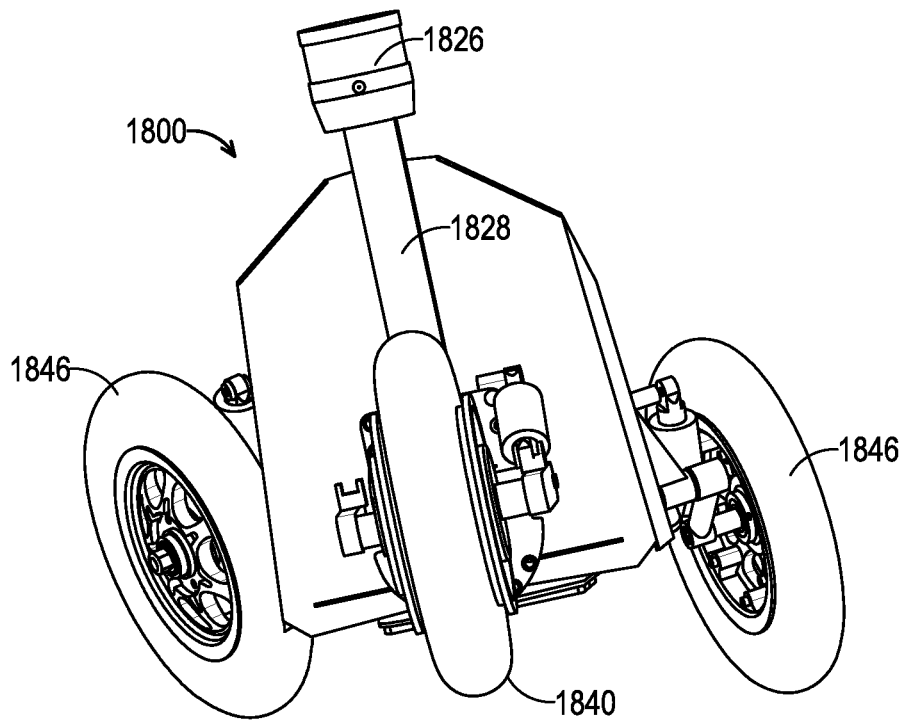
FIG. 41 is a rear view of the vehicle of FIG. 38.

FIGS. 40 and 41 depict the front and rear of vehicle 1800 as it turns.

Figure 42:
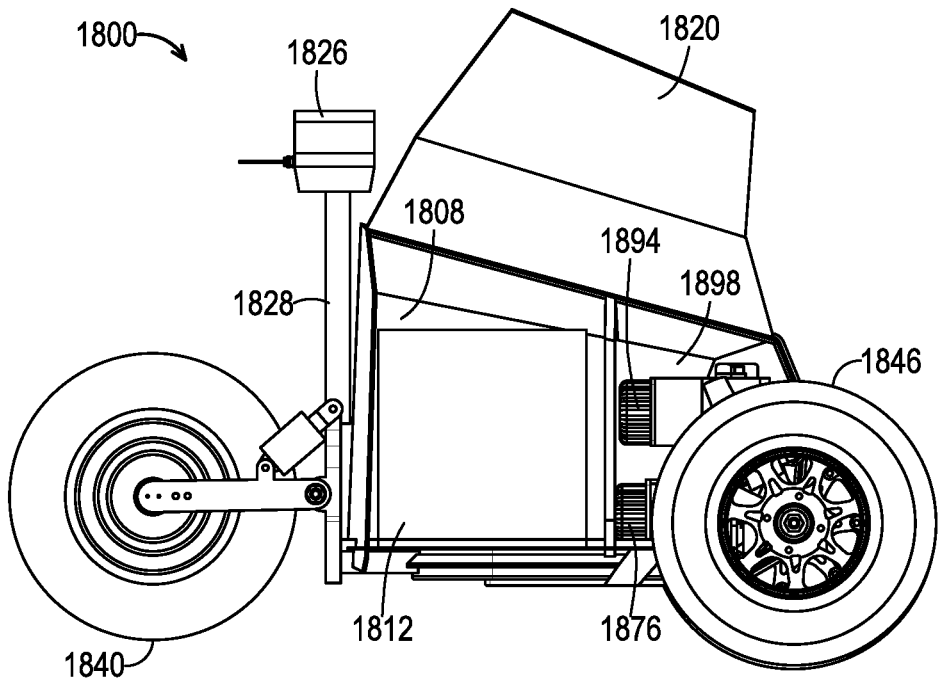
FIG. 42 is a side view of the vehicle of FIG. 38, depicting a cargo compartment door open in an open state.
Figure 43:
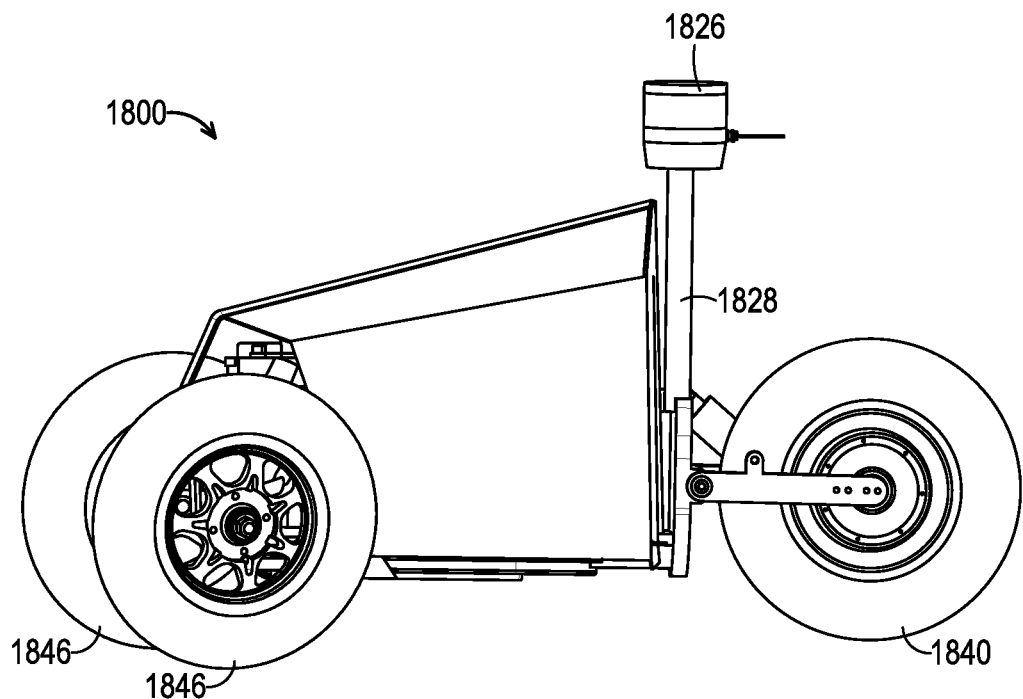
FIG. 43 is another side view of the vehicle of FIG. 38, depicting the cargo door in a closed state.

FIGS. 42-43 are side views of vehicle 1800. As shown in FIG. 42, tilt motor 1876 and steer motor 1894 are disposed at least partially within a housing compartment 1898. Housing compartment 1898 helps to protect the motors and/or other equipment. A wall 1334 separates housing compartment 1898 from cargo compartment 1808. Door 1820 forms a side wall of the housing compartment, such that opening the door selectively exposes the motors and/or other components within the housing compartment. This may facilitate inspection and repair of equipment within the housing compartment.

FIG. 43 depicts door 1820 in a closed position. As depicted in FIG. 43 and elsewhere, cargo compartment 1808 and housing compartment 1898 form an aerodynamic shape (e.g., with the front end of the housing compartment having a smaller height than the rear end of the cargo compartment, and the height of the chassis gradually increasing between the forward and aft ends).

F. Illustrative Autonomous Unloading System

In some examples, the tilting suspension system of an autonomous vehicle enables the vehicle to unload cargo autonomously (e.g., without intervention from a human or from other another device). In general, autonomous loading is facilitated by a tilting vehicle suspension (e.g., as described above with reference to vehicle 100) and a vehicle body configured to carry cargo and to allow the cargo to be released when the vehicle is tilted in a certain manner. For example, the vehicle body may be configured such that, when the vehicle is tilted to a certain angle and/or at a certain angular velocity, cargo item(s) fall from the vehicle body.

An illustrative method of autonomously unloading cargo is described below, and depicted in FIGS. 44-45, with reference to autonomous delivery robot 1800, described above. However, in general any suitable tilting vehicle may be configured for autonomous unloading.

Figure 44:
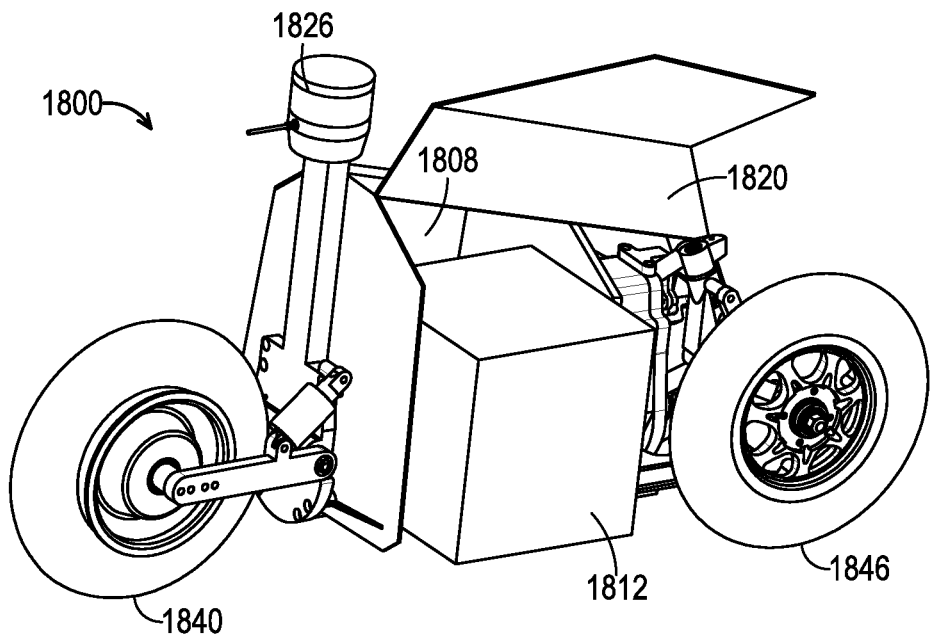
FIG. 44 is another isometric view of the vehicle of FIG. 38, depicting the vehicle autonomously unloading cargo in accordance with aspects of the present teachings.
Figure 45:
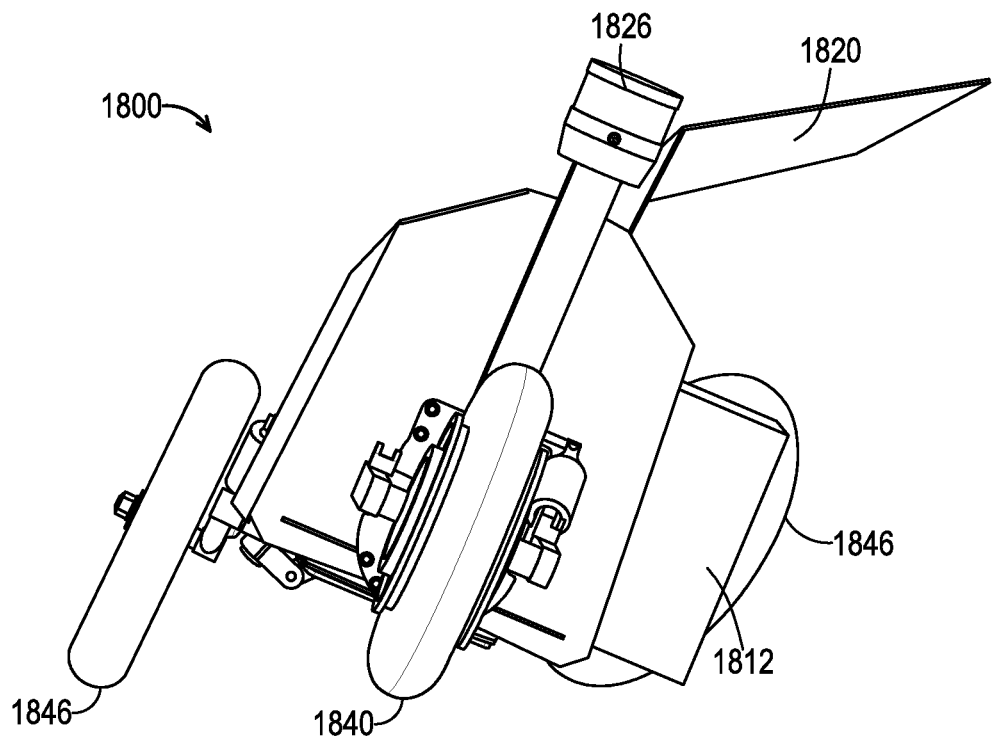
FIG. 45 is another rear view of the vehicle of FIG. 38 autonomously unloading cargo.

FIGS. 44-45 depict autonomous tilting vehicle 1800 automatically unloading cargo (here, package 1812). FIG. 44 is an isometric side view of vehicle 1800, and FIG. 45 is a rear view of the vehicle.

Prior to unloading (e.g., during transport of package 1812), the package sits on floor 1816 inside cargo compartment 1808, and door 1820 is typically closed. To unload package 1812, processing logic of vehicle 1800 causes door 1820 to open and causes vehicle body 1804 to tilt. With vehicle body 1804 tilted, compartment floor 1816 is angled, such that one side of the floor is lower than the other. Accordingly, it is possible for package 1812 to slide down the inclined floor and out of compartment 1808.

Door 1820 is configured to be opened automatically (e.g., in response to a command from processing logic of the vehicle). For example, door 1820 may be coupled to one or more suitable actuators configured to pivot the door about the hinge. In some examples, door 1820 is biased open, and the vehicle controller is configured to actuate a latch to permit the door to transition to the open position. Although door 1820 in this example is a gullwing door, compartment

1808 can in general have any suitable closure(s) for selectively allowing cargo to be ejected from the compartment. In some examples, the closure of the cargo compartment does not fully enclose the compartment when closed. For example, the closure may comprise a bar or gate configured to selectively retain the cargo in a compartment or on a platform.

The vehicle control system can be configured to modulate a tilt angle of the vehicle to achieve smooth unloading (e.g., to achieve a desired unload velocity, to prevent the cargo from tipping or rolling, etc.) For example, the control system may be configured to execute servo control algorithm(s) to control vehicle tilt angle in a manner that achieves a desired position, velocity, acceleration, and/or mechanical agitation of the discharged cargo. In some examples, properties of the cargo (e.g., lateral or vertical velocity, acceleration, etc.) are measured by vehicle sensor(s) and used as input to a control algorithm. Alternatively, or additionally, the vehicle controller may be programmed to modulate the tilt with predetermined angles, angular velocities, angular accelerations, etc., which have been previously determined to be suitable for discharging the cargo in a desired manner. In some examples, the vehicle controller may select respective values for parameters such as tilt angle based on a sensed weight and/or volume of the cargo. (See, e.g., a description of an illustrative payload weight estimation method below.) For example, the values may be calculated by the controller based on sensed cargo data, selected from a plurality of values stored in a memory of the controller based on the sensed data, and/or selected in any other suitable manner.

In some examples, the vehicle control system is configured to discharge cargo by tilting to a high angle (i.e., far from level) to overcome static friction. This allows the cargo to start moving along the inclined floor. Once the cargo has begun to move, the vehicle controller reduces the tilt angle to a lower value (e.g., closer to level). The cargo generally remains in motion even after the tilt angle has been reduced from the initial value because static friction exceeds dynamic friction. In some examples, the vehicle controller is configured to gradually reduce the tilt angle (e.g., gradually bringing the floor closer to level), which tends to slow the velocity of the cargo. Slowing the cargo's velocity in this manner helps to prevent damage and/or to ensure that the cargo is discharged at a desired location. Depending on the height of the floor of the cargo area, the unload algorithm(s) of the vehicle control system may accept higher/lower cargo lateral velocities.

In some examples, the tilt angle is reduced in a manner that tends to keep the cargo moving along the floor at a desired constant speed. The constant speed may be determined by, e.g., a coefficient of kinetic friction between the floor and the cargo, the tilt angle of the vehicle, the vertical displacement of the cargo as it travels along the floor, and/or any other suitable factors.

In some examples, the initial high tilt angle commanded by the vehicle control system is selected to achieve the condition of the floor edge being very close to the ground (e.g., as close as possible). Accordingly, even after the tilt angle has been reduced, the discharged cargo falls a relatively short distance from the vehicle to the ground, which helps to prevent damage caused by impact with the ground. The short drop distance may also help to prevent the cargo from tipping, which is useful in cases wherein tipping may cause damage, or wherein the cargo is unloaded onto an automated system configured to receive the cargo in a specific orientation.

The floor of the cargo area may be a low-friction material (ultra-high molecular weight (UHMW) plastic, polyoxymethylene(s) (e.g., including those sold the under the names Delrin, Ultraform, Celcon, etc.), polytetrafluoroethylene (PTFE), and/or any other suitable materials). Additionally, or alternatively, the cargo area may include rollers, ball transfers, a system configured to blow air or another suitable fluid across the floor, and/or any other suitable devices configured to actively or passively reduce friction.

The autonomous unloading systems and methods described herein allow cargo to be unloaded from the autonomous tilting vehicle automatically. Additionally, the autonomous unloading can in at least some examples be achieved using only the existing tilting mechanisms of the vehicle (e.g., without the addition of dedicated unloading actuators). This provides significant labor savings compared to a robot that requires manual unloading and also simplifies the vehicle design/BOM because it does not require additional unload actuators. However, in some examples, additional unload actuators may be included. For example, one or more additional actuators may be disposed within the cargo compartment and configured to urge cargo out of the compartment (e.g., when the door is opened). Suitable additional actuators may include motorized rollers in the floor, linear actuator(s) attached to the vehicle body and configured to push the cargo out of the compartment, and so on.

G. Illustrative Systems and Methods Related to Sensor Tilt and Displacement

Figure 46:
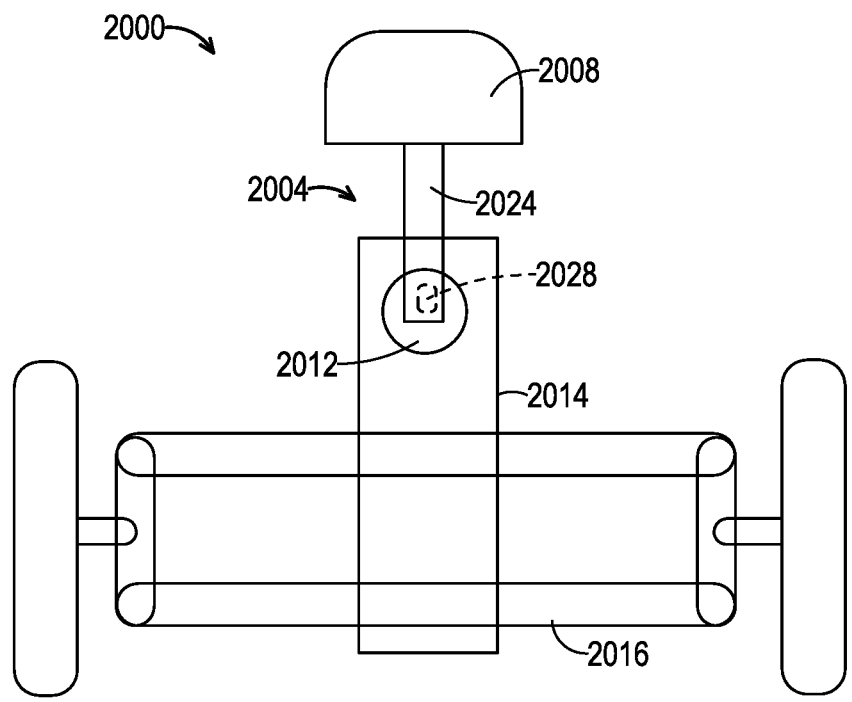
FIG. 46 is a front view of an illustrative vehicle having a sensor module (e.g., a LIDAR sensor) attached to the vehicle chassis by a tilt-compensating mount, in accordance with aspects of the present teachings, depicting the vehicle in an untilted position.
Figure 47:
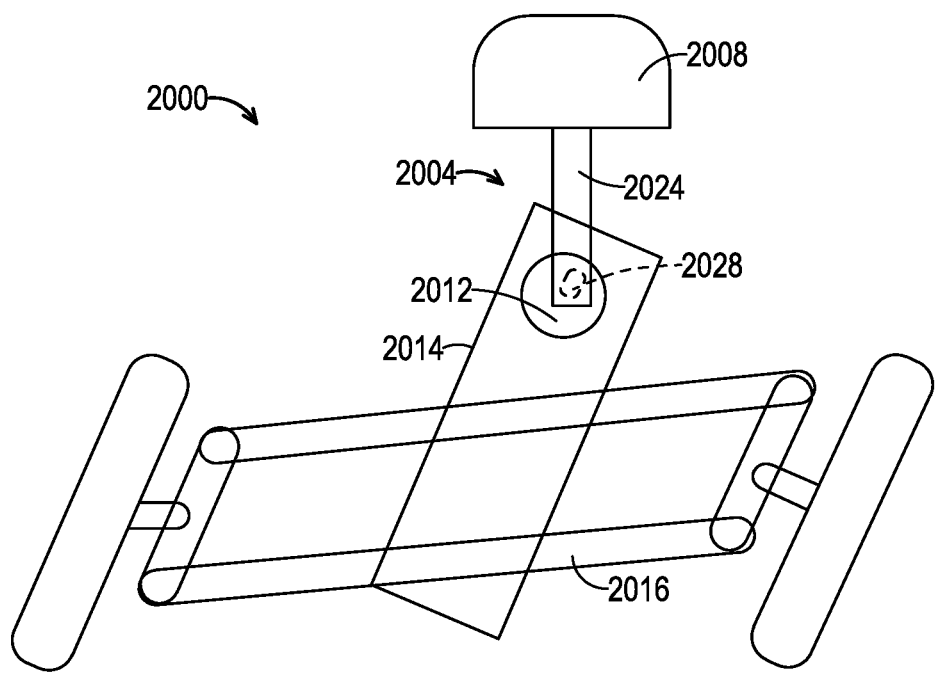
FIG. 47 is another front view of the vehicle of FIG. 46, depicting the vehicle in a tilted position, with the sensor module oriented in an upright position due to the tilt-compensating mount.

With reference to FIGS. 46-47, this section describes illustrative systems and methods relating to accounting for and/or preventing certain effects of tilt and/or lateral displacement of sensors of a tilting autonomous vehicle, such as vehicle 100.

As described above, an autonomous tilting vehicle may include one or more sensors, at least some of which may be mounted to a tilting part of the vehicle chassis. Unless configured otherwise, a sensor mounted to the tilting chassis would be expected to tilt during vehicle operation. For some types of sensors, this tilting can adversely affect data acquired by the sensor (e.g., by interfering with sensor function, by causing the sensed data to be different than data that would be acquired by an untilted sensor, etc.). As an example, an autonomous tilting vehicle may include one or more cameras, radar devices, LIDAR devices, and/or the like mounted to the tilting vehicle frame. Data sensed by these devices may be input to processing logic of the vehicle for navigation, pathfinding, determining information about the vehicle environment, and so on. However, if the sensor is tilted, the sensed data may be difficult for the processing logic to use as intended. For example, a computer-vision algorithm configured to determine a direction of travel for the vehicle may produce inaccurate results if the input data is a tilted image of the scene in front of the vehicle.

An example method for preventing problems associated with tilted sensors is to correct the sensed data based on vehicle tilt, producing corrected data approximating data that would have been acquired by an untilted sensor. For example, processing logic of the vehicle may receive information about vehicle tilt (e.g., tilt angle, angular velocity, and/or the like), and determine, based on the tilt information, a rotational transform and/or other factor(s) or method(s) suitable for correcting and/or compensating the sensed data for vehicle tilt. The processing logic is further configured to correct the sensed data using the determined compensation factor(s) and/or method(s). Correcting the sensed data may include using at least one rotational matrix, machine learning algorithm, and/or any other suitable method for correcting the effect of sensor tilt on the sensed data.

Suitable tilt information usable by the processing logic to determine correction factor(s) and/or method(s) may include information about the setting of one or more tilt actuators; relative positioning of two or more vehicle components; tilt information obtained from an accelerometer, inclinometer, IMU, gyroscope, etc.; and/or the like.

The vehicle processing logic may use any suitable method for selecting sensor data to be corrected. For example, the processing logic may tilt-correct all data sensed by certain sensors, or may tilt-correct data sensed by certain sensors only when vehicle tilt information indicates that the sensor in question is tilted beyond a certain threshold angle. Sensed data may be tilt-corrected automatically when acquired and/or on-demand when the data is accessed by certain control algorithms. Corrected data may be used by vehicle processing logic, recorded in vehicle memory, transmitted to another location, used as training data for machine learning, and/or the like. For example, the corrected sensor output may be used as input to vehicle-control algorithms designed to use data generated by a non-tilting vehicle.

Alternatively, or additionally, one or more sensors may be mounted to the tilting vehicle in a manner that at least partly prevents the physical sensor itself from tilting with the vehicle. For example, one or more sensors may be mounted to the vehicle by a gimbal, linkage, or robotic mechanism configured to allow a gimbaling of the sensors, thereby reducing or eliminating any sensor distortion caused by vehicle tilt. For example, a sensor module may be attached to the vehicle by a gyroscope, such that the sensor module does not tilt along with the vehicle.

In some examples, a sensor module is attached to the vehicle by a mounting system capable of allowing the module to tilt, and the mounting system includes a control system configured to actively correct module tilt such that the module effectively remains untilted. For example, the mounting system can include one or more tilt sensors configured to detect sensor module tilt, and one or more actuators and/or motors configured to adjust the sensor module tilt to restore the sensor module to an upright (e.g., untilted) position. By adjusting sensor module position based on sensed module tilt, the mounting system effectively maintains the sensor module in an untilted position.

In examples including a mounting system configured to reduce or eliminate sensor module tilt, processing logic of the vehicle may optionally still be configured to correct sensed data for module tilt, as described above. Data correction may be helpful in cases where the mounting system does not fully prevent module tilt, where the mounting system has malfunctioned or is inoperable (which can occur if, e.g., the vehicle overturns), and/or in any other suitable situation.

FIGS. 46-47 are front views of an example autonomous tilting vehicle 2000 having an illustrative tilt-compensating mount system 2004 configured to maintain an illustrative sensor module 2008 in a substantially untilted position. Mount system 2004 comprises a gimbal 2012 coupled to a chassis 2014 of vehicle 2000. A sensor support 2024 couples module 2008 to gimbal 2012 in a manner that prevents the sensor support and the module from tilting about the vehicle roll axis. In other examples, sensor support 2024 is omitted, and sensor module 2008 is directly connected to gimbal.

Tilt-compensating mount system 2004 optionally includes a tilt detector 2028 disposed on gimbal 2012. In other examples, tilt detector 2028 may be disposed on the sensor module or sensor support. Tilt detector 2028 senses a tilt of sensor support 2024, which corresponds to a tilt of module 2008 due to the rigid connection between support 2024 and module 2008. Based on the sensed tilt of the module, an actuator of gimbal 2012 rotates support 2024 such that module 2008 is positioned upright (i.e., substantially untilted). In other examples, an actuator of gimbal 2012 may be in communication with the tilt actuator (or associated controller) of the vehicle tilt linkage, and the gimbal actuator rotates support 2024 to prevent tilting based on the commanded vehicle tilt.

FIG. 46 depicts vehicle 2000 in a substantially upright position, with module 2008 also in an upright position. In FIG. 47, vehicle 2000 has tilted (e.g., to effect a turn), but module 2008 is maintained in an upright position by tilt-compensating mount system 2004.

As shown in FIG. 47, although module 2008 is maintained by mount system 2004 in an upright position, the tilting of vehicle chassis 2014 laterally displaces the module relative to the vehicle chassis and wheel linkage. This lateral displacement also tends to occur for sensor modules not attached to the chassis by mount system 2004 or similar (that is, in examples wherein sensor modules do tilt along with the vehicle chassis). The lateral displacement can, in some cases, impact the use of data sensed by sensor module 2008 (e.g., in algorithms of processing logic of the vehicle).

For example, in some cases module 2008 includes a LIDAR module used by navigation and/or computer-vision algorithms, and these algorithms may expect the LIDAR data to correspond to a LIDAR module positioned at a lateral center line of the vehicle. The lateral displacement of the sensor module due to vehicle tilt therefore tends to cause the algorithms to fail.

Accordingly, in some examples, lateral displacement of the sensor module due to vehicle tilt is corrected after data acquisition by processing logic of the vehicle, in a manner similar to the tilt correction of sensed data described above. For example, a lateral-displacement sensor may be disposed on sensor module 2008 (and/or on any other suitable part of the vehicle) and configured to detect lateral displacement of sensor module 2008. Processing logic of the vehicle may use the sensed lateral-displacement information to correct and/or compensate for the lateral displacement of the sensor module. For example, in some cases it is possible to correct the output of sensor module 2008 to approximate output of a sensor that has not been displaced (i.e., a sensor positioned at a lateral center of the vehicle). Alternatively, or additionally, algorithms of the vehicle processing logic may be configured to adjust their calculations to account for the displacement of the sensor from lateral center.

In some examples, hardware of the vehicle is configured to prevent and/or reduce lateral displacement of the sensor module. A hardware solution for lateral displacement may replace or be used in conjunction with the data correction approach described above.

H. Illustrative Vehicle Features

This section describes illustrative features and functionalities of autonomous tilting vehicles of the present disclosure.

a. Fail-Operational Features

In some examples, the vehicle steering system and/or the vehicle tilting system are configured to "fail-operational," i.e., to continue to function to at least some extent even if certain components fail. A vehicle having fail-operational steering and tilting systems is able to autonomously travel and/or change its position even if one or more individual components or combinations of components (e.g., motor windings, actuators, electronic controllers, sensors, etc.) cease to function.

In some examples, a fail-operational vehicle has, for each control axis, two motors and/or actuators, two controllers, and three sensors. For example, the vehicle tilt system may include two tilt actuators, two tilt controllers, and three tilt sensors. In some examples, the two tilt controllers are each coupled to only a respective one of the tilt actuators; in other examples, the two tilt controllers are coupled to both tilt actuators and are each capable of controlling either actuator. If the vehicle has a steering system, the steering system includes two steering actuators, two steering controllers, and three steering sensors. Similarly to the tilt controllers, the steering controllers may each be coupled to a respective steering actuator or to both steering actuators.

The sets of three sensors (e.g., three tilt sensors and/or three steering sensors) rather than two sensors allow for Triple Modular Redundancy. If only two tilt sensors were included, and one of those sensors failed in a manner that caused it to output faulty data, it could be difficult for the controller to determine which sensor was accurate. With three sensors, however, the faulty sensor is easily identified, because the other two sensors produce similar and/or identical readings. Another advantage of having three of each type of sensor is that, when the sensors are operating normally, their outputs can be combined (e.g., by averaging, error correction algorithms, etc.) for increased precision and/or accuracy. However, in some examples a fail-operational vehicle can include only two of each type of sensor.

As another example of fail-operational functionality, a vehicle having steer motor(s) (or other suitable steering actuators) can be configured to be operable even if the steer motor fails. A steer motor that is configured to be back-driven allows the wheels to tilt when the vehicle chassis is tilted. Accordingly, in the case of failure of the steer motor (or motor controller, or certain aspects of the steering linkage), the vehicle can be operated in a free-to-caster (FTC) mode, wherein the vehicle turns when commanded by the tilt control system, and the back-driven steer motor allows the wheels to be turned. A steer control motor configured to be back-driven in this manner may, for example, include no gearbox between the motor and the steered wheel(s).

In some examples, processing logic of the vehicle is configured to perform certain actions in the event that certain system component(s) fail. For example, in response to failure of the tilting system, the vehicle controller may be programmed to use the steering system to steer to a suitable location where the vehicle can safely stop and await repair.

b. Wireless Charging

In some examples, an autonomous tilting vehicle includes wireless charging components configured to allow a battery of the vehicle to be charged without a mechanical connection to a power source. For example, wireless induction coil(s) may be disposed in a portion of the vehicle chassis, tilt linkage, steering linkage, and/or any other suitable location. FIGS. 36-37, described above with reference to an example tilt-lock device, depict an example wherein wireless charging coils 1460 are disposed on a projection of a lower bar of a four-bar tilting linkage. Wireless charging can allow the vehicle to recharge in a partly or fully autonomous manner, without requiring human intervention to swap batteries or connect/disconnect a charging plug.

c. Anti-Lock Braking System (ABS) with Regenerative Braking

Vehicles can be designed to incorporate ABS brakes and/or regenerative braking capability using the propulsion system (e.g., a hub motor driving a rear vehicle wheel) for braking power. For example, a braking system having anti-lock and regenerative functionality may be configured to detect nonlinearities in motor deceleration, which indicate traction loss, using external wheel speed sensors (e.g., on non-braked wheels) and/or using commutation sensors of the motor. In response to sensed data indicating loss of traction, the motor controller causes the motor to partially or completely reduce braking torque until traction is regained, and then to reapply regenerative torque.

d. Payload Weight Estimation

In some examples, an autonomous vehicle is configured to determine the weight of its payload (e.g., cargo carried on or in the vehicle chassis) without inclusion of dedicated sensors such as load cells, strain gauges, and/or the like. Estimated payload weight may be used by processing logic of the vehicle to, e.g., adjust aspects of vehicle control algorithms, adjust vehicle suspension, adjust motor control (e.g, acceleration curves), automatically determine an amount to bill a delivery customer, to identify a problem such as loss of cargo or presence of unexpected objects, and/or for any other suitable purpose. Payload weight estimation can be particularly useful for a lightweight delivery vehicle, for which the payload mass fraction may be significant.

An automatic payload weight estimation method may include determining total vehicle weight (i.e., including the weight of the payload) and subtracting known vehicle curb weight (i.e., the weight of the unloaded vehicle) to estimate payload weight. Total vehicle weight may be determined in any suitable manner. For example, the vehicle controller may be configured to determine the power input to traction motor(s) and determine vehicle acceleration (e.g., by measuring a change in wheel speed, or by directly measuring acceleration using an accelerometer). Based on the input power and acceleration, and accounting for motor efficiency and any other relevant factors, the vehicle controller can estimate the total weight of the vehicle. A known tare weight of the vehicle is subtracted from the total weight to obtain an estimate of the payload weight.

In addition to motor efficiency, other relevant factors that may be accounted for in the payload weight estimation may include wind resistance, rolling resistance, incline of the surface on which the vehicle is traveling (e.g., uphill, downhill, level, etc.), and/or any other suitable factors. Incline of the travel surface may be determined by using an accelerometer or gyroscope of the vehicle to estimate vehicle pitch angle, by using a GPS reading to determine vehicle elevation changes, and/or by using map data (e.g., in conjunction with GPS or other positional data) to identify elevation gradients in the vehicle's location. In some cases, the payload estimation calculations are simplest when the vehicle is traveling on a level surface, and so the estimate of the incline of the travel surface can be used primarily to identify whether the surface is level (indicating that conditions are good for a payload estimation).

Other measurements that may be used in the estimation of total vehicle weight (i.e., in addition to motor input power) may include braking power required to stop the vehicle and/or to decelerate it by a certain amount, and power generated by a regenerative braking system.

Although the foregoing examples describe methods of estimating payload weight without the presence of dedicated weight sensors, dedicated weight sensors may optionally be included.

e. Fleet Tire Pressure Monitoring System (TPMS)

In some examples, one or more wheels of an autonomous vehicle may include pneumatic tires. The vehicle may include pressure sensor(s) configured to sense tire pressure, and a controller of the vehicle may be configured to take certain actions if the sensed tire pressure is too low. For example, the vehicle controller may, in response to a low pressure reading, transmit an error signal, slow vehicle speed, and/or attempt to direct the vehicle to a safe location. In some examples, the sensed tire pressure is periodically or continuously telemetered to another location (e.g., a remote computer, another nearby vehicle, a cloud-based data store, and/or any other suitable location). This can allow for convenient monitoring and maintenance of the vehicle tires, particularly for a fleet of autonomous vehicles.

f. Replaceable Skid Plate Bottom

A replaceable skid plate may be incorporated on an underside of the vehicle (e.g., on a bottom surface of the chassis). A skid plate tends to protect the chassis and/or other vehicle parts, thereby increasing longevity of the vehicle and/or increasing the time between vehicle repairs. The skid plate may be made of metal, plastic, and/or any other suitable materials. The replaceable skid plate may be attached to the vehicle chassis in an easily releasable manner, facilitating removal of a first skid plate and attachment of a new one (e.g., because the first one has been damaged or needs to be inspected or repaired).

g. Rollover Recovery

Autonomous vehicles according to aspects of the present teachings allow for significant articulation of the vehicle linkage(s). In some examples, this articulation can be used to correct the vehicle orientation following an accident or collision. For example, the chassis and/or linkages of the vehicle can be configured to allow for righting the vehicle from a completely inverted state through a combination of coordinated linkage and drivetrain actuation. Such a rollover recovery capability greatly reduces the lost operational time that can otherwise result from minor accidents resulting in rollover, as well as the human time otherwise required to respond to minor accidents.

In some cases, vehicles capable of automatic rollover recovery require no human intervention at all after an accident. For example, an automated vehicle as described herein may have a relatively small size and weight, such that most accidents involving the vehicles will be minor (i.e., not resulting in significant damage to other vehicles, objects, or people, and not rendering the vehicle inoperable once it has been righted). Accordingly, if the vehicle is capable of restoring itself to an upright position following an accident, no action may need to be taken at the accident site.

I. Illustrative Control Methods

Figure 48:
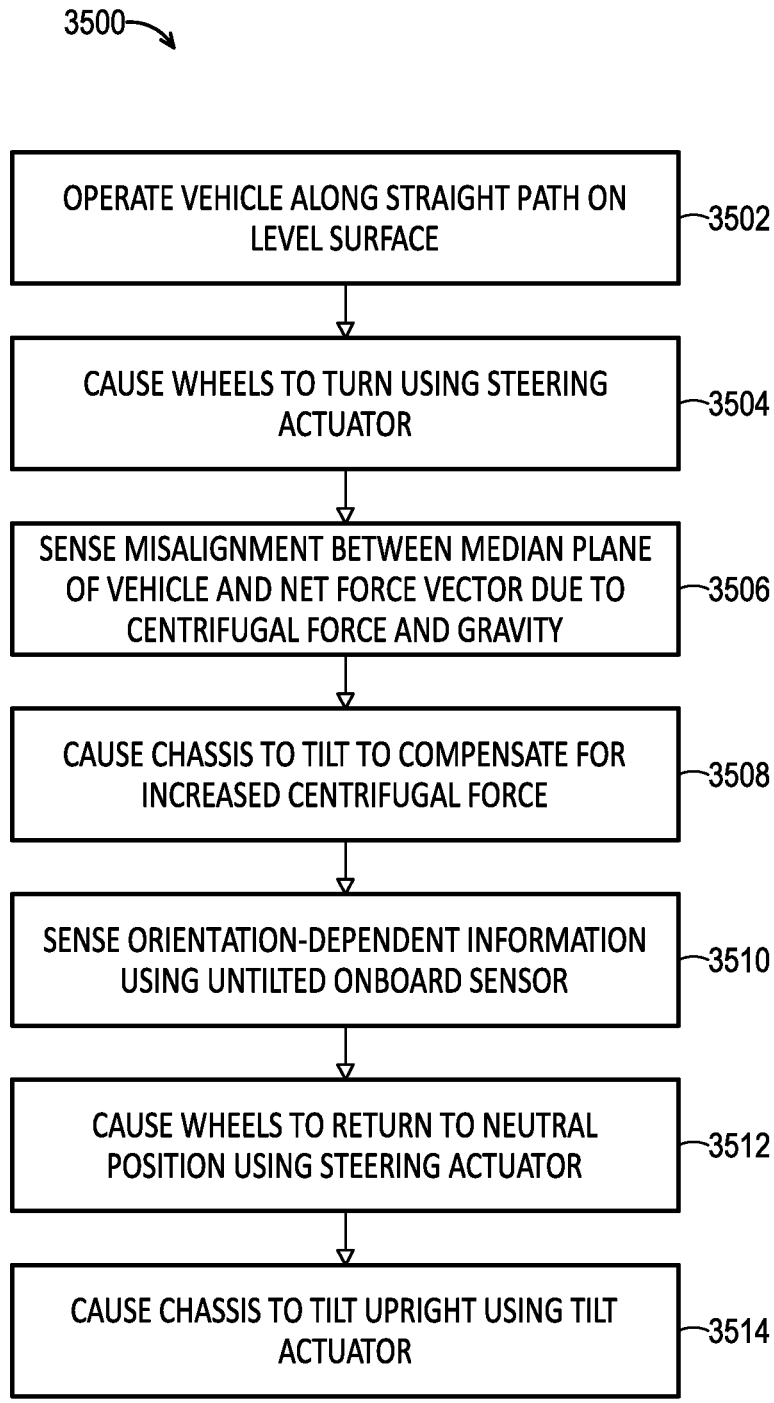
FIG. 48 is a flow diagram depicting steps of an illustrative method for autonomous operation of a tilting autonomous vehicle, in accordance with aspects of the present teachings.
Figure 49:
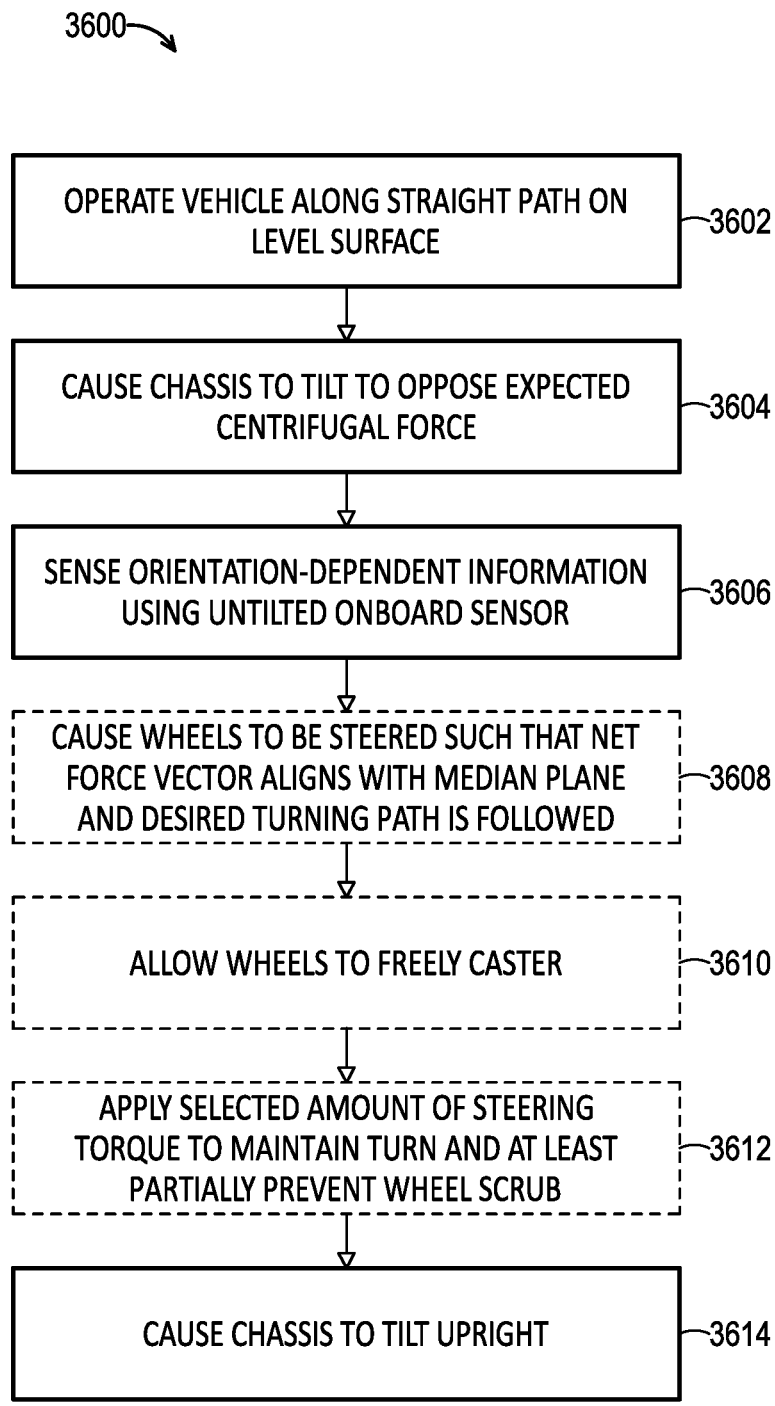
FIG. 49 is a flow diagram depicting steps of another illustrative method for autonomous operation of a tilting autonomous vehicle, in accordance with aspects of the present teachings.

This section describes steps of illustrative methods for controlling an autonomous tiltable vehicle; see FIGS. 48-49. Aspects of vehicles described above may be utilized in the method steps described below. Where appropriate, reference may be made to components and systems that may be used in carrying out each step. These references are for illustration, and are not intended to limit the possible ways of carrying out any particular step of the method.

In general, an autonomous vehicle controller determines and/or receives a desired vehicle path. Proper lean to steer ratios are then calculated based on the given speed. Chassis tilt and/or steering are then actuated in parallel accordingly, to maintain the net force vector in line with the median plane of the chassis. Terrain adjustments can be made based on feedback from the measured chassis tilt.

a. Lean-Follows-Steer

In a lean-follows-steer control scheme (LFS), vehicle tilt follows vehicle steering. In other words, the wheels are steered first when entering a turn, and the vehicle chassis tilts automatically in response to the centrifugal force, such that the forces balance and the net force vector due to gravity and centrifugal force remains in line with the median plane of the tilting chassis.

FIG. 48 is a flowchart illustrating steps performed in an illustrative method 3500 implementing an LFS control scheme, and may not recite the complete process or all steps of the method. Although various steps of method 3500 are described below and depicted in FIG. 48, the steps need not necessarily all be performed, and in some cases may be performed simultaneously or in a different order than the order shown.

Step 3502 of method 3500 includes operating the vehicle (e.g., vehicle 100) along a straight path on a level surface. In this situation, the net force vector is substantially equal to the force of gravity, and is aligned with the vehicle chassis.

Step 3504 of method 3500 includes causing the wheels of the vehicle to turn using a steering actuator coupled to a steering linkage, thereby imparting a centrifugal force and causing a change in the net force vector on the vehicle. Accordingly, the net force vector is no longer aligned with the median plane of the chassis.

Step 3506 of method 3500 includes sensing the misalignment between the median plane of the vehicle and the net force vector due to the centrifugal force and gravity. This step may be carried out by the tilt sensor on board the vehicle.

Step 3508 of method 3500 includes causing the chassis to tilt to compensate for the increased centrifugal force, i.e., aligning the chassis such that the net force vector is in line with the median plane. In this example, a tilt linkage of the vehicle automatically causes the wheels to tilt with the chassis (e.g., to the same degree).

Step 3510 of method 3500 optionally includes sensing orientation-dependent information using a sensor coupled to the tilted chassis by a gimbal, such that even after the chassis has been tilted in step 3508, the sensor remains in an upright position (e.g., the same position as in step 3502). The sensor may comprise, e.g., a LIDAR unit, a radar unit, an optical imager, a thermal imager, and/or any other device configured to sense environmental information in an orientation-dependent manner. The gimbal mount compensates for chassis tilt such that the sensed information is not adversely impacted by vehicle tilt. For example, if the sensor is configured to acquire an image of the vehicle's environment, the acquired image is untilted.

Step 3512 of method 3500 includes causing the wheels of the vehicle to return to a neutral position to come out of the turn begun in step 3504. As in that step, the wheels are steered using a steering actuator responding to signals from a vehicle control system. This action causes the centrifugal force to be reduced or eliminated, thereby causing another misalignment of the net force vector with respect to the still-leaning chassis.

Step 3514 of method 3500 includes causing the chassis to tilt in an upright direction to compensate for the mismatch between the force vector and the median plane, using a tilt actuator commanded by the vehicle's control system.

b. Steer Follows Lean (SFL)

In another illustrative control scheme, vehicle steering follows vehicle tilt. In other words, the vehicle is actively tilted when entering a turn, and in response the wheels naturally steer and/or are caused to steer, such that the forces balance and the net force vector due to gravity and centrifugal force remains in line with the median plane of the tilting chassis. In other words, the chassis tilts first, or at least simultaneously with the wheels turning, and the wheels turn to a determined value that takes into account vehicle speed and tilt angle.

At higher speeds, steering may be in a "free-to-caster" (FTC) mode, meaning no torque is applied and the wheels are left to move to a steering angle naturally. At lower speeds, steering may be completely controlled by a steering actuator (e.g., a servo motor). A transition zone or range between the lower speeds and the higher speeds, may also be defined, in which steering control is gradually transitioned from full torque to no torque, either linearly or nonlinearly. For example, below approximately 10 miles per hour (mph), wheels of the vehicle may be completely controlled by applying torque from a steering actuator. In this example, above approximately 20 mph the wheels may be completely FTC. Between approximately 10 mph and approximately 20 mph, control is transitioned from full-torque to zero-torque, e.g., using a clutch mechanism or the like. At extremely low speeds (e.g., less than one mph), vehicle tilting may be locked (using, e.g., one of the illustrative tilt-lock devices described herein). These speeds are for illustration only, and any suitable speeds may be selected, depending on desired characteristics, vehicle capabilities, and operating conditions.

FIG. 49 is a flowchart illustrating steps performed in an illustrative method 3600 implementing an SFL control scheme, and may not recite the complete process or all steps of the method. Although various steps of method 3600 are described below and depicted in FIG. 49, the steps need not necessarily all be performed, and in some cases may be performed simultaneously or in a different order than the order shown.

As explained above, an SFL control scheme may include three stages, depending on vehicle speed and/or other factors (e.g., vehicle loading). In this example, step 3602 of method 3600 includes operating the vehicle (e.g., vehicle 100) along a straight path on a level surface at a given speed. In this situation, the net force vector is substantially equal to the force of gravity, and is aligned with the chassis.

Step 3604 of method 3600 includes responding causing the chassis to tilt (e.g., using a tilt actuator commanded by the vehicle control system) in a direction opposing the expected centrifugal force that will be caused by the turn and in an amount calculated to at least partially cause the turn to occur. A mismatch will occur between the net force vector (due to centrifugal force and gravity) and the median plane of the chassis.

Step 3606 of method 3600 optionally includes sensing orientation-dependent information using a sensor coupled to the tilted chassis by a gimbal, such that even after the chassis has been tilted, the sensor remains in an upright position.

If the speed of the vehicle is below a selected first threshold, then step 3608 of method 3600 may include causing the wheels to be steered (e.g., by issuing commands from a controller to a steering actuator) such that the net force vector aligns with the median plane, and the desired turning path is substantially followed. Below the selected first speed threshold, the vehicle may be referred to as operating in a dual control mode (i.e., tilt and steering are both controlled actively).

If the speed of the vehicle is above a selected second threshold, then step 3610 of method 3600 may include allowing the wheels to freely caster, i.e., applying zero additional torque to the wheels, thereby permitting the wheels to find their natural positions as a result of the vehicle's tilt. Above the selected second speed threshold, the vehicle may be referred to as operating in a free-to-caster or FTC mode (i.e., only tilt is controlled actively).

If the speed of the vehicle is between the first and second thresholds, then step 3612 of method 3600 may include applying a selected amount of torque to the steering system to maintain the turn and at least partially prevent wheel scrub with respect to the support surface. In this transition zone or transition range from full torque to zero torque, the level of torque applied to the steering may be proportional to vehicle speed (e.g., linearly related to speed or nonlinearly related to speed), depending on desired characteristics.

Step 3614 of method 3600 includes causing the tilt of the vehicle to return to a neutral (e.g., upright) position to come out of the turn begun in step 3604. Depending on speed, as described above, the wheels may be steered more or less actively to maintain alignment of the net force vector.

At very low speeds, e.g., below a third threshold (lower than the first and second thresholds), chassis tilt may be held constant or locked in place, such that only wheel steering may be utilized to achieve a selected vehicle path.

In some examples, aspects of methods 3500 and 3600 may be combined, e.g., such that the vehicle follows an LFS scheme when below the first speed threshold and a FTC scheme above the second threshold.

c. Correcting for Terrain

Regardless of the control scheme, vehicles and control systems as described herein may be configured to handle (automatically) terrain changes and minor obstacles, i.e., non-planar travel surfaces.

In general, a vehicle encountering an obstacle under one wheel or the other will be caused to tilt out of its commanded tilt value or range, causing instability of the vehicle. Vehicle stability is maintained and controlled by leaning a chassis of the vehicle relative to a wheel linkage of the vehicle, thereby permitting the wheel linkage to tilt as a result of the obstacle, while maintaining the angle of the chassis with respect to a horizontal plane (e.g., a plane orthogonal to the force of gravity, or the idealized planar travel surface). This is accomplished by maintaining an alignment between the net force vector and the median plane of the chassis, as measured by the tilt sensor(s) of the vehicle.

For example, the vehicle may be traveling either in a straight line or in a turn when an obstacle is encountered by one wheel. In either case, the obstacle initially causes the chassis to tilt out of alignment with the net force vector. The controller of the vehicle compensates for this misalignment by adjusting the tilt angle of the chassis until the net force vector again aligns with the median plane. An initial angle of the chassis with respect to horizontal is maintained by the control system, while a linkage tilt angle is changed based on the terrain. Once the obstacle is overcome (e.g., after the vehicle has passed the obstacle and is again on substantially level terrain), the chassis will tilt again, and the control system will adjust the tilt to compensate, returning to the original configuration.

Terrain compensation may result in difficulty maintaining a desired path. Accordingly, the control system may be configured to selectively apply torque to the steering system to handle the dynamic conditions, even if operating in a mode wherein active steering is not typically used (e.g., a free-to-caster mode).

J. Illustrative Data Processing System

Figure 50:
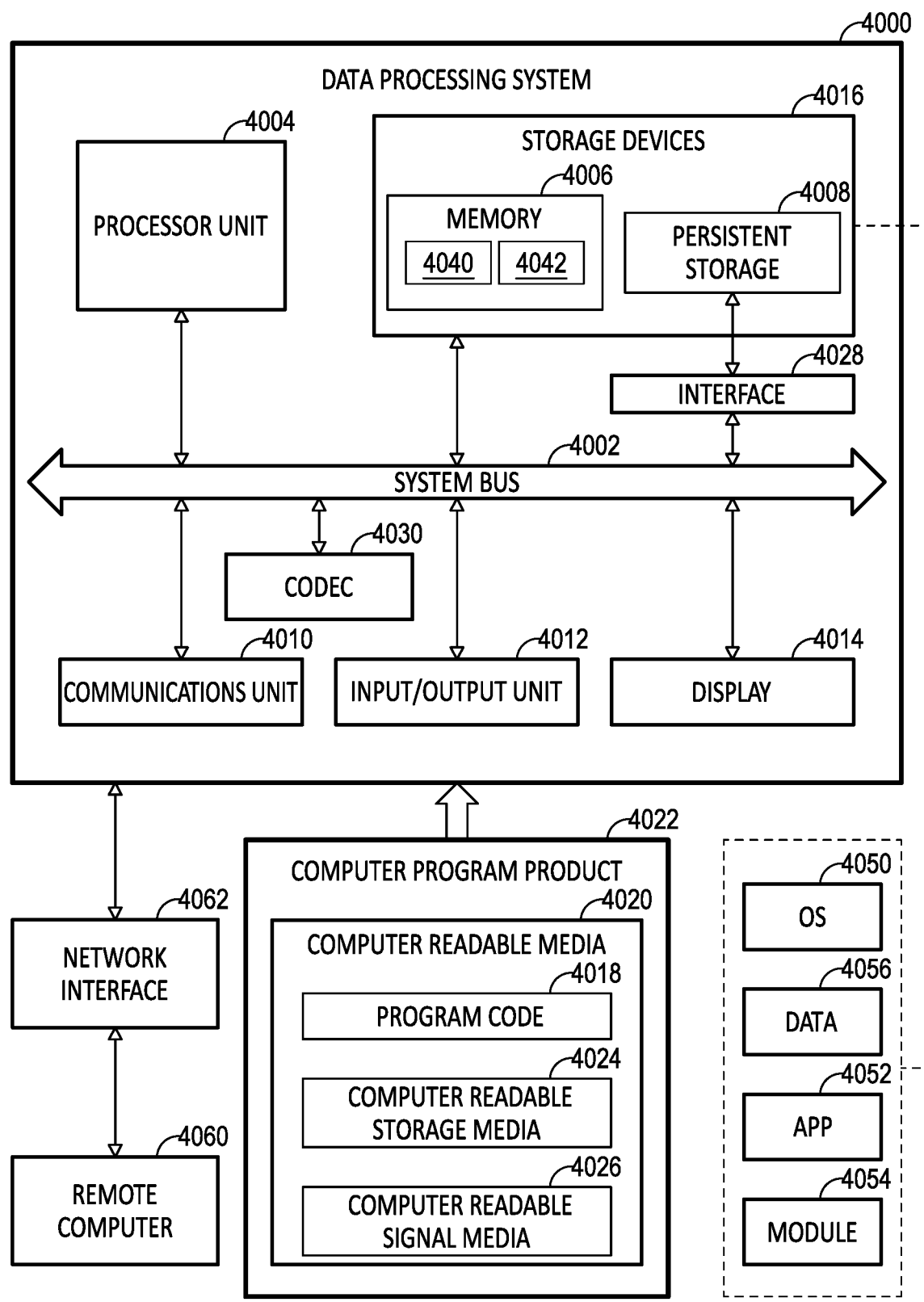
FIG. 50 is a schematic diagram depicting an illustrative data processing system, in accordance with aspects of the present teachings.

As shown in FIG. 50, this example describes a data processing system 4000 (also referred to as a computer, computing system, and/or computer system) in accordance with aspects of the present disclosure. In this example, data processing system 4000 is an illustrative data processing system suitable for implementing aspects of the autonomous tilting vehicle. More specifically, in some examples, devices that are embodiments of data processing systems (e.g., smartphones, tablets, personal computers) may comprise aspects of a vehicle control system or a fleet management computer system, and/or be included in or used in conjunction with the vehicle in any other suitable manner. In some examples, data processing systems are usable to communicate with a controller of an autonomous tilting vehicle (e.g., to transmit instructions to the vehicle). In some examples, one or more aspects of the onboard electronic controller or controllers of the vehicle may comprise a data processing system.

In this illustrative example, data processing system 4000 includes a system bus 4002 (also referred to as communications framework). System bus 4002 may provide communications between a processor unit 4004 (also referred to as a processor or processors), a memory 4006, a persistent storage 4008, a communications unit 4010, an input/output (I/O) unit 4012, a codec 4030, and/or a display 4014. Memory 4006, persistent storage 4008, communications unit 4010, input/output (I/O) unit 4012, display 4014, and codec 4030 are examples of resources that may be accessible by processor unit 4004 via system bus 4002.

Processor unit 4004 serves to run instructions that may be loaded into memory 4006. Processor unit 4004 may comprise a number of processors, a multi-processor core, and/or a particular type of processor or processors (e.g., a central processing unit (CPU), graphics processing unit (GPU), etc.), depending on the particular implementation. Further, processor unit 4004 may be implemented using a number of heterogeneous processor systems in which a main processor is present with secondary processors on a single chip. As another illustrative example, processor unit 4004 may be a symmetric multi-processor system containing multiple processors of the same type.

Memory 4006 and persistent storage 4008 are examples of storage devices 4016. A storage device may include any suitable hardware capable of storing information (e.g., digital information), such as data, program code in functional form, and/or other suitable information, either on a temporary basis or a permanent basis.

Storage devices 4016 also may be referred to as computer-readable storage devices or computer-readable media. Memory 4006 may include a volatile storage memory 4040 and a non-volatile memory 4042. In some examples, a basic input/output system (BIOS), containing the basic routines to transfer information between elements within the data processing system 4000, such as during start-up, may be stored in non-volatile memory 4042. Persistent storage 4008 may take various forms, depending on the particular implementation.

Persistent storage 4008 may contain one or more components or devices. For example, persistent storage 4008 may include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices may be removable and/or portable, e.g., a removable hard drive. Persistent storage 4008 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 4008 to system bus 4002, a removable or non-removable interface is typically used, such as interface 4028.

Input/output (I/O) unit 4012 allows for input and output of data with other devices that may be connected to data processing system 4000 (i.e., input devices and output devices). For example, an input device may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 4004 through system bus 4002 via interface port(s). Suitable interface port(s) may include, for example, a serial port, a parallel port, a game port, and/or a universal serial bus (USB).

One or more output devices may use some of the same types of ports, and in some cases the same actual ports, as the input device(s). For example, a USB port may be used to provide input to data processing system 4000 and to output information from data processing system 4000 to an output device. One or more output adapters may be provided for certain output devices (e.g., monitors, speakers, and printers, among others) which require special adapters. Suitable output adapters may include, e.g. video and sound cards that provide a means of connection between the output device and system bus 4002. Other devices and/or systems of devices may provide both input and output capabilities, such as remote computer(s) 4060. Display 4014 may include any suitable human-machine interface or other mechanism configured to display information to a user, e.g., a CRT, LED, or LCD monitor or screen, etc.

Communications unit 4010 refers to any suitable hardware and/or software employed to provide for communications with other data processing systems or devices. While communication unit 4010 is shown inside data processing system 4000, it may in some examples be at least partially external to data processing system 4000. Communications unit 4010 may include internal and external technologies, e.g., modems (including regular telephone grade modems, cable modems, and DSL modems), ISDN adapters, and/or wired and wireless Ethernet cards, hubs, routers, etc. Data processing system 4000 may operate in a networked environment, using logical connections to one or more remote computers 4060. A remote computer(s) 4060 may include a personal computer (PC), a server, a router, a network PC, a workstation, a microprocessor-based appliance, a peer device, a smart phone, a tablet, another network note, and/or the like. Remote computer(s) 4060 typically include many of the elements described relative to data processing system 4000. Remote computer(s) 4060 may be logically connected to data processing system 4000 through a network interface 4062 which is connected to data processing system 4000 via communications unit 4010. Network interface 4062 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like.

WAN technologies include point-to-point links, circuit switching networks (e.g., Integrated Services Digital networks (ISDN) and variations thereon), packet switching networks, and Digital Subscriber Lines (DSL).

Codec 4030 may include an encoder, a decoder, or both, comprising hardware, software, or a combination of hardware and software. Codec 4030 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 4030 is depicted as a separate component, codec 4030 may be contained or implemented in memory, e.g., non-volatile memory 4042.

Non-volatile memory 4042 may include read only memory (ROM), programmable ROM (PROM), electrically programmable ROM (EPROM), electrically erasable programmable ROM (EEPROM), flash memory, and/or the like, or any combination of these. Volatile memory 4040 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 4016, which are in communication with processor unit 4004 through system bus 4002. In these illustrative examples, the instructions are in a functional form in persistent storage 4008. These instructions may be loaded into memory 4006 for execution by processor unit 4004. Processes of one or more embodiments of the present disclosure may be performed by processor unit 4004 using computer-implemented instructions, which may be located in a memory, such as memory 4006.

These instructions are referred to as program instructions, program code, computer usable program code, or computer-readable program code executed by a processor in processor unit 4004. The program code in the different embodiments may be embodied on different physical or computer-readable storage media, such as memory 4006 or persistent storage 4008. Program code 4018 may be located in a functional form on computer-readable media 4020 that is selectively removable and may be loaded onto or transferred to data processing system 4000 for execution by processor unit 4004. Program code 4018 and computer-readable media 4020 form computer program product 4022 in these examples. In one example, computer-readable media 4020 may comprise computer-readable storage media 4024 or computer-readable signal media 4026.

Computer-readable storage media 4024 may include, for example, an optical or magnetic disk that is inserted or placed into a drive or other device that is part of persistent storage 4008 for transfer onto a storage device, such as a hard drive, that is part of persistent storage 4008. Computer-readable storage media 4024 also may take the form of a persistent storage, such as a hard drive, a thumb drive, or a flash memory, that is connected to data processing system 4000. In some instances, computer-readable storage media 4024 may not be removable from data processing system 4000.

In these examples, computer-readable storage media 4024 is a non-transitory, physical or tangible storage device used to store program code 4018 rather than a medium that propagates or transmits program code 4018. Computer-readable storage media 4024 is also referred to as a computer-readable tangible storage device or a computer-readable physical storage device. In other words, computer-readable storage media 4024 is media that can be touched by a person.

Alternatively, program code 4018 may be transferred to data processing system 4000, e.g., remotely over a network, using computer-readable signal media 4026. Computer-readable signal media 4026 may be, for example, a propagated data signal containing program code 4018. For example, computer-readable signal media 4026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 4018 may be downloaded over a network to persistent storage 4008 from another device or data processing system through computer-readable signal media 4026 for use within data processing system 4000. For instance, program code stored in a computer-readable storage medium in a server data processing system may be downloaded over a network from the server to data processing system 4000. The computer providing program code 4018 may be a server computer, a client computer, or some other device capable of storing and transmitting program code 4018.

In some examples, program code 4018 may comprise an operating system (OS) 4050. Operating system 4050, which may be stored on persistent storage 4008, controls and allocates resources of data processing system 4000. One or more applications 4052 take advantage of the operating system's management of resources via program modules 4054, and program data 4056 stored on storage devices 4016. OS 4050 may include any suitable software system configured to manage and expose hardware resources of computer 4000 for sharing and use by applications 4052. In some examples, OS 4050 provides application programming interfaces (APIs) that facilitate connection of different type of hardware and/or provide applications 4052 access to hardware and OS services. In some examples, certain applications 4052 may provide further services for use by other applications 4052, e.g., as is the case with so-called "middleware." Aspects of present disclosure may be implemented with respect to various operating systems or combinations of operating systems.

The different components illustrated for data processing system 4000 are not meant to provide architectural limitations to the manner in which different embodiments may be implemented. One or more embodiments of the present disclosure may be implemented in a data processing system that includes fewer components or includes components in addition to and/or in place of those illustrated for computer 4000. Other components shown in FIG. 50 can be varied from the examples depicted. Different embodiments may be implemented using any hardware device or system capable of running program code. As one example, data processing system 4000 may include organic components integrated with inorganic components and/or may be comprised entirely of organic components (excluding a human being). For example, a storage device may be comprised of an organic semiconductor.

In some examples, processor unit 4004 may take the form of a hardware unit having hardware circuits that are specifically manufactured or configured for a particular use, or to produce a particular outcome or progress. This type of hardware may perform operations without needing program code 4018 to be loaded into a memory from a storage device to be configured to perform the operations. For example, processor unit 4004 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 4018) may be implemented as hardware, e.g., by specifying an FPGA configuration using a hardware description language (HDL) and then using a resulting binary file to (re)configure the FPGA.

In another example, data processing system 4000 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 4004 may be implemented using a combination of processors found in computers and hardware units. Processor unit 4004 may have a number of hardware units and a number of processors that are configured to run program code 4018. With this depicted example, some of the processes may be implemented in the number of hardware units, while other processes may be implemented in the number of processors.

In another example, system bus 4002 may comprise one or more buses, such as a system bus or an input/output bus. Of course, the bus system may be implemented using any suitable type of architecture that provides for a transfer of data between different components or devices attached to the bus system. System bus 4002 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 4010 may include a number of devices that transmit data, receive data, or both transmit and receive data. Communications unit 4010 may be, for example, a modem or a network adapter, two network adapters, or some combination thereof. Further, a memory may be, for example, memory 4006, or a cache, such as that found in an interface and memory controller hub that may be present in system bus 4002.

Advantages, Features, and Benefits

The different embodiments and examples of the autonomous delivery vehicles described herein provide several advantages over known solutions for delivering goods and other cargo. For example, illustrative embodiments and examples described herein may allow decreased delivery costs for both buyer and seller, decreased order fulfillment times, decreased congestion, increased asset utilization and/or decreased labor for delivery.

Additionally, and among other benefits, illustrative embodiments and examples described herein have a small footprint, allowing several vehicles to fit in the same form factor as a car or truck, thus improving congestion, and potentially reducing cost per vehicle compared with using a car or truck for the same job.

Additionally, and among other benefits, illustrative embodiments and examples described herein allow a lighter weight of a purpose-built delivery robot, and thereby can save energy per delivery, increase safety for pedestrians and other drivers, and decrease embodied energy per vehicle.

Additionally, and among other benefits, illustrative embodiments and examples described herein allow a relatively narrow autonomous delivery vehicle to maintain stability in cornering maneuvers, evasive maneuvers, rough terrain/potholes, poor traction, etc. at relatively high speeds, by leaning the vehicle into turns.

Additionally, and among other benefits, illustrative embodiments and examples described herein include a cargo compartment having a gullwing door (AKA a falcon wing door) that pivots and/or lifts upward rather than outward. This type of door typically does not extend far beyond the footprint of the vehicle when opened, and in some examples does not extend beyond the footprint of the vehicle at all when opened. This saves space and may simplify any determination by the vehicle controller as to whether the door can safely be opened or closed in a given situation.

No known system or device can perform these functions, particularly in an autonomous vehicle. Thus, the illustrative embodiments and examples described herein are particularly useful for autonomous deliver vehicles which are intended to operate without a human operator riding or driving the vehicle. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An autonomous tilting vehicle, comprising:
a pair of front wheels coupled to a tiltable chassis by a mechanical linkage, wherein the pair of wheels and the chassis are configured to tilt in unison with respect to a roll axis of the chassis;
a single rear wheel coupled to the chassis;
a motor coupled to the rear wheel and configured to drive the rear wheel to propel the vehicle;
a first sensor configured to detect directional information regarding a net force vector applied to the chassis, wherein the net force vector is determined by gravity in combination with any applicable centrifugal force applied to the chassis;
a tilt actuator operatively coupled to the chassis and configured to selectively tilt the chassis;
a controller including processing logic configured to selectively control the tilt actuator based on the directional information from the first sensor to automatically maintain the net force vector in alignment with a median plane of the chassis; and
a vehicle body coupled to the chassis and defining a cargo compartment including a floor and a door;
wherein the processing logic of the controller is further configured to cause the door to open and the tilt actuator to tilt the vehicle body sufficiently to at least partially cause the cargo to move down the floor and out of the compartment; and
wherein the processing logic of the controller is further configured to discharge the cargo by tilting the vehicle body to a tilt angle sufficiently high to overcome static friction between the cargo and the floor of the cargo compartment, and to reduce the tilt angle to a lower value while the cargo is in motion.

2. The autonomous tilting vehicle of claim 1, wherein the processing logic of the controller is further configured to modulate the tilt angle of the vehicle body to achieve prevent the cargo from tipping or rolling.

3. The autonomous tilting vehicle of claim 2, wherein the processing logic of the controller is configured to modulate the tilt angle to achieve at least one of a desired position, velocity, acceleration, and mechanical agitation of the cargo during unloading of the cargo.

4. The autonomous tilting vehicle of claim 2, further comprising a second sensor configured to measure a property of the cargo during unloading, and wherein the measured property is used to control the tilt angle of the vehicle during unloading of the cargo.

5. The autonomous tilting vehicle of claim 2, wherein the processing logic of the controller is configured to modulate the tilt angle with predetermined angles, at least one predetermined angular velocity, or at least one predetermined angular acceleration.

6. The autonomous tilting vehicle of claim 1, wherein the processing logic of the controller is further configured to control the tilt angle of the vehicle body based on a sensed weight or volume of the cargo.

7. The autonomous tilting vehicle of claim 6, wherein the processing logic of the controller is further configured to select the tilt angle of the vehicle from a plurality of values stored in memory of the controller based on the sensed weight or volume of the cargo.

8. The autonomous tilting vehicle of claim 1, wherein the processing logic of the controller is further configured to gradually reduce the tilt angle to slow the velocity of the cargo.

9. The autonomous tilting vehicle of claim 1, wherein the processing logic of the controller is further configured to reduce the tilt angle to keep the cargo moving along the cargo compartment floor at a desired constant speed.

10. The autonomous tilting vehicle of claim 1, wherein the floor of the cargo compartment includes a surface configured to reduce friction between the cargo and the cargo compartment floor.

11. The autonomous tilting vehicle of claim 1, wherein the tilt actuator causes the vehicle body to tilt sufficiently to cause the cargo to move down the floor and out of the compartment.

12. The autonomous tilting vehicle of claim 1, further comprising a second actuator configured to push the cargo out of the cargo compartment while the vehicle body is tilted and the door is open.

13. The autonomous tilting vehicle of claim 12, wherein the second actuator is a linear actuator attached to the vehicle body and configured to push the cargo out of the cargo compartment.

14. An autonomous tilting vehicle, comprising:
a pair of front wheels coupled to a tiltable chassis by a mechanical linkage, wherein the pair of wheels and the chassis are configured to tilt in unison with respect to a roll axis of the chassis;
a rear wheel coupled to the chassis;
a motor coupled to the rear wheel and configured to drive the rear wheel to propel the vehicle;
a first sensor configured to detect directional information regarding a net force vector applied to the chassis, wherein the net force vector is determined by gravity in combination with any applicable centrifugal force applied to the chassis;
a tilt actuator operatively coupled to the chassis and configured to selectively tilt the chassis;
a controller including processing logic configured to selectively control the tilt actuator based on the directional information from the first sensor to automatically maintain the net force vector in alignment with a median plane of the chassis; and
a vehicle body coupled to the chassis and defining a cargo compartment including a floor;
wherein the processing logic of the controller is further configured selectively to cause the tilt actuator to tilt the vehicle body sufficiently to cause a package to move out of the compartment and thereby to unload the package from the vehicle, by tilting the vehicle body to a tilt angle sufficiently high to overcome static friction between the cargo and the floor of the cargo compartment, and reducing the tilt angle to a lower value while the cargo is in motion.

15. The autonomous tilting vehicle of claim 14, wherein the processing logic of the controller is further configured to modulate the tilt angle of the vehicle body to achieve at least one of a desired position, velocity, acceleration, and mechanical agitation of the package.

16. The autonomous tilting vehicle of claim 14, wherein the processing logic of the controller is further configured to control the tilt angle of the vehicle body based on a weight or volume of the package.

17. An autonomous tilting vehicle, comprising:
a pair of front wheels coupled to a tiltable chassis by a mechanical linkage, wherein the pair of wheels and the chassis are configured to tilt in unison with respect to a roll axis of the chassis;

exactly one rear wheel coupled to the chassis;
a motor coupled to the rear wheel and configured to drive the rear wheel to propel the vehicle;
a first sensor configured to detect directional information regarding a net force vector applied to the chassis, wherein the net force vector is determined by gravity in combination with any applicable centrifugal force applied to the chassis;
a tilt actuator operatively coupled to the chassis and configured to selectively tilt the chassis;
a controller including processing logic configured to selectively control the tilt actuator based on the directional information from the first sensor to automatically maintain the net force vector in alignment with a median plane of the chassis; and
a vehicle body coupled to the chassis and defining a cargo compartment including a floor and an openable door;
wherein the processing logic of the controller is further configured selectively to cause the door to open and the tilt actuator to tilt the vehicle body during autonomous cargo unloading to a tilt angle sufficiently high to overcome static friction between cargo within the cargo compartment and the floor of the cargo compartment, and then to reduce the tilt angle to a lower value while the cargo is in motion.

18. The autonomous tilting vehicle of claim 17, further comprising an unload actuator configured to push the cargo out of the cargo compartment during autonomous cargo unloading.

19. The autonomous tilting vehicle of claim 17, wherein the processing logic of the controller is further configured to modulate the tilt angle of the vehicle body to achieve at least one of a desired position, velocity, acceleration, and mechanical agitation of cargo during autonomous cargo unloading.

20. The autonomous tilting vehicle of claim 17, wherein the processing logic of the controller is further configured to modulate the tilt angle of the vehicle body to prevent tipping or rolling of the cargo during unloading.

* * * * *